United States Patent
Helmsderfer et al.

(10) Patent No.: US 10,757,872 B2
(45) Date of Patent: Sep. 1, 2020

(54) MULTI-FUNCTIONAL AND MODULAR TREE REMOVAL AND MAINTENANCE APPARATUS AND RELATED METHODS

(71) Applicant: Partners In Innovation Limited, LLC, Cincinnati, OH (US)

(72) Inventors: John A. Helmsderfer, Cincinnati, OH (US); Stuart McDowell, Lawrenceburg, IN (US); Florin Ababei, Botosani (RO); Alex Androski, Cincinnati, OH (US)

(73) Assignee: Partners In Innovation Limited, LLC, Cincinnati, OH (US)

( * ) Notice: Subject to any disclaimer, the term of this patent is extended or adjusted under 35 U.S.C. 154(b) by 122 days.

(21) Appl. No.: 15/864,727

(22) Filed: Jan. 8, 2018

(65) Prior Publication Data

US 2018/0160635 A1  Jun. 14, 2018

Related U.S. Application Data

(63) Continuation of application No. 14/292,364, filed on May 30, 2014, now abandoned, which is a continuation of application No. 13/608,837, filed on Sep. 10, 2012, now Pat. No. 8,739,843, which is a continuation of application No. PCT/US2011/028110, filed on Mar. 11, 2011.

(60) Provisional application No. 61/312,704, filed on Mar. 11, 2010, provisional application No. 61/312,707, filed on Mar. 11, 2010, provisional application No.
(Continued)

(51) Int. Cl.
*A01G 23/06* (2006.01)
*A01G 23/093* (2006.01)

(52) U.S. Cl.
CPC ......... *A01G 23/067* (2013.01); *A01G 23/093* (2013.01)

(58) Field of Classification Search
CPC .............................. A01G 23/06; A01G 23/067
See application file for complete search history.

(56) References Cited

U.S. PATENT DOCUMENTS

| 3,044,509 A | 7/1962 | Kehler |
| 3,146,960 A | 9/1964 | De Graff |
| 3,724,767 A | 4/1973 | Scarbrough |

(Continued)

FOREIGN PATENT DOCUMENTS

| EP | 0976872 A1 | 2/2000 |
| EP | 1566096 A1 | 8/2005 |

(Continued)

OTHER PUBLICATIONS

International Bureau of WIPO; Preliminary Report on Patentability in related International Patent Application No. PCT/US2011/028110 dated Sep. 11, 2012; 9 pages.
(Continued)

*Primary Examiner* — Matthew Katcoff
(74) *Attorney, Agent, or Firm* — Wood Herron & Evans LLP

(57) ABSTRACT

A lifting apparatus is provided. The apparatus includes a primary body that has a support for supporting a person, and a secondary body. A releasable coupling provides selective coupling between the primary and secondary bodies. The lifting apparatus has (a) a first condition in which the primary body is coupled to the secondary body, and (b) a second condition in which the primary body is not coupled to the secondary body, and is configured to be releasably coupled to a vehicle.

15 Claims, 63 Drawing Sheets

Related U.S. Application Data

61/320,895, filed on Apr. 5, 2010, provisional application No. 61/532,995, filed on Sep. 9, 2011.

(56) References Cited

U.S. PATENT DOCUMENTS

| | | | |
|---|---|---|---|
| 3,913,303 A | 10/1975 | Blake et al. |
| 3,931,841 A | 1/1976 | Blum |
| 3,989,198 A | 11/1976 | Blasko |
| 4,180,107 A | 12/1979 | Grover |
| 4,221,508 A | 9/1980 | Haines |
| 4,338,985 A | 7/1982 | Smith et al. |
| 4,355,670 A | 10/1982 | Ohrberg et al. |
| 4,358,995 A | 11/1982 | Ballo et al. |
| 4,683,924 A | 8/1987 | Cornelius |
| 4,703,786 A | 11/1987 | Doskocil |
| 4,767,067 A | 8/1988 | Bruer et al. |
| 4,784,195 A | 11/1988 | Eggen |
| 5,005,620 A | 4/1991 | Morey |
| 5,082,188 A | 1/1992 | Urich |
| 5,148,844 A | 9/1992 | Robison |
| 5,158,126 A | 10/1992 | Lang |
| 5,205,496 A | 4/1993 | O'Donnell et al. |
| 5,297,744 A | 3/1994 | Clinton |
| 5,360,041 A | 11/1994 | Stevens |
| 5,385,308 A | 1/1995 | Gearing et al. |
| 5,390,862 A | 2/1995 | Eglin |
| 5,402,950 A | 4/1995 | Blair et al. |
| 5,419,380 A | 5/1995 | Bot |
| 5,419,502 A | 5/1995 | Morey |
| 5,499,771 A | 3/1996 | Esposito et al. |
| 5,558,282 A | 9/1996 | Ameye et al. |
| 5,603,459 A | 2/1997 | Gearing et al. |
| 5,613,537 A | 3/1997 | Gassiott |
| 5,669,563 A | 9/1997 | Gearing et al. |
| 5,692,549 A | 12/1997 | Eggers |
| 5,823,238 A | 10/1998 | Bohnke |
| 5,887,634 A | 3/1999 | Theisen |
| 6,000,642 A | 12/1999 | Morey |
| 6,016,855 A | 1/2000 | Morey |
| 6,027,055 A | 2/2000 | Doskocil |
| 6,230,770 B1 | 5/2001 | Spaargaren |
| 6,263,930 B1 | 7/2001 | Wiley |
| 6,293,479 B1 | 9/2001 | Kaczmarski et al. |
| 6,357,684 B1 | 3/2002 | Morey |
| 6,425,232 B1 | 7/2002 | Desnijder et al. |
| 6,438,874 B1 | 8/2002 | LaBounty et al. |
| 6,578,295 B1 | 6/2003 | McPherson et al. |
| 6,637,483 B2 | 10/2003 | Stager et al. |
| 6,638,159 B2 | 10/2003 | Krone et al. |
| 6,659,859 B2 | 12/2003 | Nieschulze |
| 6,722,596 B1 | 4/2004 | Morey |
| 6,729,567 B1 | 5/2004 | Morey |
| 6,814,320 B1 | 11/2004 | Morey et al. |
| 6,824,089 B2 | 11/2004 | Gross et al. |
| 6,830,204 B1 | 12/2004 | Morey |
| 6,877,535 B1 | 4/2005 | Bennington |
| 6,935,588 B2 | 8/2005 | Blair et al. |
| 6,945,292 B1 | 9/2005 | Giles et al. |
| 6,988,352 B2 | 1/2006 | Van Vooren |
| 7,007,414 B2 | 3/2006 | Paumier |
| 7,011,124 B1 | 3/2006 | Morey |
| 7,086,432 B1 | 8/2006 | Falatok |
| 7,104,294 B2 | 9/2006 | Kopocs et al. |
| 7,124,795 B2 | 10/2006 | Kammerer |
| 7,150,300 B1 | 12/2006 | Peterson |
| 7,213,623 B2 | 5/2007 | Shinn |
| 7,216,682 B1 | 5/2007 | Bennington |
| 7,219,706 B2 | 5/2007 | Stager |
| 7,222,808 B2 | 5/2007 | Edwards |
| 7,281,676 B1 | 10/2007 | Bennington |
| 7,299,836 B2 | 11/2007 | Green |
| 8,739,843 B2 | 6/2014 | Helmsderfer et al. |
| 2002/0139877 A1 | 10/2002 | Beam |
| 2003/0071151 A1 | 4/2003 | Gross et al. |
| 2003/0111566 A1 | 6/2003 | Seaman et al. |
| 2003/0122004 A1 | 7/2003 | Allen et al. |
| 2004/0216809 A1 | 11/2004 | Wildey |
| 2005/0087263 A1 | 4/2005 | Clemenson |
| 2005/0172597 A1 | 8/2005 | Lofton |
| 2006/0096664 A1 | 5/2006 | Dubbs et al. |
| 2006/0255193 A1 | 11/2006 | Hookstra et al. |
| 2006/0272183 A1 | 12/2006 | Kergen |
| 2007/0034294 A1 | 2/2007 | Chapman |
| 2007/0069051 A1 | 3/2007 | Hartzler et al. |
| 2007/0169848 A1 | 7/2007 | Holzer et al. |
| 2007/0193428 A1 | 8/2007 | Maclennan et al. |
| 2008/0000208 A1 | 1/2008 | Edwards |

FOREIGN PATENT DOCUMENTS

| | | |
|---|---|---|
| EP | 1862062 A2 | 12/2007 |
| WO | 9608958 A1 | 3/1996 |
| WO | 2006050222 A1 | 5/2006 |
| WO | 2006050259 A1 | 5/2006 |
| WO | 2006119547 A1 | 11/2006 |

OTHER PUBLICATIONS

Loftness Timber Ax Specifications, located in iinternet search at http://www.loftness.com/timberax.cfm?cat=for, printed Jun. 22, 2008 (3 pages).

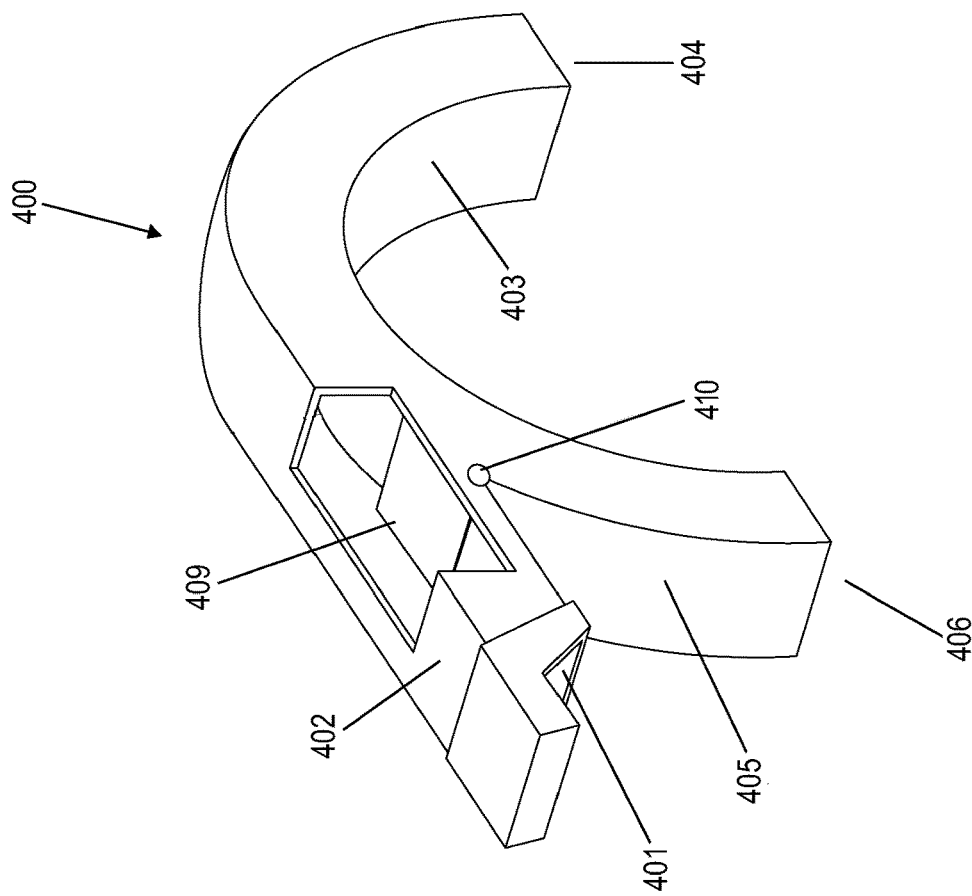
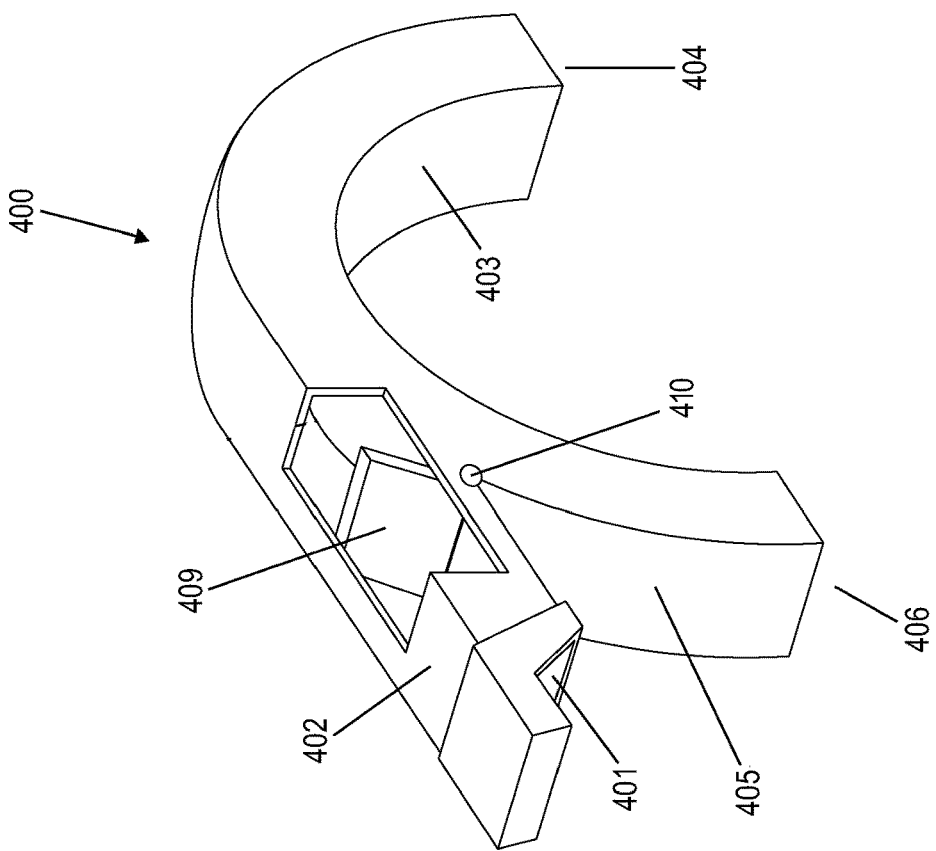
FIG. 25
FIG. 24

MULTI-FUNCTIONAL AND MODULAR TREE REMOVAL AND MAINTENANCE APPARATUS AND RELATED METHODS

CROSS-REFERENCE TO RELATED APPLICATIONS

This Application is a Continuation of, and claims the filing date benefit of U.S. application Ser. No. 14/292,364 entitled MULTI-FUNCTIONAL AND MODULAR TREE REMOVAL AND MAINTENANCE APPARATUS AND RELATED METHODS, filed May 30, 2014, which application is a continuation of U.S. application Ser. No. 13/608,837, entitled MULTI-FUNCTIONAL AND MODULAR TREE REMOVAL AND MAINTENANCE APPARATUS AND RELATED METHODS, filed Sep. 10, 2012, and issued as U.S. Pat. No. 8,739,843, which application is a Continuation of, and claims the filing date benefit of, International Application Number PCT/US2011/028110, entitled MULTI-FUNCTIONAL AND MODULAR TREE REMOVAL AND MAINTENANCE APPARATUS AND RELATED METHODS, filed Mar. 11, 2011, which International Application claims priority to U.S. Provisional Application Ser. No. 61/312,704 entitled APPARATUS AND METHOD FOR HANDLING WOOD PRODUCTS, filed Mar. 11, 2010, and to U.S. Provisional Application Ser. No. 61/312,707, entitled LIFTING APPARATUS AND RELATED METHODS, filed Mar. 11, 2010, and to U.S. Provisional Application Ser. No. 61/320,895 entitled TREE REMOVAL MACHINE WITH STUMP GRINDING CAPABILITIES, filed Apr. 5, 2010. U.S. application Ser. No. 13/608,837 also claims the filing date benefit of U.S. Provisional Application Ser. No. 61/532,995, entitled MULTI-FUNCTIONAL AND MODULAR TREE REMOVAL AND MAINTENANCE APPARATUS AND RELATED METHODS, filed Sep. 9, 2011. The contents of each of these related Applications are hereby expressly incorporated by reference herein in their entireties.

TECHNICAL FIELD

The present invention generally relates to apparatus and methods for handling wood products and other fibrous materials, and more particularly to apparatus and methods for chipping and grinding wood products, such as portions of a tree and the ground or chipped byproducts thereof. The present invention further generally relates to apparatus for use by urban forestry professionals in the care, maintenance and removal of trees on commercial, institutional and residential grounds and also generally relates to lifting apparatus and, more particularly, to apparatus that utilize extendable booms.

BACKGROUND

In a variety of residential and commercial activities, it is often desirable to remove and dispose of several types of wood products, including branches, bushes, trees, brush, etc. For instance, in a residential setting it may be necessary to trim or completely remove a tree because the tree needs to be pruned, the tree is dead or dying, the tree has been damaged in a storm, or the homeowner simply desires the tree to be removed. Moreover, trees must often be removed in many commercial activities including power line construction and maintenance, road construction, real estate development, and other forestry applications.

In such cases, the tree is typically cut down at a point above the ground so as to leave a stump portion of the tree in the ground. The above-grade portion of the tree (e.g., the trunk, limbs, leaves, etc.) is cut into smaller sections and if not kept for firewood, might be disposed of through a chipping process. While larger sections of the trunk might be hauled away or split into firewood, the smaller trunk section and limbs are typically chopped up or chipped and disposed of as chips. To this end, the trunk and limbs are typically manually picked up from the ground and fed into a chipping machine or chipper, which reduce the tree portions into small wood chips. The small wood chips may be collected and used for mulch, fuel, and other applications, or may simply be discarded. Typical wood chippers include an in-feed chute and a cutting assembly having a rotatable disc with at least one knife or blade for chipping the wood fed through the in-feed chute.

In some applications, it is also necessary or desirable to remove the stump portion of the tree that is still in the ground. For instance, in residential settings, tree stumps detract from the aesthetic value of the landscape, interfere with the establishment of replacement trees, present a nuisance to lawn maintenance, and may further present safety concerns for children and others. In these cases, it may be necessary to remove the stump from the ground. One method commonly used to remove stumps is to use a stump-grinding machine. To this end, the stump grinder may be positioned in front of or over the stump and an arm extending from the stump grinder base supports a rotating grinding wheel. As the grinding wheel rotates, the arm is swept back and forth laterally across the stump to grind the stump into relatively small pieces of wood. The grinding wheel is moved downward toward the ground until the remaining stump is located at a desired level below grade. Typical stump grinders include a rotatable disc having a plurality of hardened teeth that impact the stump at a relatively high rate of speed so as to essentially pulverize or grind the wood material into small pieces.

Chipping and grinding machines used to dispose of trees are typically expensive to purchase and operate. For example, commercial chipping machines may be quite large and therefore require a designated truck to tow the chipper to the job site. Further, these machines typically discharge the chips into a chute with such velocity that it is often necessary to direct them into a specialized truck bed on the back of the tow vehicle. The specialized bed is referred to as a chip box and typically consists of five fully connected and closed sides and a partially, and sometimes fully, open rear side with the opening being positioned in an upper portion of the rear side. This configuration effectively contains the chips discharged by the chipping machine. Consequently, some tree service companies focus on disposing of the above-grade portion of the tree, such as by using a chipper, while others might focus exclusively on removing the stump from the ground, such as with a grinder. As a result, homeowners and others wanting the entire tree removed must plan and schedule separate appointments with two different companies, which is inconvenient to the homeowner and frequently more costly by virtue of involving two companies.

Other tree service companies, however, may provide both services. To this end, these tree service companies typically implement the tree removal through a two-step process. Initially, a first crew of usually three or four workers proceeds to the job site where they cut the tree(s) and dispose of the above-grade portion of the tree. The first crew typically includes a relatively large truck including the previously described chip box and having a chipper hitched thereto for chipping the above-grade tree portions.

After the above-grade portion of the tree is disposed of, a second, separate worker, or in some cases a crew, comes in with separate grinding equipment specifically designed for stump removal. Although one company may perform both services, the expense of providing both a chipper and grinder are high because different sets of equipment must be transported, operated and maintained. Additionally, in many situations, the stump grinding cannot be scheduled to commence immediately after removal of the above grade portion. Reasons for these scheduling difficulties are numerous, with weather, location, and other jobs being but a few examples. Additionally, many types of wheeled stump grinders have difficulty crossing hilly, slippery, or uneven terrain. In these situations, it is common to wait until the site appears to be dry before attempting to access the site. In any event, these delays cause the customer to wait for the job to be completed, which often is a source of frustration to the customer. Moreover, larger tree services may wait to invoice the entire job, including the above ground removal, until the entire process is complete. This invoicing delay can place burdens on the tree service's cash flow.

Another undesirable aspect of stump grinding is that the grindings are left behind by the stump grinding machine. In many cases, the stump grinding process results in the grindings being strewn over a fairly large area that, in many instances, is much larger than the area covered by the stump. Frequently, the tree removal service will not remove the grindings but leave them on the ground for the customer to ultimately dispose of. In the cases where the tree removal service does remove the grindings, yet more laborers or mechanized equipment is required to be brought to the site at still further cost to the customer. Many customers are simply not willing to bear this cost and are left with an unsightly pile of grindings which must eventually decompose. In other cases, tree removal companies might not be able to completely communicate to customers all the implications of leaving stump grindings to decompose. For example, the decomposition process affects the acidity of the nearby soil, which can impact the growth of new plants or grass.

Further, tree roots and the trunks contain high concentrations of tannins, which create soil acidity undesirable for certain plants, especially lawn grasses which are commonly planted over an area where a tree stump was removed. Given the cost of grinding removal and undesirable aspects of leaving the grindings to decompose, a stump grinding machine that could efficiently collect the grinding debris would be desirable. Because the volume of stump grindings can be considerable, and recognizing the need of a truck mounted chip box, it may be desirable that a machine mounted hopper, which functions to collect both wood chips and stump grindings, include an emptying system that will work effectively with the specialized truck mounted chip box.

Yet another shortcoming of current stump grinders is the swing type method of operation. As noted above, these devices consist of a rotating wheel which is relatively thin in width relative to its diameter. The grinding wheel is attached to an arm extending out from the machine base and the stump is ground by swinging the wheel in arcuate shaped lateral passes across the stump and increasing the depth of cut until the desired amount is removed or the grinding wheel has reached the limit of its vertical travel (e.g., typically around nine inches). This method results in inconsistent grinding depth and insufficient surface coverage.

Additionally, while accepted as the industry standard, this method requires considerable operator skill, is time consuming, and is often imprecise. By way of example, the debris from the grinding process piles up in the work area making it difficult for the operator to see what has been ground and what still remains to be ground. Repositioning the machine to grind missed spots is common. Moreover, tree species, such as Silver Maples and other species, commonly grow substantial surface roots, the removal of which can be time consuming and tedious using the swing-type stump grinder.

Other hardwood trees, such as oak or walnut trees, begin to crown out immediately below grade, which is evidenced by observation grades rising up as the lower most portion of tree trunk is approached. For example, for a tree trunk with an at-grade diameter of 36 inches, the crowning from the trunk to the affected surrounding grade could be several feet wider than the diameter of the trunk itself. When grinding the stump of such a tree with a swing type grinder, it is not practical to level this peaked area. Consequently, the property is often left with an undesirable hump where the tree stump was removed.

Accordingly, there is a need for an improved apparatus and method for handling wood products, such as trees, bushes, and other fibrous materials, that address these and other drawbacks of current apparatus and associated procedures.

In other tree-related activities, a typical tree-removing or maintenance operation may consist of removing smaller branches from a tree, followed by removal of larger branches and branches high off the ground. This is then followed by removal of the tree trunk. The remains of the tree can either be transported off-site without breaking them apart, or could instead be reduced to wood chips at the site itself. If broken into wood chips, these are then carried away, typically in a specialized truck. Moreover, in a conventional tree-removal operation, the remains of the stump must either be dug out or ground up.

Apparatus for chipping wood in such operations are known. Conventional apparatus, however, are only capable of performing individual tasks. Conventional apparatus are therefore not capable of performing all of the functions necessary to remove a tree on the job site. This requires the tree removal technician to either haul several pieces of equipment to the job site or to make repeated trips to a job site with different pieces of equipment.

Neither of these options, however, is time nor cost efficient. This is so especially in an age when fuel conservation is becoming increasingly important and certain states are levying taxes for each engine powering vehicles for non highway use, such as those used by urban tree care professionals. Many urban tree care organizations currently own some or all of the diverse apparatus commonly used for tree removal and maintenance.

Machines are known that are capable of performing a number of tree care related tasks but these machines cannot perform all of the tasks associated with tree removal and maintenance in an efficient and safe methodology familiar to the practices of urban tree care professionals. For instance, forestry and right-of-way maintenance machines can remove a tree but not necessarily grind the stump or dispose of the chips. Moreover, such machines cannot traverse improved surfaces such as lawn areas, driveways and sidewalks without causing damage.

There is a therefore a need to provide an apparatus capable of functioning as a wood chipper and also capable of performing additional functions. In particular, there is a need to provide a wood chipping apparatus capable of performing all of the functions necessary to remove and/or maintain a tree on the job site, especially in an urban setting, in a safe and effective manner.

In yet other tree-related activities, in tree maintenance and care services there is a need to reach branches growing high up on a tree for their maintenance and removal. This can be done, for example, by means of a ladder or by ascending the tree. However, the reach of a ladder can be limited, and to ascend a tree safely, considerable skill and time are required. For this reason, lifting devices have been developed to meet this need, such as platform lifts, boom lifts or bucket trucks (also known as cherry pickers). A bucket truck's arm segments are configured in a way that allows them to reach up and over a tree limb, making lifting devices of this type popular in tree care applications.

Lifting devices, and bucket trucks in particular, are commonly attached to a truck which, while serving as the lifting device's transport vehicle, also serves as the device's base. Because the transport vehicle (e.g., a truck) is relatively heavy, outriggers and/or electronics are used to prevent the lifting device from tipping over when the boom arm is in certain extended positions. Rather than transporting the lift machinery on a vehicle or through use of a tow vehicle, it can be driven under the transport vehicle's power to the work site. Using a truck as the base for high reach tree care equipment is considered the quickest means of transporting. However, trucks are often limited to traveling on paved surfaces because of their weight and are thus limited to tasks that can be reached from paved surfaces. This can result in a frustrating limitation as a significant percentage of tree maintenance and care is for trees not adjacent paved surfaces.

Lifting devices are also known that are self propelled machines and, as such, are capable of being driven off of paved surfaces. However, these devices are relatively large; at least to the extent that they need to be transported on a trailer or on the back of a flat bed truck. Given the dynamics of the tree care industry, use of such devices requires that the user (e.g., tree service) bring an additional truck. A typical tree service uses what is referred to as a chip box truck to pull a towable tree chipper. The discharge end of the tree chipper is proximate the open end of the chip box truck and the infeed end of the chipper is at the opposite end of the machine so that long and otherwise large limbs can be stacked up and fed into the chipper.

Simply locating a mobile lifting device anywhere on a trailer would not be effective. Placing a conventional lifting device on the front of the trailer would leave the discharge end of a conventional chipper too far from the back of the chip box truck, and parts of the lifting device may obstruct the stream of chips flowing into the chip box. Placing the chipper on the front end of the trailer and the lifting device on the back end of the trailer would require workers to step up onto the trailer and the chipper while working around the lifting device. Further, manually fed limbs can be 20' or more in length, thus making it desirable for the end of the chipper to be positioned so that it faces a relatively large open area often referred to as the staging area.

Within the dynamics of the tree care industry, this practice would be very inefficient. Further, many sites have space limitations, both with respect to the site itself and egress. Accordingly, a long trailer would be more impractical in such situations. Therefore, in order to use a self propelled lifting device, the tree service needs to transport it to the site with a separate vehicle. This requires the tree care professional to incur not only the cost of the separate vehicle but personnel to drive the vehicle.

Lastly, self propelled lifting devices capable of ascending to heights comparable to that of bucket trucks carry costs that are far greater than the cost of a truck-mounted bucket lift. In fact, the cost of some self propelled lifts exceeds the cost of the entire tree care package that a tree care professional would purchase. The package would be defined as the tree service base truck, the chip collection box, the boom lift and the tree chipper. Given this expense, it is understandable why many tree care services find the cost of a self propelled lift very high relative to the cost of other equipment. There is thus a need to provide a lifting device that can address the drawbacks of the prior art.

A variety of apparatus have been described to address this need, for example in U.S. Pat. No. 4,475,625 to Clements, U.S. Pat. No. 4,314,622 to Lindquist, U.S. Pat. No. 5,171,124 to Foster, and U.S. Pat. No. 7,273,342 to DeSilvio and U.S. Pat. No. 5,551,527 to Luscombe. Each of these apparatus extends the reach of a construction or landscaping machine. However, these devices are limited in their function. Moreover, the technical challenges of creating such a mobile apparatus are extensive. By way of example, a wide variety of fully functional equipment such as wood chippers, stump grinders, lifting devices must be mounted to a mobile chassis with power capabilities to meet the functional expectations, all sized appropriately for traveling roads to reach a job site, and capable of traversing a maintained lawn or other improved surfaces without causing damage. To the contrary, devices that can easily attach to smaller, more maneuverable machines are either not designed to attach to larger machines or do not gain any advantage in reach when attached to larger machines. Other devices that do not fully integrate with larger machines must be brought to the site separately.

Therefore, it would be desirable to provide apparatus and related methods that address these and other drawbacks of equipment currently available for maintenance and/or removal of high tree branches.

SUMMARY

An improved apparatus and method for handling wood products, such as the limb, trunk, and stump of a tree, that addresses the shortcomings of current wood handling devices includes a frame supported at least in part by a ground surface and a rotatable first drum carried by the frame and configured to operate with an anvil surface integrated within or coupled to the frame in a first mode for chipping or grinding loose tree parts, and which in some embodiments is further configured to operate in a second mode for grinding a stump in the ground. The apparatus is configured in the second mode so that the first drum is adjacent the ground to engage the stump, and configured in the first mode so that the first drum is spaced from the ground such that the ground does not obstruct rotation of the first drum.

In one embodiment, the first drum is movable with respect to at least one of the ground surface or the frame between a first position wherein the first drum is positioned to cooperate with the anvil surface to chip or grind the loose tree parts, and a second position wherein the first drum is positioned adjacent the ground to grind the stump. For example, in one embodiment, the first drum is movable with respect to the frame, and the apparatus includes at least one pivot arm having one end pivotally coupled with the frame and a second end coupled with the first drum. In this way, rotation of the pivot arm moves the first drum between the first and second positions. In one embodiment, the first drum includes at least one blade or carbide teeth adapted to cooperate with the anvil surface to chip the loose tree parts when in the first position. An attachment member may be removably coupled to the first drum and include a plurality of teeth configured to grind the stump when the first drum is in the second position. The plurality of teeth may also be configured to grind loose tree parts when in the first position. When the attachment member is coupled to the first drum, at least a portion of the teeth is positioned radially outward of the at least one blade. Alternatively, the blades may be removed prior to coupling of the attachment member. In a further alternative embodiment, the first drum includes a plurality of teeth adapted to grind one of the loose tree parts or the stump when in the first and second positions respectively. An attachment member may be removably coupled to the first drum and include at least one blade configured to chip the loose tree parts when the first drum is in the first position. When the attachment member is coupled to the first drum, at least one blade is positioned radially outward of the teeth.

In a further embodiment, the apparatus may include a second rotatable drum carried by the frame. The first drum may be configured to operate in one of the first or second mode and the second drum may be configured to operate in the other of the first or second mode. The first and second drums may include link mechanisms (e.g., belts or couplings) configured to drive each of the drums directly from an engine. Alternatively, a fluid power transmission system may be used. The first and second drums may additionally include an engagement mechanism configured to allow selective rotation of the first and second drums using the engine. Moreover, the apparatus may be configured such that the second drum (e.g., slave drum), for example, is driven by the first drum (e.g., master drum).

In yet another embodiment, an apparatus for handling wood products includes a frame supported at least in part by a ground surface, an anvil surface coupled to the frame, and a rotatable drum carried by the frame and movable relative thereto between a first position wherein the drum is adjacent the anvil surface and configured to chip or grind loose tree parts, and a second position wherein the drum is spaced from the anvil surface and configured to grind a stump in the ground.

A method of handling wood products includes, in one embodiment, providing a rotatable drum configured to operate with an anvil surface in a first mode for chipping or grinding loose tree parts, and further configured to operate in a second mode for grinding a stump in the ground. The apparatus may be configured to operate in the first mode by positioning the drum in spaced relation to the ground such that the ground does not obstruct rotation of the drum. The apparatus may then be used to chip or grind the loose tree parts. The apparatus may be further configured to operate in the second mode by positioning the drum adjacent the ground. The apparatus may then be used to grind the stump. The method may further include coupling an attachment member to the drum for chipping and/or grinding the wood products. Additionally, the chipped or ground wood products may be collected using the movement (e.g., rotation) of the drum. Moreover, the chipped or ground wood products may be directed into an outlet chute and delivered into a collection bin to facilitate the handling thereof.

In still a further embodiment, an apparatus for handling wood products includes a frame supported at least in part by a ground surface, a rotatable drum carried by the frame, and a shroud disposed about the rotatable drum. The shroud includes a first configuration wherein the shroud substantially encloses the rotatable drum. The shroud also includes a second configuration wherein at least a portion of the drum is exposed so as to allow processing of the wood products. In one embodiment, the shroud includes a first shroud portion and at second shroud portion, wherein at least one of the first and second shroud portions is movable relative to the other so as to move the shroud between the first and second configurations. By way of example, in one exemplary embodiment, the second shroud portion is configured to be retractable over the first shroud portion to thereby expose the rotatable drum.

In yet a further embodiment, an apparatus for handling wood products includes a frame supported at least in part by a ground surface, a rotatable drum carried by the frame, a shroud disposed about the rotatable drum, and a discharge chute having a first position operatively coupled to the shroud. In this position, processed wood products generated by the drum are configured to be transported through the discharge chute for further handling. In one embodiment, the discharge chute includes a bifurcated configuration having at least two outlets. The discharge chute may include a diverter for diverting processed wood products to one of the at least two outlets.

The apparatus may further include a collection hopper. The discharge chute may be configured to discharge processed wood products into the collection hopper when in the first position. In one embodiment, the discharge chute may include a second position operatively coupled to the collection hopper. When so coupled to the collection hopper, processed wood products stored therein are configured to be transported through the discharge chute for further handling thereof. In one embodiment, the apparatus may include a mechanism for moving the discharge chute between the first and second positions. Alternatively, the discharge chute may be moved therebetween through a manual process. An evacuation system may be associated with the collection hopper for causing the process wood products to be transported through the discharge chute. For example, a motor-driven impeller may be in communication with the interior of the collection hopper for generating a vacuum sufficient to cause the movement of the process wood products held therein to move through the discharge chute. To facilitate this process, the collection hopper may include a tiltable floor for direction the process wood products toward the impeller.

While the efficiency and cost savings of a unitary piece of equipment will be readily understood by such professionals, the initial cost of such a machine may be more than the cost of any one of conventional specialized apparatus. Recognizing that all components of the machine could result in a cost exceeding the budgets of some purchasers, certain embodiments of the apparatus disclosed herein are designed so that additional functionality can be selectively added to the apparatus to accommodate a tree care organization's changing needs and budgets.

Further, the apparatus disclosed herein obviates the need to haul multiple devices to a job site, each only capable of performing a specific function. Specifically, a user could instead bring a single apparatus to the job site capable of performing multiple functions for removing and/or maintaining a tree. Certain specific embodiments, moreover, have the versatility to permit the selective attachment of secondary components to provide the apparatus the capability to perform additional functions. In specific embodiments, moreover, the specific equipment required to execute the various functions can be modular. An embodiment of the invention, for example, includes a mobile chassis designed to accept a plurality of attachments that are powered by a motor also powering the mobile chassis, with the attachments being capable of performing a multitude of functions necessary in a tree-removal and/or tree-maintenance operation. In another embodiment the attachments could be powered by a secondary motor. This mobile chassis designed to accept such attachments is referred to herein as a wood chipper. However, this wood chipper is not intended to be functionally limited to chipping, but instead encompasses the multitude of functions necessary in a tree-removal and/or tree-maintenance operation. By way of example, the wood chipper may include a wood grinder as an alternative to chipping as per the industry's traditional definition of chipping or may be a grinder exclusively as per the industry's traditional definition of grinding.

The mobile wood chipper may also have lifting arms, which in some embodiments are removable, and which in some embodiments are hydraulically powered. In other embodiments, the lifting arms are incorporated into the chassis and are not removable. The lifting arms may have, at their respective operating ends opposite the wood chipper, a universal attachment plate. The plate permits secondary apparatus having a receiving plate to be carried by the wood chipper. Moreover, the wood chipper may include hydraulic or mechanical controls configured to control operation of such secondary apparatus carried by the wood chipper.

The secondary apparatus may include, for example, a stump grinder, a vacuum-assisted collection hopper or a hydraulically tiltable collection hopper. The lifting arms assist the operator in several ways. For example, with a man bucket attached, the ability to selectively raise the lifting arms allows the operator convenient access to otherwise unreachable parts of the tree. Further, the lifting arms or collection hopper function as a carrier for other tree work-related equipment such as a chain saw, a fork-type carrier assembly, a stump grinder or a powered lift, for example.

When the branches of the tree are on the ground, they can be fed into the wood chipper and the chips can be deposited into a hopper, which rests on a support assembly carried by the lifting arms or frame. When the largest limbs and trunk have been dropped onto the ground, a fork-type carrier assembly, supported by the lifting arms or frame, can transport logs that are too large to manually carry and eliminate the need for a secondary transport machine. Further, the apparatus's design and operation are configured to minimize damage to surrounding lawn and pavement surfaces. In this regard, for example, the apparatus may be configured to control the falling direction of the largest tree sections when these are attached to a rope.

Although the wood chips generated from feeding branches into a conventional wood chipper can be immediately directed into a hopper, wood chips generated by a conventional stump grinder typically remain on the ground. In some embodiments of the invention, the apparatus includes a hopper that can then be used to remove the stump wood chips from the ground. In one specific embodiment, for example, a hopper is pivotable and includes a leading edge such that when the hopper is tilted, the leading edge is adjacent to the ground. The wood chipper is then driven into the wood chips and these are engaged by the leading edge and scooped into the hopper. In an alternative embodiment, the hopper is attached to the machine at a point just to the rear of the arms' operating ends. In this configuration, the hopper is tilted so that the leading edge is adjacent the ground and so that wood chips and other debris thrown from rotation (e.g., clockwise) of a stump grinder attachment are received within an interior of the hopper.

Another alternative hopper design has a vacuum hose attachment incorporated into the hopper or alternatively, the frame. The mobile wood chipper is moved into position close to a pile of wood chips and the wood chips are vacuumed into the hopper with the hose attachment. Another alternative design includes a vacuum or sweeper system placed on the forward facing portion of the hopper adjacent the ground so that it is in fluid communication with the interior of the hopper. The mobile wood chipper is then driven to the pile of wood chips and the vacuum or sweeper directs the wood chips into the interior of the hopper.

More specifically, in one embodiment, an apparatus for handling wood products (e.g., a wood chipping apparatus) is provided. The apparatus has a main portion that includes, in certain embodiments, a power source for moving the apparatus relative to the ground. A lifting arm extends from the main portion and is configured to be selectively raised and lowered, and has a coupling element. The apparatus also has a stump grinder that is releasably coupled to the lifting arm through the coupling element and is configured to grind a tree stump. The lifting arm may be releasably coupled to the main portion. Additionally or alternatively, the lifting arm may be powered by the power source that moves the apparatus relative to the ground.

The power source, in specific embodiments, includes a hydraulic motor. The coupling element may include a skid steer loader-type universal coupling plate. The lifting arm may be coupled to a first end of the main portion, and the apparatus may include a chipping apparatus in the main portion and an infeed table for feeding material into the chipping apparatus and which is located at a second end of the main portion, opposite the first end of the main portion. The lifting arm in that embodiment may be configured to extend over the in-feed table.

In another specific embodiment, a secondary attachment is configured for selective coupling with the lifting arm in place of the stump grinder. The secondary attachment may, for example, include a collection hopper, a fork-type support, a telescoping arm, or a clamp-and-cutting assembly. In embodiments including a hopper, the same may include a vacuum-and-hose assembly that is coupled to an interior of the hopper and which is operable to collect material from the ground and direct the same into the interior of the hopper. Additionally or alternatively, the collection hopper may include a vacuum and a suction bar that extends along a front edge of the hopper for engaging material on the ground. The collection hopper may be coupled to the lifting arm so as to be selectively tiltable relative to the main portion.

In another embodiment, a wood chipping apparatus is provided. The apparatus includes a main body having first and second opposite ends, and first and second wheels. The first wheel is located at the first end, and rotation of this first wheel is configured to chip or grind wood. The second wheel is coupled to the second end of the main body, and rotation of this wheel is configured to grind tree stumps. The apparatus may include a power source for moving the apparatus relative to the ground, and the power source may be configured to provide power to rotate the first or second wheel. The apparatus may include a collection hopper in communication with the first or second wheel and positioned to receive wood chips generated by the grinding of tree stumps or chipping of tree limbs. The collection hopper may be coupled to other portions of the apparatus so as to be tiltable.

In a specific embodiment, the hopper includes a bottom wall that is configured to engage the ground and a leading edge element that extends upward from the bottom wall to scoop wood chips from the ground upon movement of the bottom wall along the ground. The hopper may, additionally or alternatively, include a vacuum device that is in fluid communication with an interior of the hopper, and a suction element along an edge of the bottom wall and which is in fluid communication with the vacuum device. The suction element in this embodiment is configured to direct wood chips from the ground into the interior of the hopper. The apparatus may include a chute that is in fluid communication with an interior of the hopper and a vacuum impeller in the chute which is actuatable to direct wood chips from the interior of the hopper.

In one embodiment of the invention, a boom lift is designed to function with various types of heavy machinery. It is comprised of two main parts: a primary body and a secondary body. The primary body includes an attachment for use in tree removal and/or tree maintenance, and can be detached from the secondary body and united with a smaller machine. Furthermore, the primary body of the boom may permit improved access to portions of a tree that would otherwise be more difficult for such removal and/or maintenance. By way of example, this attachment may include a basket for an operator to reside or an operable cutting device. When united with the smaller machine, the primary body still retains full functionality. The secondary body can also be detached if needed and coupled, for example, to a machine or vehicle.

In yet another embodiment, a lifting apparatus is provided. The apparatus includes a primary body that has a support for supporting a person, and a secondary body. A releasable coupling provides selective coupling between the primary and secondary bodies. The lifting apparatus has (a) a first condition in which the primary body is coupled to the secondary body, and (b) a second condition in which the primary body is not coupled to the secondary body, and is configured to be releasably coupled to a vehicle.

The primary body may include a coupling plate that is configured to provide a releasable coupling between the primary body and a second vehicle. The releasable coupling between the primary and secondary bodies may include a pin that is received within corresponding holes in the primary and secondary bodies. Alternatively or additionally, the releasable coupling between the primary and secondary bodies may include a magnetic coupling that is automatically or selectively actuatable to prevent movement of the primary and secondary bodies relative to one another.

In a specific embodiment, the apparatus has a gear-track and gear device or "rack and pinion" device that is automatically or selectively actuatable to move the lifting apparatus from the first condition toward the second condition. The rack and pinion device may provide sliding movement of the primary body while maintaining the secondary body relatively static so that the primary body can be positioned for coupling to a second vehicle. For example, this sliding movement can be such that the primary body's center of gravity changes, thus allowing the end with the attachment plate to be pivoted downward with less force and thereby facilitating its coupling to a second vehicle. Further, sliding the primary body relative to the generally static secondary body distances the primary body from the truck, allowing the receiving plate end to be more easily attached to a secondary element such as the receiving plate end on a second vehicle, which may or may not include the intermediate device discussed herein. The support in the primary body may include a bucket.

In other situations in which it is desirable to attach the primary body to a second vehicle, an intermediate device may be used between a coupling plate on the primary body cooperating with a fixed or rotatable coupling plate on a side of the intermediate device and the intermediate device coupled to a second vehicle by means of yet another coupling device on another side, such as the rear side of the intermediate device, for example, and where the coupling plate cooperates with the coupling plate on the second vehicle. The intermediate device may include a ground-engaging support component such as a skid plate, tracks, or wheels. The intermediate device allows the transport of a primary body by a second vehicle which, absent the intermediate device, would not have a load-bearing capacity sufficient to support the weight of the primary body.

The secondary body may include a magnetic mounting element that is configured for coupling the secondary body to a transport vehicle, with the magnetic coupling element being selectively or automatically actuatable to prevent movement of the secondary body relative to the transport vehicle. The primary body may include a telescoping member for extending the effective length of the primary body. In a specific embodiment, the apparatus further includes a tertiary body, with the primary, secondary, and tertiary bodies being coupled to one another so as to permit folding of each of the bodies relative to one another.

In yet another embodiment, a lifting system is provided. The system includes a transport vehicle, a primary body having a support for supporting a person, and a secondary body that is supported by the transport vehicle, and which is releasably couplable to the primary body. The lifting system has (a) a first condition in which the primary body is coupled to the secondary body, and (b) a second condition in which the primary body is not coupled to the secondary body and is configured to be releasably coupled to a second vehicle.

In another embodiment, a lifting system is provided. The system includes a first vehicle, a second vehicle releasably couplable to the first vehicle, and a primary body that has a support for supporting a person. A secondary body is supported in the first vehicle and is releasably couplable to the primary body. The lifting system has (a) a first condition in which the primary body is coupled to the secondary body, and (b) a second condition in which the primary body is not coupled to the secondary body, and is releasably coupled to the second vehicle.

These and other objects, advantages and features of the invention will become more readily apparent to those of ordinary skill in the art upon review of the following detailed description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIGS. 24 and 25 are sectional cut away perspective views showing operation of the diverter vane within the chip discharge chute in accordance with an alternative embodiment.

DETAILED DESCRIPTION

Figure 1:
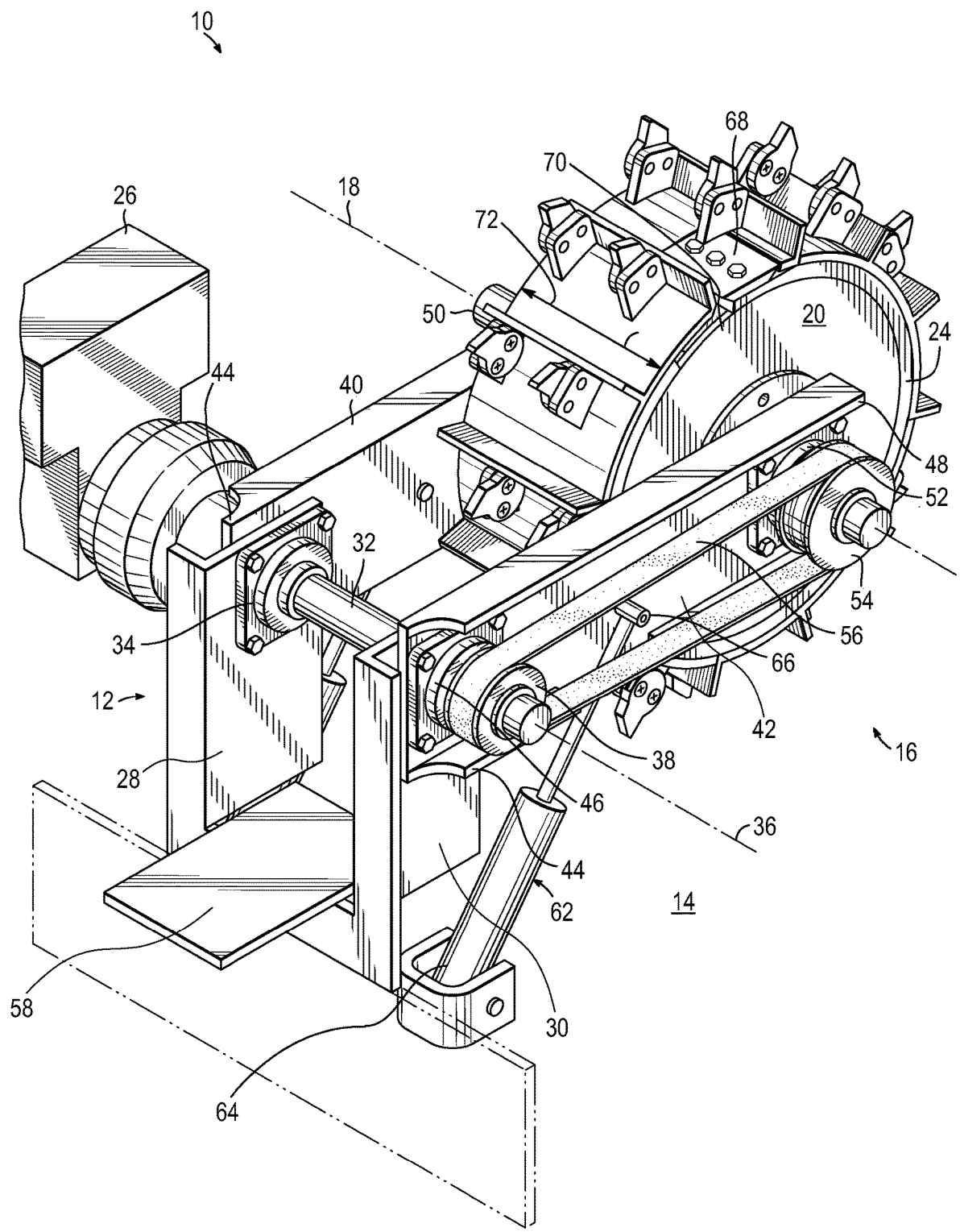
FIG. 1 is an apparatus for handling wood products in accordance with one embodiment of the invention.

Referring now to the figures, and to FIG. 1 in particular, an exemplary apparatus 10 for handling wood products, such as branches, bushes, trees, brush, and other fibrous materials is shown. By way of example, apparatus 10 may be particularly adapted to handle loose tree parts, including branches, trunks, leaves, etc. that are loose or otherwise separated from the ground, as well as the stump which remains in the ground. Apparatus 10 includes a frame 12 that is supported at least in part on the ground 14. As recognized by those of ordinary skill in the art, the frame 12 may take a wide variety of forms. For example, the frame 12 may be incorporated into a stand-alone tool or implement, which may in turn be removably coupled to a vehicle, such as a tractor, truck, backhoe, etc. (not shown). Alternatively and as generally illustrated in FIG. 10 and again in more detail in FIGS. 11-30, the frame 12 may form part of a chassis of a vehicle capable of moving over the ground 14. Accordingly, the frame 12 is not limited to any application-specific implementation of features of the invention, but encompasses a broad range of support structures for supporting the components for processing the wood products, as discussed below.

In one aspect of the invention, the wood handling apparatus 10 includes a processing device coupled to frame 12 capable of operating in multiple modes for processing wood products. In an exemplary embodiment, the processing device is capable of operating in a first mode in which the processing device is configured to chip or grind the wood products, such as loose tree parts. The processing device is further capable of operating in a second mode in which the processing device is configured to grind wood products, such as the stump. As used herein, chipping refers to processing a wood product by supporting the wood product on a working surface of a fixed plate or anvil (referred to herein as an anvil surface) and contacting the wood product with the anvil surface in a manner that separates a portion of the wood product. It should be understood that the above reference to a fixed plate or anvil refers to its position at the time of use. During use, the anvil may be adjusted so that the drum, in differing positions while operating, does not damage the anvil. Thus, the anvil may be spaced appropriately so that the grinding or chipping is done properly. The anvil may travel along a fixed path such as a track in order to be set by the operator at a desired position. Grinding, on the other hand, refers to processing a wood product by contacting the wood product with one or more contacting elements, with or without support from an anvil surface, so as to pulverize or grind the wood product.

The distinction between chipping and grinding is clearly recognized in the industry and is particularly apparent in tree disposal applications. As explained above, the above-grade portion of the tree is usually, but not always, disposed of through a chipping or grinding process due to the ability to feed the wood products to an apparatus so as to support the wood products on an anvil surface that is in proximity to the contacting elements. The stump portion of the tree, however, is located in the ground and therefore grinding thereof is not conducive to support by an anvil surface adjacent a contacting element. From a logistical standpoint, it is impractical to dispose of a stump through a chipping process. For this reason, loose tree parts generated from urban tree care work, for example, have traditionally been disposed of by a chipping or grinding process and stumps have traditionally been disposed of by a grinding process. Due to the differences between the chipping and grinding processes, separate apparatus have been provided for each type of process. One aspect of the invention, however, is to provide a process and apparatus capable of selectively chipping and grinding within a single apparatus. Such an apparatus could produce chips or grindings suitable for alternative uses, such as bio fuels for example.

To this end, the processing device may include at least one rotatable drum configured for both chipping and grinding wood products. In particular, and in one embodiment of the invention, the apparatus 10 includes a drum 16 coupled to frame 12 in a manner to permit rotation of drum 16 about a central axis 18. The drum 16 may be generally cylindrical having opposed end walls 20, 22 and a peripheral sidewall 24 connecting the two end walls 20, 22. The drum 16 may be coupled to an engine, shown schematically at 26, for rotating the drum 16. A wide variety of engines may be used for rotating the drum 16. For example, the engine 26 may be an internal combustion engine coupled as the prime mover for a hydraulic fluid power system, an internal combustion engine as the prime mover for a directly coupled mechanical power transmission system, or other type of engine recognized by those of ordinary skill in the art, which is capable of providing sufficient power for rotating the drum 16.

Figure 2:
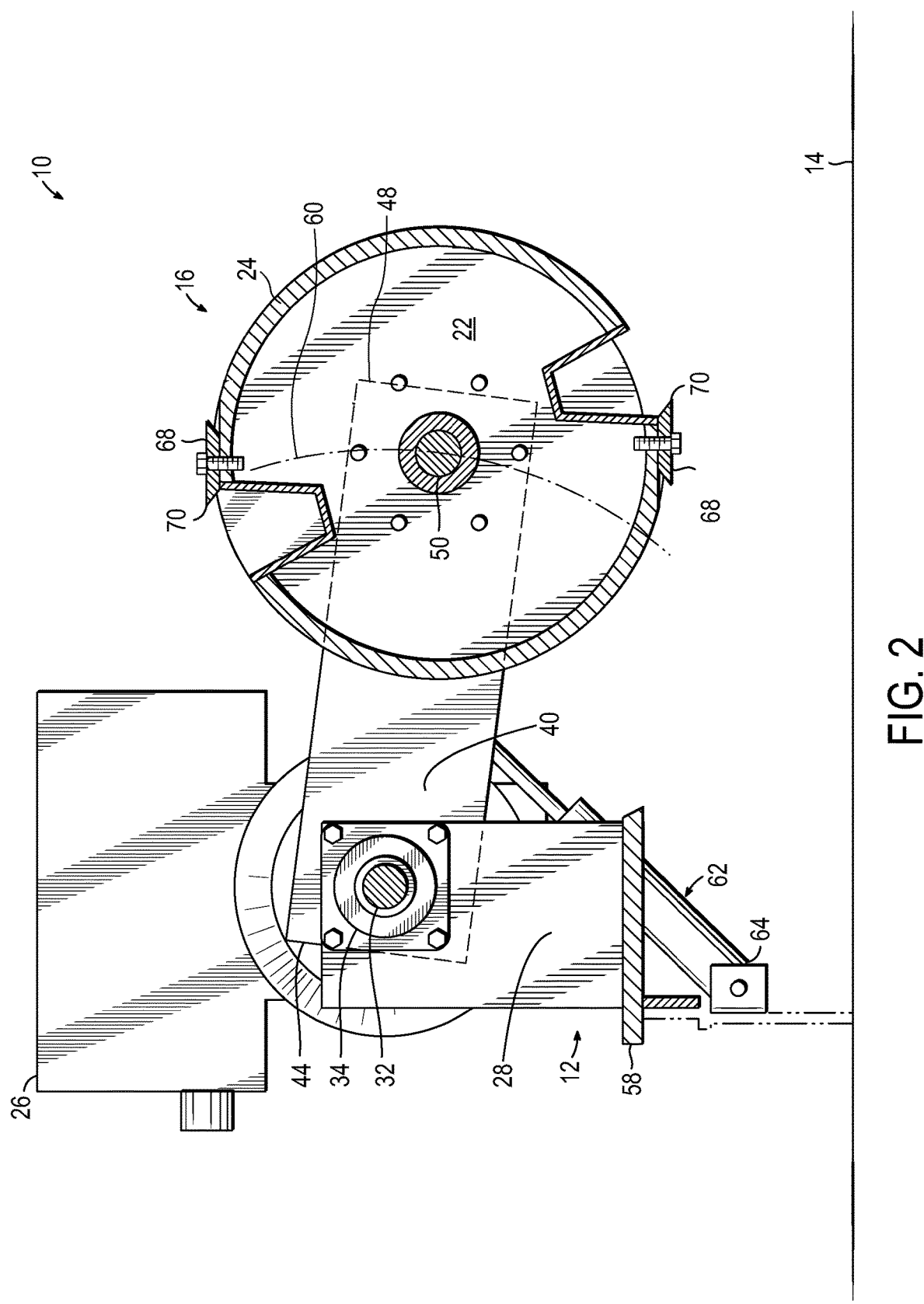
FIG. 2 is a cross-sectional view of the apparatus of FIG. 1 with the drum configured for chipping.
Figure 3:
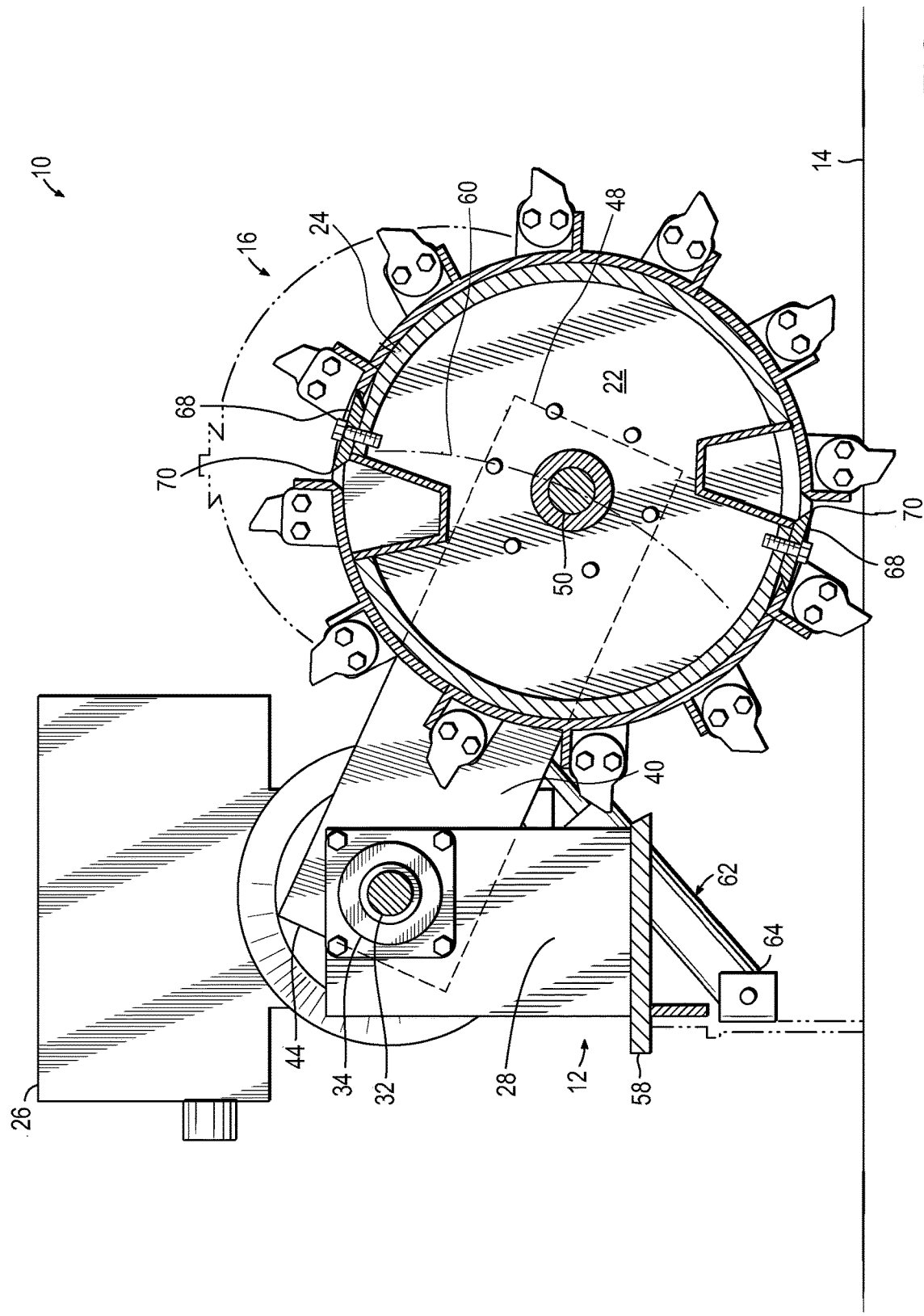
FIG. 3 is a cross-sectional view of the apparatus of FIG. 1 with the drum configured for grinding.

As shown in detail in FIGS. 1-3, in one embodiment, the frame 12 may include two spaced-apart upstanding studs 28, 30 having apertures (not shown) adapted to receive a first drive shaft 32 coupled to engine 26. The studs 28, 30 may include a bushing 34 having bearings for supporting the first drive shaft 32 in the apertures. The engine 26 rotates the first drive shaft 32 about a central axis 36 that may, for example, be generally parallel to the axis 18 about which the drum 16 rotates. The first drive shaft 32 may include a pulley 38 coupled thereto, the purpose of which is described in more detail below, which rotates with rotation of the first drive shaft 32. The frame 12 may further include at least one arm, and preferably a pair of arms 40, 42 positioned adjacent studs 28, 30, respectively, and each having a first end 44 with an aperture (not shown) adapted to receive first drive shaft 32. The first end 44 of the arms 40, 42 may also include a flange bearing 46 for supporting the first drive shaft 32 in the apertures of the arms 40, 42. Although the first end 44 of arms 40, 42 are shown coupled to first drive shaft 32, the first end 44 may be coupled to frame 12, such as at studs 28, 30.

A second end 48 of each of the arms 40, 42 includes an aperture (not shown) adapted to receive a second drive shaft 50 that aligns with central axis 18 and to which drum 16 is rotatably coupled. The second end 48 of the arms 40, 42 may also include a bushing 52 having bearings for supporting the second drive shaft 50 in the apertures of the arms 40, 42. Second drive shaft 50 also includes a pulley 54 coupled thereto, the purpose of which is described in more detail below, which rotates with rotation of the second drive shaft 50. To transfer the power generated by engine 26 to the second drive shaft 50, which carries the drum 16, the apparatus 10 may include a first link mechanism, such as belt 56, that couples pulley 38 on first drive shaft 32 to the pulley 54 on the second drive shaft 50. In this way, rotation of the first drive shaft 32 by engine 26 drives the second drive shaft 50 so as to rotate the drum 16 about central axis 18.

Figure 10:
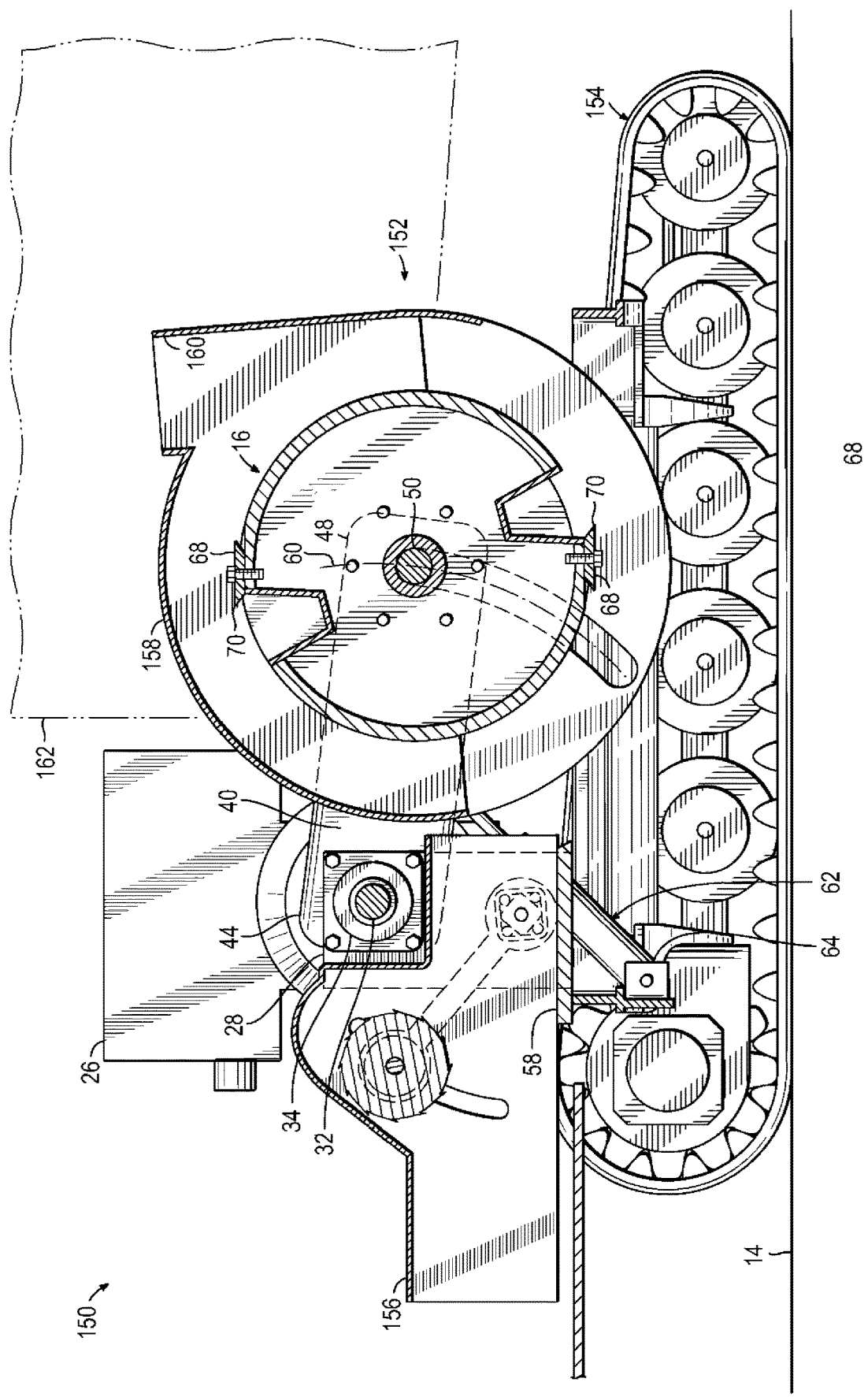
FIG. 10 is an exemplary embodiment of a vehicle incorporating an apparatus for handling wood products therein.

In one aspect of this apparatus, the drum 16 is movable between a first position, in which the drum 16 is positioned to chip or grind wood products, such as loose tree parts, and a second position, in which the drum 16 is positioned to grind a stump in the ground. When the drum 16 is in the first position, the drum 16 may be positioned near an outlet of a feed chute assembly coupled to frame 12 (not shown in FIGS. 1-3), and is generally spaced from the ground 14 by a sufficient amount so as to allow the drum 16 to freely rotate without any obstruction from the ground 14. For example, the embodiment shown in FIG. 10 illustrates an exemplary feed chute assembly for feeding wood products to the drum 16. Additional details of the feed chute assembly are shown in FIGS. 13-15, 17, 30, and 31. The feed chute assembly generally includes a rigid plate member or anvil defining an anvil surface 58 that may be positioned adjacent the peripheral sidewall 24 of drum 16. During use, the anvil surface 58 may be adjusted so that the drum 16, in differing positions while operating, does not damage the anvil surface 58. Thus, the anvil surface 58 may be spaced appropriately so that the grinding or chipping is done properly. The anvil surface 58 may travel along a fixed path, such as a track, in order to be set by the operator at a desired position. In this way, the anvil surface 58 and drum 16 may cooperate to chip or grind the loose tree parts or other wood products when the drum 16 is in the first position. FIG. 2 illustrates the position of the drum 16 relative to the anvil surface 58 and ground 14 when in the first position.

The drum 16 may be selectively movable from the first position to a second position in which the drum 16 is positioned to grind the stump. By way of example, the drum 16 may be moved to a second position proximate the ground 14 and away from anvil surface 58 so as to, for example, grind the stump (not shown). In one embodiment, the frame 12 may be moved relative to the ground 14, but remain fixed with respect to the drum 16, so as to position the drum 16 proximate the ground 14 for grinding the stump. For example, the frame 12 may be movable relative to wheels, tracks, or other types of structures that support the frame 12 relative to the ground 14. In other words, the entire frame 12 may be moved relative to the ground 14 to position the drum 16 proximate the ground 14.

In an exemplary embodiment, however, the drum 16 may be movable with respect to the frame 12 so as to position the drum 16 proximate the ground 14. In other words, the frame 12 as a whole does not move relative to the ground 14, but the drum 16 is moved so as to position the drum 16 proximate the ground 14. To this end, the first end 44 of arms 40, 42 may be pivotally coupled to the first drive shaft 32 (or studs 28, 30) so that the arms 40, 42 are free to rotate about central axis 36. Because the drum 16 is coupled to the second end 48 of arms 40, 42, the drum 16 is movable along a generally arcuate path 60 defined by the rotation of arms 40, 42 around central axis 36. FIG. 3 illustrates the position of the drum 16 relative to the ground 14 when in the second position.

As shown in FIG. 2, when the drum 16 is in the first position, the drum 16 is positioned adjacent anvil surface 58 and spaced from the ground 14 so as to permit the apparatus 10 to chip or grind the loose tree parts. As shown in FIG. 3, when the drum 16 is in the second position, the arms 40, 42 have been rotated about central axis 36 so that the drum 16 has been moved toward the ground 14. In this position, the drum 16 may effectively grind the stump in the ground 14.

The frame 12 may further include at least one, and preferably a pair of lifts 62 for rotating the arms 40, 42 about central axis 36, and consequently, move drum 16 between the first and second positions. In one embodiment, each lift 62 may be a hydraulic lift having a first end 64 coupled to the frame 12 and a second end 66 coupled to a respective arm 40, 42. By extending and retracting the lifts 62, the arms 40, 42 rotate about the central axis 36 to move the drum 16 between the first and second positions. Those of ordinary skill in the art will recognize other types of lifts for rotating the arms 40, 42 and the invention is not limited to the particular lifts shown and described herein.

The drum 16 may not only be selectively positioned depending on whether a chipping operation and/or a grinding operation is being used to process the wood products, but drum 16 may also be modified in a manner that enhances the particular operation being conducted. The drum 16 generally includes one or more contacting elements that facilitate processing the wood products. The type of contacting elements may vary depending on the type of processing operation being conducted. As shown in FIG. 2, in one embodiment, the drum 16 includes at least one blade 68 coupled to the peripheral sidewall 24 and includes a sharpened edge 70 adapted to contact the wood products. The drum 16 and/or the anvil surface 58 may be positioned so that the blade 68 is slightly spaced or offset from an edge of the anvil surface 58 such that as wood products are inserted into the feed chute assembly, and as the blade 68 passes by the anvil surface 58, the wood products are reduced to small wood chips.

Figure 6:
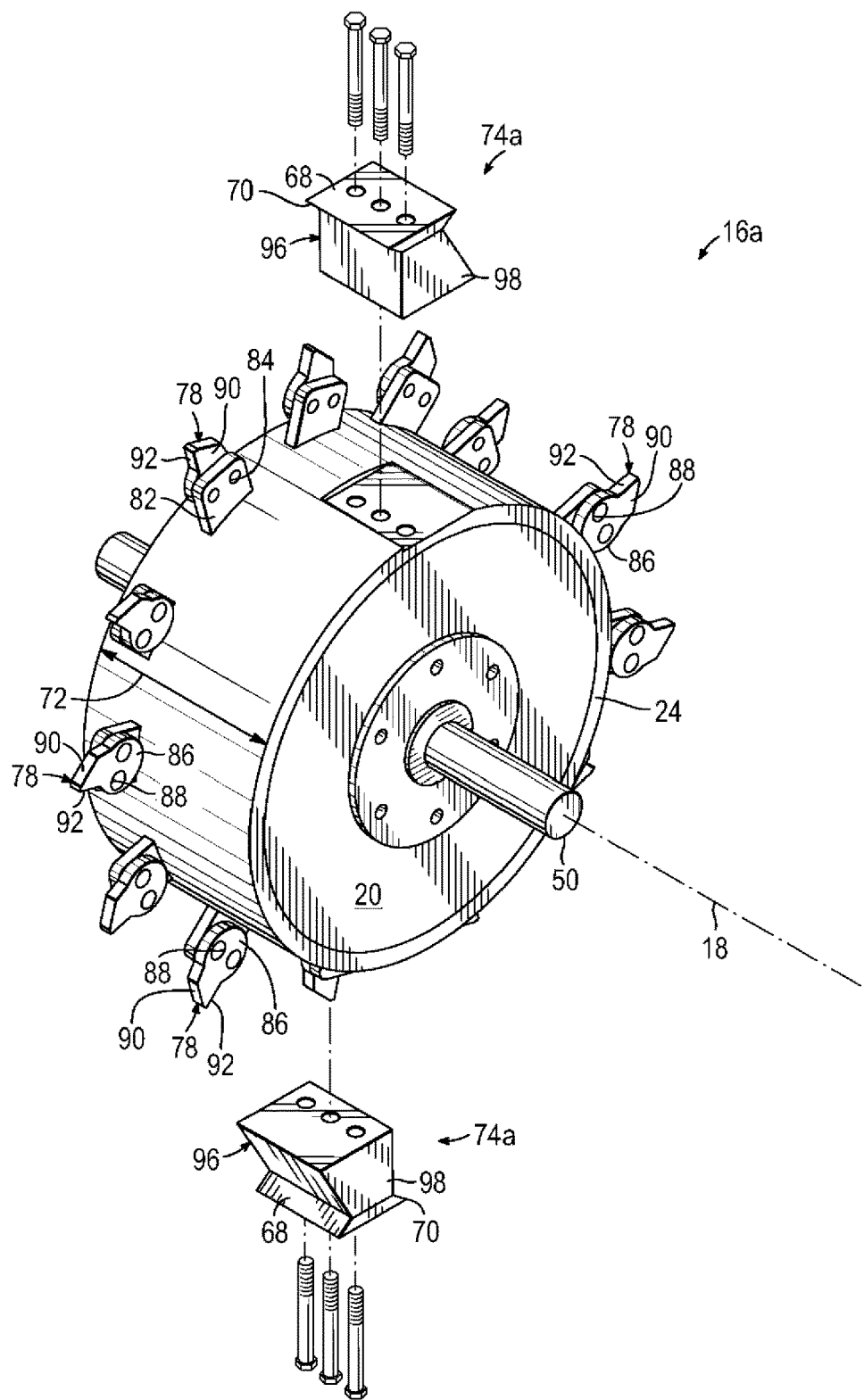
FIG. 6 is a perspective disassembled view of a drum in accordance with an alternative embodiment of the invention.

The blade or blades 68 may each extend the width 72 of the sidewall 24. Alternately, the blade(s) 68 may extend for a portion of the width 72 of the sidewall 24 (as shown in FIGS. 1 and 6). In one embodiment, for example, the drum 16 may include two opposed blades 68 on sidewall 24 wherein the first blade extends for a first portion of the width 72 of sidewall 24 and the second blade extends the remaining portion of the width 72 such that the entire width 72 has a portion of a blade 68 associated therewith. Those of ordinary skill in the art will recognize that more than two blades 68 may be used to span the width of sidewall 24 and be within the scope of the invention.

When the drum 16 is in the first position and the apparatus 10 is to be used for chipping, the drum 16 having the blades 68 as shown in FIG. 2 may be used. When it is desired to use the apparatus 10 for grinding instead of chipping wood products, the drum 16 may be moved to the second position as described above, e.g., rotation of arms 40, 42 using lifts 62. Before commencing grinding of wood products, however, the drum 16 may be further configured for the grinding process. Due to the differences between a chipping process and a grinding process, the mechanical loads imposed on the contacting elements of the drum 16 with the wood products are typically very different for the two processes. In particular, because grinding essentially pulverizes the wood products, the loads imposed on the contacting elements during grinding are significantly higher as compared to chipping. For this reason, while the blades 68 described above may be suitable for chipping, the blades 68 may not be suitable for grinding. Moreover, a grinding process using blades 68 may damage the blades rendering them useless in any subsequent chipping processes and requiring replacement. Consequently, it may be desirable to provide contacting elements for the drum 16 more suitable for the grinding process.

Figure 4:
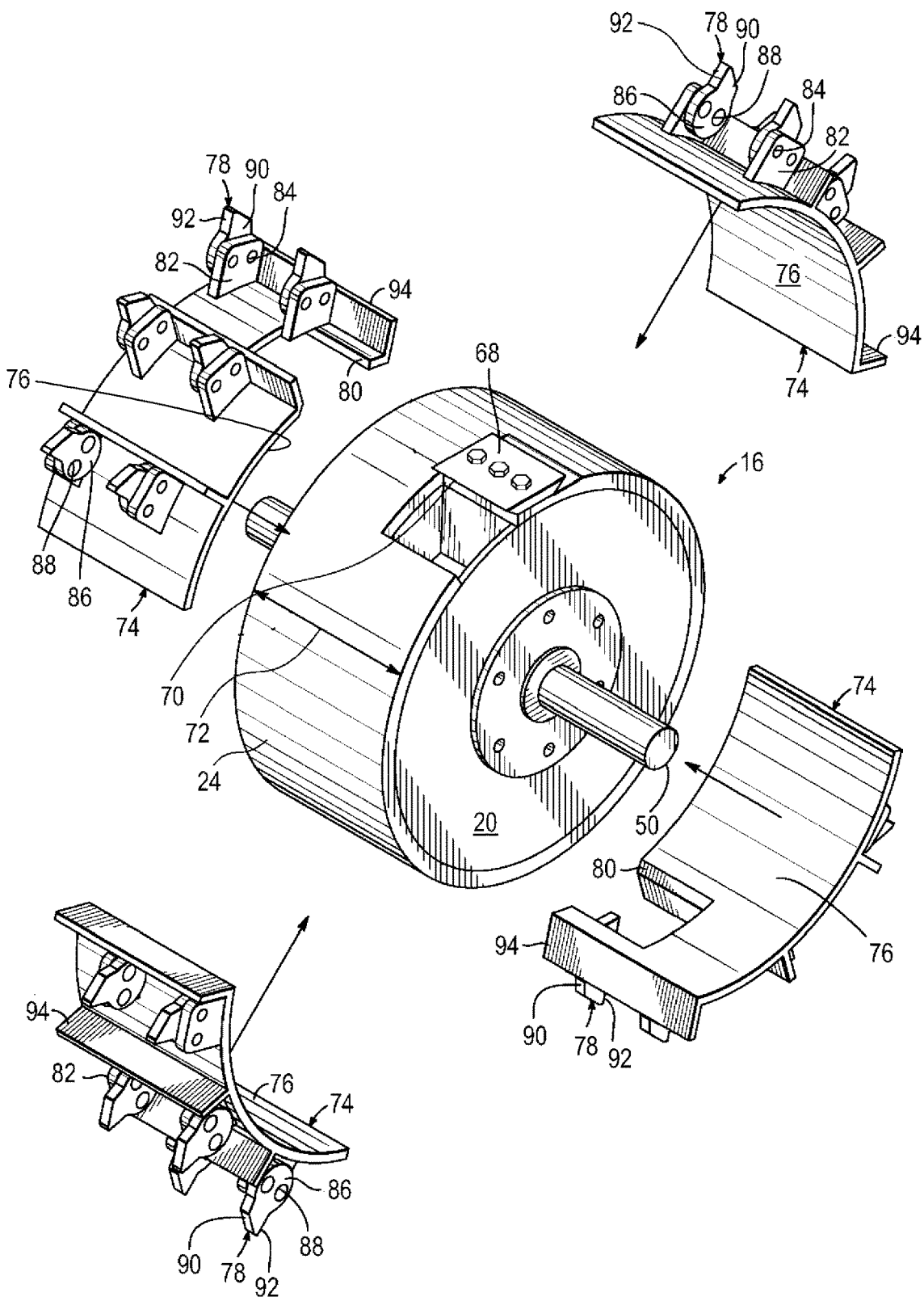
FIG. 4 is a perspective disassembled view of a drum in accordance with one embodiment of the invention.
Figure 5:
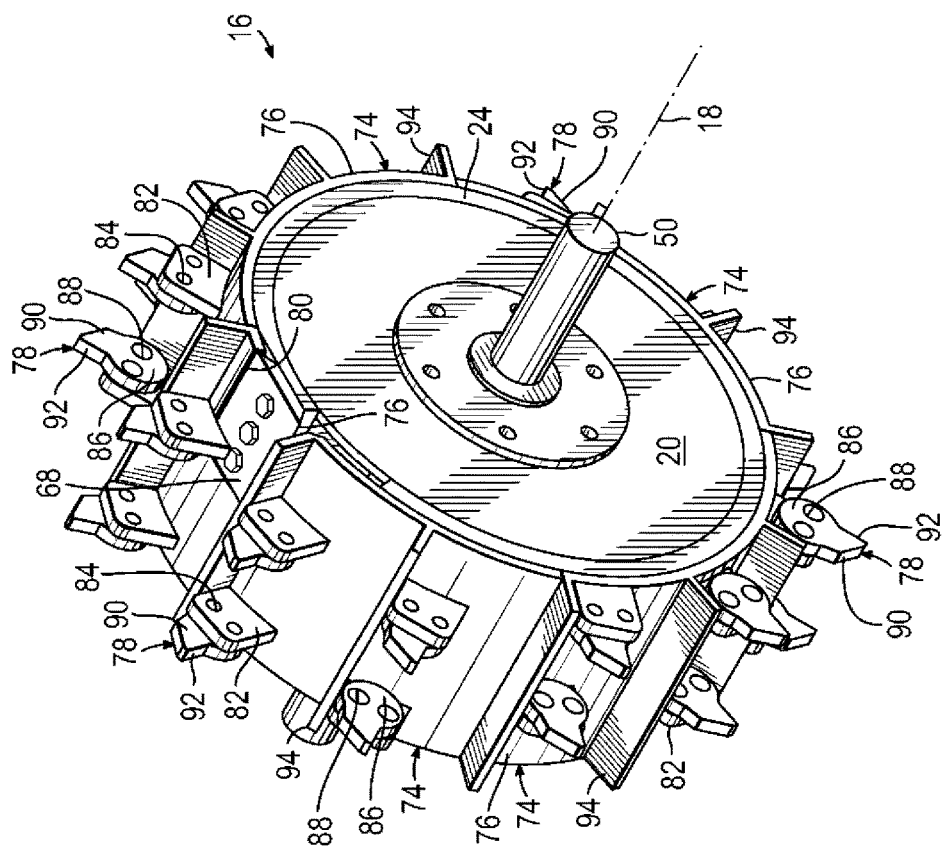
FIG. 5 is a perspective assembled view of the drum shown in FIG. 4.

To this end, and as shown in FIGS. 4 and 5, the apparatus 10 may further include an attachment member 74 adapted to be removably attached to the drum 16 to provide more suitable contacting elements for grinding processes. The attachment member 74 may include at least one plate 76 carrying a plurality of teeth 78 configured to withstand the increased mechanical loads imposed during grinding processes. By way of example, the teeth 78 may be carbide teeth or other hardened materials as recognized by those of ordinary skill in the art. In one embodiment, as shown in FIG. 4, the attachment member 74 may include four plates 76 with each plate carrying a plurality of teeth 78. Each plate 76 has an arcuate shape so as to substantially correspond to the shape of a portion of the sidewall 24 and may be coupled to the drum 16 with suitable fasteners, such as bolts (not shown). Certain plates 76 may include a cutout 80 so as to accommodate the blades 68 on drum 16. In this way, the blades 68 do not have to be removed in order to configure the drum 16 for grinding processes. Alternatively, however, the blades 68 may be removed from drum 16 and the formation of cutouts 80 in certain plates 76 omitted.

Each plate 76 includes a plurality of radially-extending tabs 82 in spaced-apart relation on plate 76 to which a tooth 78 is coupled. Each of the tabs 82 includes a threaded bore 84 adapted to receive a threaded fastener for securing the tooth 78 to the tab 82. The teeth 78 include a base portion 86 having one or more apertures 88 through which the threaded fastener extends, and an extending portion 90 projecting radially outward therefrom. Each tooth 78 defines a contacting surface 92 adapted to contact and grind the wood products. Each plate 76 may further include a support flange 94 in contact with one or more tabs 82 on a side of the tab 82 opposite the contacting surface 92. The support flange 94 provides structural support to the tabs 82 without interfering with the operation of the teeth 78 to grind the wood products.

As best shown in FIG. 5, a terminating end of the extending portion 90 of teeth 78 is positioned radially outward of the sharpened edge 70 of blades 68 when the plates 76 are coupled to the drum 16. In this way, the teeth 78 are the operative contacting elements that impact the wood products so as to grind the wood products and prevent damage to the blades 68. Furthermore, the teeth 78 may be arranged on the plates in a wide variety of patterns. For example, the teeth 78 may be circumferentially spaced along sidewall 24 as single teeth (FIG. 6) or in pairs (FIGS. 4 and 5). Typically the teeth 78 are arranged such that in one complete revolution of the drum 16, the width 72 of sidewall 24 will have been covered by at least one pass of a tooth 78. When it is desired to configure the apparatus 10 for chipping again, the plates 76 may be removed to once again expose the blades 68. The drum 16 may then be moved back to the first position adjacent the anvil 58 so that the blades 68 and anvil 58 may cooperate to chip the wood products.

While the embodiment shown and described in FIGS. 4 and 5 has a drum 16 originally configured for chipping, i.e., the blades 68 are the operative contacting elements, and an add-on feature, such as attachment member 74, was used to configure the drum 16 for grinding, i.e., the teeth 78 are the operative contacting elements, the invention is not so limited. In an alternative embodiment, the drum may be initially configured for grinding and an add-on feature used to configure the drum for chipping. The drum 16a shown in FIGS. 6 and 7, in which like reference numerals refer to like features in FIGS. 1-5, is an example of such an embodiment.

The drum 16a includes a plurality of teeth 78 coupled to the peripheral sidewall 24 configured to withstand the increased mechanical loads imposed during grinding. For example, the teeth 78 may be carbide teeth or other hardened materials as recognized by those of ordinary skill in the art. To this end, the drum 16a includes a plurality of radially extending tabs 82 in spaced-apart relation on the sidewall 24 to which a tooth 78 is coupled. Each of the tabs 82 includes a threaded bore 84 adapted to receive a threaded fastener for securing the tooth 78 to the tab 82. The teeth 78 include a base portion 86 having one or more apertures 88 through which the threaded fastener extends, and an extending portion 90 projecting outward therefrom. Each tooth 78 defines a contacting surface 92 adapted to contact and grind the wood products. As noted above, in the embodiment shown in FIGS. 6 and 7, the teeth 78 may be spaced along sidewall 24 so as to have a single tooth at a circumferential location, as opposed to the pair of teeth at each circumferential location as shown in the previous embodiment. Nevertheless, the teeth 78 may collectively cover the width 72 of the sidewall 24 in one complete revolution of the drum 16a.

When the drum 16a is in the first or second position and the apparatus 10 is to be used for grinding processes, the drum 16a having the plurality of teeth 78 as shown in FIG. 6 (prior to the addition of the blades 68) may be used. When it is desired to use the apparatus 10 for a chipping process instead of a grinding process, the drum 16a may be moved to the first position (if in the second position) as described above. In one embodiment, the teeth 78 may be configured to not only grind the wood products when in the second position, but the teeth 78 may also be configured to cooperate with the anvil surface 58 so as to grind the wood products when in the first position. In a further embodiment, the teeth 78 may be configured to grind and chip wood products, e.g., the teeth 78 provide the contacting elements for both the grinding and chipping process. While such teeth capable of performing both the grinding and chipping processes are available, they tend to be expensive and thus may not be cost effective for the owner of such apparatus.

Additionally, while the teeth 78 may successfully be used in cooperation with the anvil surface 58 to chip the wood products when in the first position, the quality of the chipping process may be reduced and the power necessary to chip the wood products may be increased relative to contacting elements configured as a blade. Thus in another embodiment, the drum 16a may be further configured for the chipping process with a modification of blades.

Figure 7:
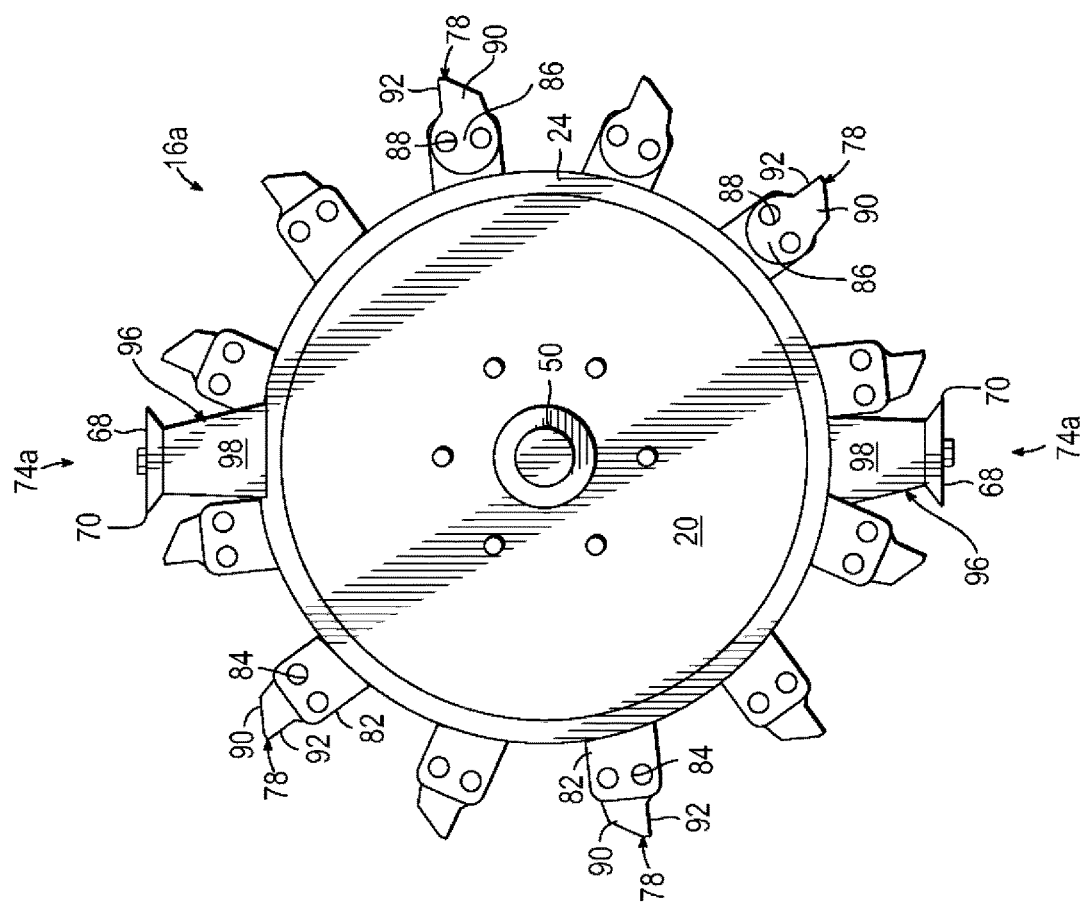
FIG. 7 is a side view of the drum shown in FIG. 6 when assembled.

As shown in FIGS. 6 and 7, the apparatus 10 may further include an attachment member 74a removably coupled to the drum 16a to provide more suitable contacting elements for chipping processes. The attachment member 74a includes at least one blade assembly 96 for chipping the wood products. In one embodiment, the attachment member 74a may include two such blade assemblies 96. Each blade assembly 96 includes a base member 98 coupled to the sidewall 24 and a blade 68 coupled to the base member 98. Suitable fasteners as recognized by those of ordinary skill in the art may be used to secure the base member 98 to the sidewall 24 and to secure the blade 68 to the base member 98. As best shown in FIG. 7, when the blade assemblies 96 are coupled to the drum 16a, the sharpened edge 70 of blade 68 is positioned radially outward of the terminating end of teeth 78. In this way, the blades 68 are the operative contacting elements that impact the wood products so as to chip the wood products and reduce or prevent damage to the teeth 78.

Figure 8:
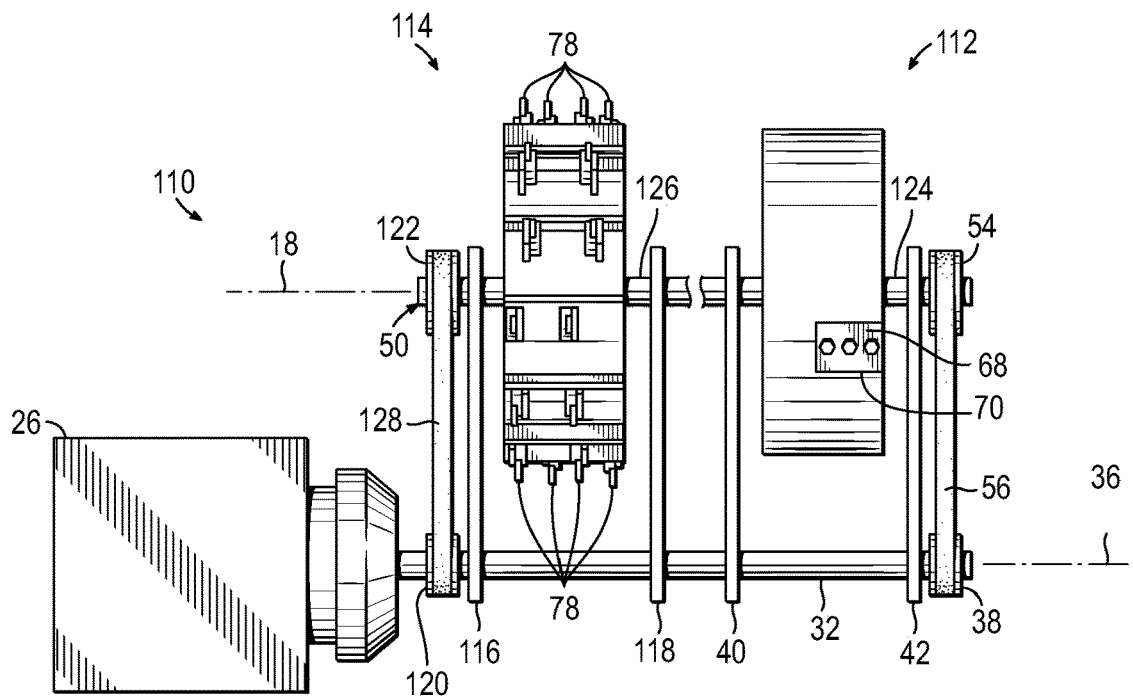
FIG. 8 is a top plan view of an apparatus for handling wood products in accordance with an alternative embodiment of the invention.
Figure 9:
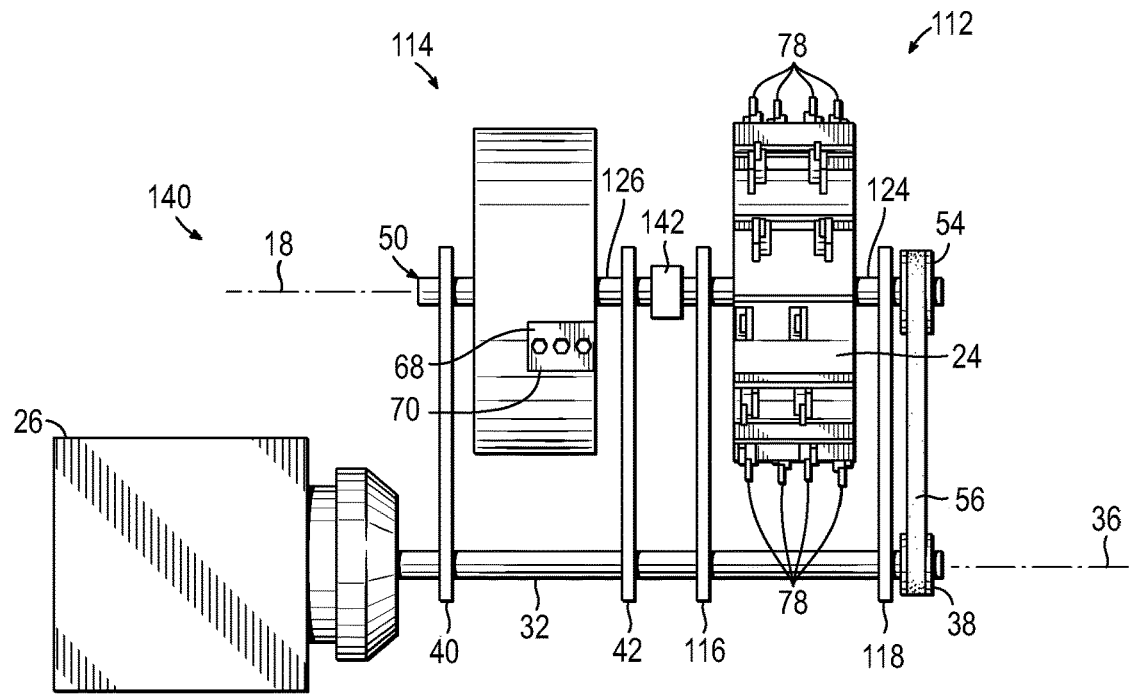
FIG. 9 is a top plan view of an apparatus for handling wood products in accordance with an alternative embodiment of the invention.

While the embodiments shown and described above illustrate a single drum configurable for both the chipping and grinding processes, the invention is not so limited. As shown in FIGS. 8 and 9, in which like reference numerals refer to like features in FIGS. 1-7, the apparatus may include multiple rotatable drums, each performing at least one of the chipping or grinding processes. For example, and as shown in FIG. 8, the apparatus 110 includes a first drum 112 and a second drum 114. For clarity, portions of the frame 12 have been omitted from the figure, but those of ordinary skill in the art will recognize that the apparatus 110 may, like the previous embodiments, include a frame having a wide variety of configurations. In one embodiment, the first drum 112 may be configured for chipping processes and the second drum 114 may be configured for grinding processes, as shown in FIG. 8. Alternatively, the first drum 112 may be configured for grinding processes and the second drum 114 may be configured for chipping processes. Accordingly, the first drum 112 may include at least one blade 68 on sidewall 24 that cooperates with anvil surface 58 (not shown) for chipping wood products such as loose tree parts in the manner described above. Additionally, the second drum 114 may include a plurality of teeth 78 arranged on the sidewall 24 for grinding wood products such as stumps in the manner described above.

As shown in FIG. 8, each of the drums 112, 114 is supported by a pair of arms 40, 42, 116, 118, respectively, in the manner described above and each is driven directly from the first drive shaft 32. To this end, the first drive shaft 32 may include a pair of pulleys 38, 120 and second drive shaft 50 may include a pair of pulleys 54, 122. The second drive shaft 50 may include a first portion 124 around which the first drum 112 rotates and a second portion 126 around which the second drum 114 rotates. In this embodiment, the first and second shaft portions 124, 126 are not coupled with each other and each is capable of rotating independently relative to the other. The pulleys 38, 54 may be coupled by a first link mechanism, such as belt 56. Likewise, pulleys 120, 122 may be coupled by a second link mechanism, such as belt 128. Thus, rotation of the first drive shaft 32 by engine 26 drives the first and second shaft portions 124, 126 of second drive shaft 50 so as to rotate the drums 112, 114 about the central axis 18. The apparatus 110 may further include at least one engagement mechanism for selectively engaging the link mechanism on at least one of the drums 112, 114. For example, an engagement mechanism may be associated with the second drum 114. In this way, the first drum 112 would always rotate with rotation of the first drive shaft 32, but the second drum 114 may be selectively turned on or off, i.e., start rotating or stop rotating with rotation of the first drive shaft 32, by actuation of the engagement mechanism. Alternatively, the engagement mechanism may be associated with the first drum 112, such that the second drum 114 always rotates with rotation of the first drive shaft 32, but the first drum 112 may be selectively turned on or off by actuation of the engagement mechanism. In still another alternative embodiment, an engagement mechanism may be associated with both the first and second drums 112, 114 for selectively turning on or off each of the drums 112, 114.

The engagement mechanism may include, for example, various clutch mechanisms generally known in the art, or tensioning devices that tension the belts that couple the first drive shaft 32 to the first and/or second shaft portions 124, 126. As those of ordinary skill in the art will recognize, the engagement mechanism may be associated with the first drive shaft 32 so that at least one of the pulleys 38, 120 does not rotate with rotation of the first drive shaft 32. Alternatively, the engagement mechanisms may be associated with the second drive shaft 50 so that at least one of the first and second shaft portions 124, 126 does not rotate with rotation of the respective pulleys 54, 122.

FIG. 9, in which like reference numerals refer to like features in FIGS. 1-8, shows yet another embodiment in accordance with the invention. As in the previous embodiment, apparatus 140 includes a first and second drum 112, 114. For reasons provided below, preferably the first drum 112 is configured for grinding processes and the second drum 114 is configured for chipping processes. Alternately, the first drum 112 may be configured for chipping processes and the second drum 114 may be configured for grinding processes (not shown). Accordingly, the first drum 112 includes a plurality of teeth 78 arranged on the sidewall 24 for grinding wood products in the manner described above. Additionally, the second drum 114 includes at least one blade 68 on sidewall 24 that cooperates with anvil surface 58 (not shown) for chipping wood products in the manner described above.

Each of the drums 112, 114 is supported by a pair of arms 40, 42, 116, 118, respectively, in the manner described above. Unlike the previous embodiment, however, only one of the drums 112, 114 (e.g., drum 112) is directly driven by the first drive shaft 32, referred to herein as the master drum, and the other of drums 112, 114 (e.g., drum 114) is driven off of the master drum, referred to herein as the slave drum. Such a master/slave arrangement may provide a number of advantages. For example, fewer components for driving the second drive shaft 50 are utilized in such an arrangement, which decreases overall costs of the apparatus. Additionally, this configuration allows the inertial energy of the master drum to be utilized in driving the slave drum. Thus, it may be advantageous to have the heavier drum as the master. In the instant case, the drum configured for grinding processes, i.e., the first drum 112 as shown in FIG. 9, is typically heavier than the drum configured for chipping processes, i.e., the second drum 114, so is preferably configured to be the master drum. The invention, however, is not so limited.

The first drive shaft 32 includes pulley 38 and second drive shaft 50 includes pulley 54, which are coupled via a first link mechanism, such as belt 56. The second drive shaft 50 includes first shaft portion 124 around which the first drum 112 rotates, and a second shaft portion 126 around which second drum 114 rotates. In this embodiment, the first and second shaft portions 124, 126 are coupled by an engagement mechanism 142. Thus, the first drum 112 may be configured to always rotate with rotation of the first drive shaft 32, but the second drum 114 may be selectively turned on or off by actuation of the engagement mechanism 142. When the engagement mechanism 142 is actuated, the second shaft portion 126 will be driven by the first shaft portion 124 so as to rotate the second drum 114. When the engagement mechanism 142 is not actuated, the first shaft portion 124 will not drive the second shaft portion 126 and the second drum 114 will not rotate.

The engagement mechanism 142 may include, for example, various clutch mechanisms generally known in the art. Additionally, the drums 112, 114 may be coupled to shaft portions 124, 126, respectively, through removable fasteners, such as pins (not shown). In this way, if one wants to drive the second drum 114 without rotating the first drum 112, the fasteners that secure the first drum 112 to the first shaft portion 124 may be removed so as to allow the first shaft portion 124 to rotate without rotation of the first drum 112. The second drum 114 may likewise have pins that provide rotation of the drum 114 with rotation of the second shaft portion 126 when the pins are inserted but yet allow the second shaft portion 126 to rotate without rotating the second drum 114 when the pins are removed.

FIG. 10 shows an exemplary embodiment of an apparatus in accordance with the invention incorporated into the chassis of a vehicle 150. The vehicle 150 includes a chassis, shown generally at 152, that operates as a frame 12 for supporting a rotatable drum 16. Although FIG. 10 illustrates the drum 16 configured for a chipping process, the drum 16 could also be configured for a grinding process as described above. The frame 12 is coupled to the ground 14 via a pair of spaced-apart tracks 154 wherein the drum 16 is positioned intermediate the tracks 154. The tracks 154 facilitate weight distribution of the vehicle 150 on the ground 14 so as to minimize ruts or other damage to the ground, but yet allow the vehicle to be movable over the ground 14.

The vehicle 150 includes an engine 26, studs 28, 30 for supporting first drive shaft 32, and arms 40, 42 coupled to the first drive shaft 32 at the first end 44 and supporting second drive shaft 50 at their second end 48. The drum 16 is mounted on second shaft 50 and is driven by the first drive shaft 32 via a first link mechanism, such as belt 56. The vehicle 150 further includes lifts 62 for moving the drum 16 between the first and second positions and an anvil surface 58 for use in chipping processes. As shown in FIG. 10, the vehicle 150 may include a feed chute assembly 156 for feeding wood products, such as loose tree parts, to the drum 16 while chipping. Furthermore, the vehicle 150 may further include a shroud 158 that surrounds at least a portion of the drum 16. The shroud 158 may be generally open along a lower portion thereof to allow the drum 16 to be rotated toward the ground 14, through actuation of lifts 62 and in the second position. In one embodiment, the shroud 158 is fixed to the chassis 152 of the vehicle 150 so as to not move with movement of drum 16. In an alternative embodiment, however, the shroud 158 may be configured to move with movement of drum 16 or be capable of independent movement relative to drum 16. The shroud 158 includes an outlet 160 which may be coupled to an outlet chute assembly, embodiments of which are discussed below, for directing the processed wood products to a bin 162 (shown in phantom) also carried by the vehicle 150.

In this regard, the embodiment shown in FIG. 10 may further be capable of collecting the processed wood products (e.g., chipped or ground loose tree parts or stump). More particularly, the rotation of the drum may be used to direct the chipped or ground wood products into the shroud 158, through the outlet 160 thereof, through the outlet chute assembly, and into the collection bin 162. In this way, the processed wood products are collected during the chipping or grinding process. Therefore, there is no need to collect the processed wood products at a later time, which is typical in conventional chipping and grinding processes.

To this end, the engine 26 of vehicle 150 may be configured to rotate the drum 16 in a certain direction (e.g., counterclockwise in FIG. 10) to facilitate collection of the processed wood products. In other words, the drum 16 may rotate in a direction that directs the processed wood products through the outlet chute assembly via the shroud 158 for convenient collection thereof. It should be realized, however, that engine 26 may be configured to rotate the drum 16 in either the clockwise and/or counterclockwise direction depending on the specific application. For example, engine 26 may include a suitable transmission and other gear mechanisms (not shown) that allow the drum to rotate in either direction. In this way, for example, it is possible to rotate the drum 16 in a first direction for a chipping process and rotate the drum in a second direction for a grinding process.

The embodiment shown in FIG. 10 is but one exemplary embodiment utilizing a chipping/grinding apparatus in accordance with the invention. Those of ordinary skill in the art will appreciate that the chipping and grinding apparatus is not limited to that shown in FIG. 10, but may be incorporated into a broad range of structures, such as self-standing implements, or platforms that may be subsequently coupled to a tractor, truck, etc.

Figure 11:
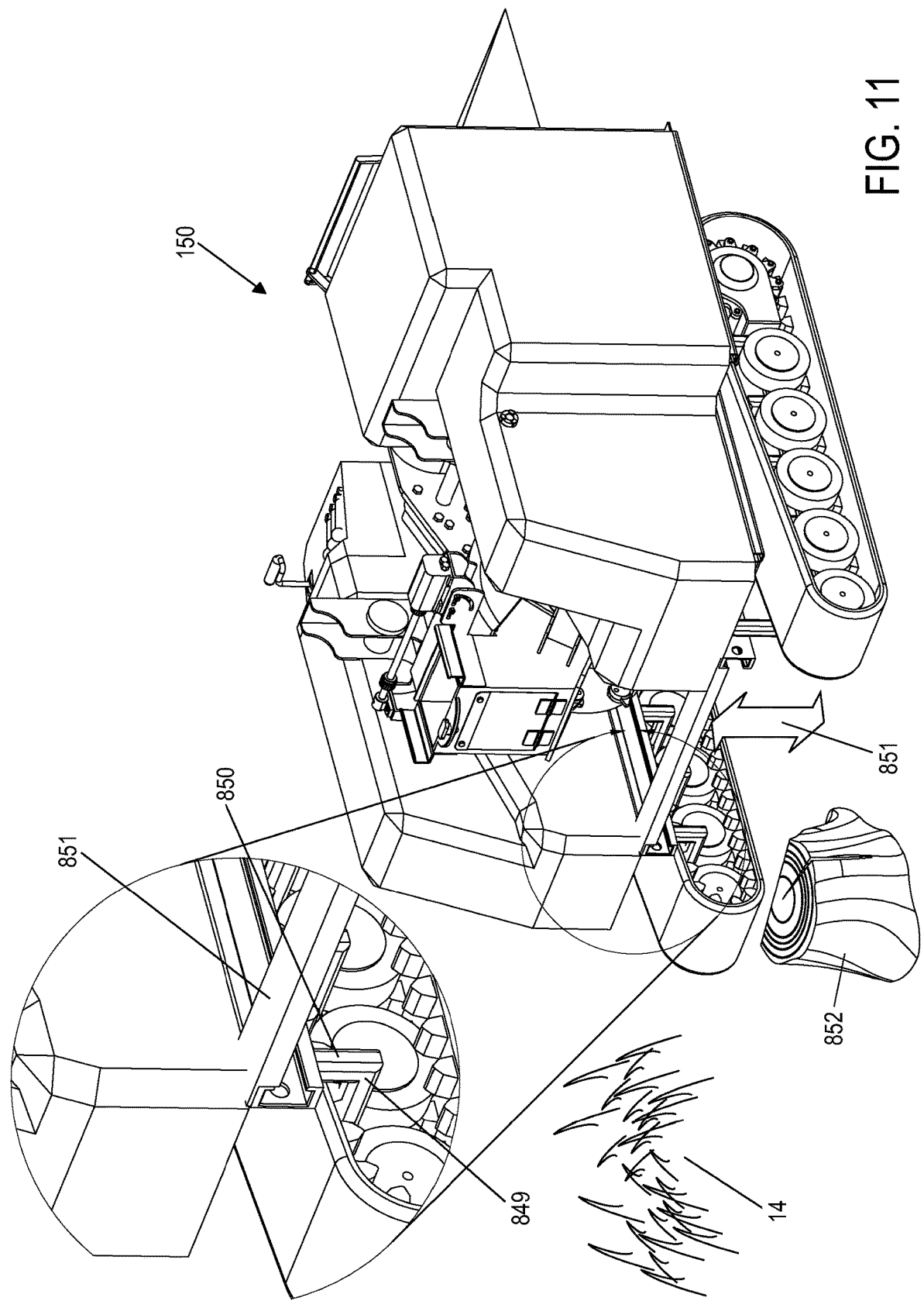
FIG. 11 is a perspective view of the vehicle illustrated in FIG. 10.
Figure 12:
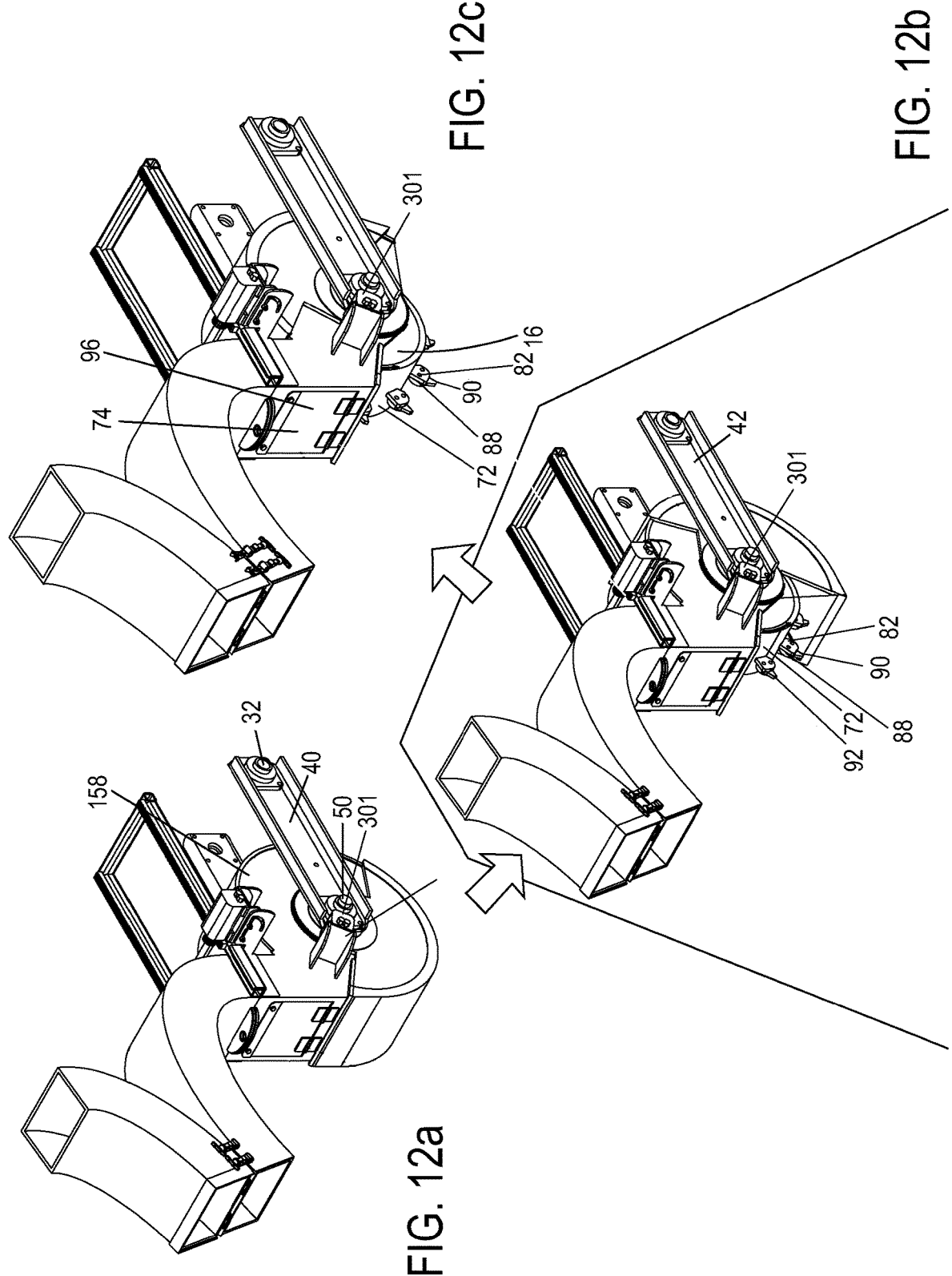
FIGS. 12a-c are a sequence showing the shroud in three stages: (a) fully covering the drum; (b) partially retracted from the drum; and (c) retracted from the drum so that the drum is ready to grind stumps (e.g., grinding position).

By way of example, FIG. 11 illustrates vehicle 150 in greater detail. As shown in this figure, the vehicle 150 may include a drum 16 configured for grinding processes by, for example, including a plurality of teeth 78 as described above. To facilitate grinding of wood products, such as a portion of a stump 852, the front support structure 851 of vehicle 150 may be configured to be at a sufficient height off the ground 14 to allow adequate clearance of the portion of a stump 852 protruding above the ground to pass beneath the front support structure 851 and thereby be positioned adjacent drum 16. Given the relatively low profile of the tracks 154, in one exemplary embodiment, this may be accomplished by attaching a vertical member 850 to a horizontal member 849 which, in turn, may be anchored to an internal structural member (not shown) of each of the tracks 154.

The invention, however, is not so limited as the front support structure 851 may be raised by other means. For example, the front support structure 851 may be raised, either in a fixed manner or in an adjustable manner, by hydraulic cylinders (not shown) configured to raise at least the center portion of the chassis. Alternatively, the tracks 154 may have a high profile design that increases the height of front support structure 851 relative to the ground. Those of ordinary skill in the art may recognize other mechanisms to raise the front support structure 851 relative to the ground 14 so as to allow a portion of stump 852 to pass thereunder and be positioned adjacent drum 16. As an alternative to drum 16 engaging the ground 14 by way of pivoting support arm 106 moving in an arcuate path, drum 16 may move toward the ground following a vertical path of travel. For example, by way of hydraulic power, drum 16 may move vertically downward with drive shaft 32, interior bushings, and other attenuate mechanical power transmission components. These components may travel as such on a track in any vertical or angled descent/ascent. By way of another example, drum 16 may be rotated preferably by direct mechanical coupling, such as a belt, along any non-arcuate path by prime mover 26 on a platform also independently capable of vertical movement from the vehicle 150 shown in FIG. 11. It may be possible to accomplish such vertical movement by way of hydraulic cylinders, pinion gears in a gear track, telescopic tube engagements, or other similar mechanical methods for moving objects vertically along a controlled path.

As noted above in regard to FIG. 10, vehicle 150 may include a shroud 158 configured to encase at least a portion of the drum 16. In one embodiment, the shroud 158 may include portions thereof independently movable so as to expose portions of the drum 16, depending on the particular configuration. In that regard, in one embodiment, and as shown in FIGS. 12A-12C, shroud 158 includes a stationary upper shroud section 300a and a movable lower shroud section 300b. Initially, such as when in a non-operating mode, the drum 16 may be essentially surrounded by the upper shroud section 300a and the lower shroud section 300b (FIG. 12A). As previously discussed, vehicle 150 may include a pair of arms 40, 42 configured to receive second drive shaft 50, on which drum 16 is rotatably mounted (e.g., see FIG. 11). The upper shroud portion 300a may be fixed relative to arms 40, 42. However, the lower shroud portion 300b may include an actuation mechanism capable of moving lower shroud portion 300b so as to expose the drum 16, such as during a grinding process.

To this end, vehicle 150 may further include a gear track plate 302 fixedly attached to the lower shroud portion 300b and mounted about second drive shaft 50. The track plate 302 is operatively coupled to a motor, such as hydraulic motor 301, for moving lower shroud portion 300b and which may be mounted to one of arms 40, 42. In one embodiment, track plate 302 includes gear teeth on the outer most diameter thereof configured to engage with pinion teeth coupled to the hydraulic motor 301. In this way, when the pair of arms 40, 42 are in a non-grounding engaging position and hydraulic motor 301 is activated, lower shroud portion 300b may be rotated about axis 18 so as to be retracted over upper shroud portion 300a and expose drum 16 (FIGS. 12B, 12C). More particularly, when the lower shroud portion 300b is retracted, the teeth 78 are exposed for grinding wood products, such as stump 852. The hydraulic motor 301 may again be activated to move the lower shroud portion 300b back to its original position such that shroud 158 may substantially surround drum 16. For example, such a configuration of the drum 16 and upper and lower shroud portions 300a, 300b may be desirable when the drum 16 is in the chipping position. While the above describes the use of hydraulic motor 301 to retract the lower shroud portion 300b, those of ordinary skill in the art will recognize that other types of motors may be used to move lower shroud portion 300b so as to expose drum 16 and teeth 78.

As shown in these figures, in one embodiment, the shroud 158 may include an access panel for accessing the drum 16 on the inside of shroud 158. For example, the access panel may be used to clean drum 16, provide maintenance to drum 16 (e.g., replace teeth 78 or blades 68), couple/decouple attachment members 74, 74a to or from the drum 16 (e.g., see FIGS. 4-7), or provide some other service that requires access to the drum 16. In one embodiment, the access panel may include an access door 304 mounted to the shroud 158, such as along upper shroud portion 300a, via hinges 305. Other access panels may also be used. For example, the access panel may include a sliding type of door or closure (not shown) that opens and closes an opening into the interior of shroud 158.

Figure 13:
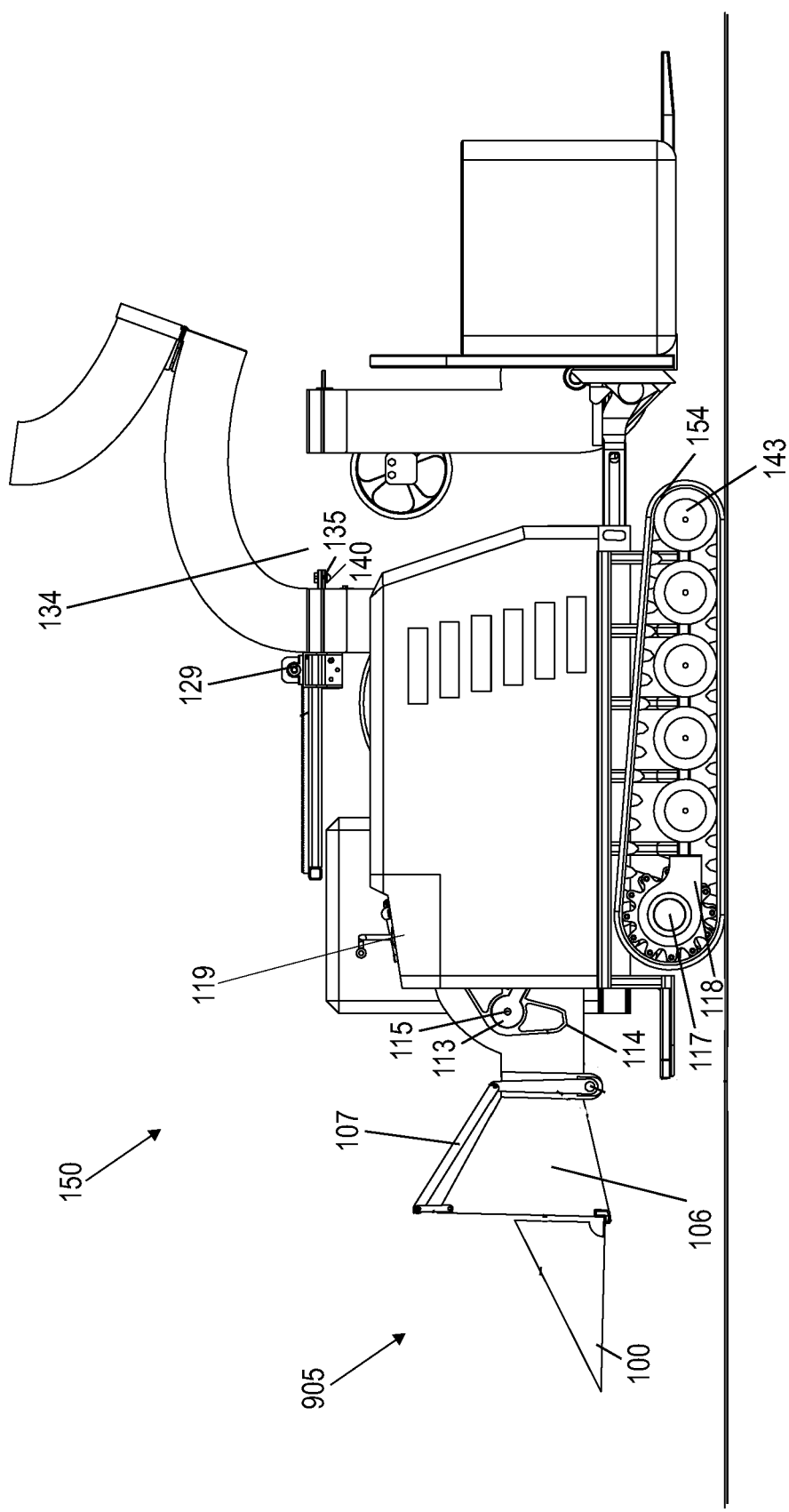
FIG. 13 is a side view of the exemplary vehicle in accordance with an alternative embodiment of the invention.

FIG. 13 illustrates a side view of vehicle 150 incorporating various aspects of apparatus 10. In one embodiment, the vehicle 150 may be powered by one or more wheel motors 117 (one shown) which is coupled to the vehicle 150 within a track frame 118 associated with each of the tracks 154. A series of idler pulleys 143 support vehicle tracks 154. Integrated into the inside of the vehicle tracks 154 are track teeth 173 that are configured to engage a rotating sprocket 173a operatively coupled to the wheel motor 117. Mobile track driven chassis, such as discussed here, are generally known in the art and a more complete description of the drive train of the vehicle 150 has been omitted herein for sake of brevity. Nevertheless, those of ordinary skill in the art will readily understand the construction of the tracks 154 and the drive system that allows the vehicle 150 to be mobile.

Figure 14:
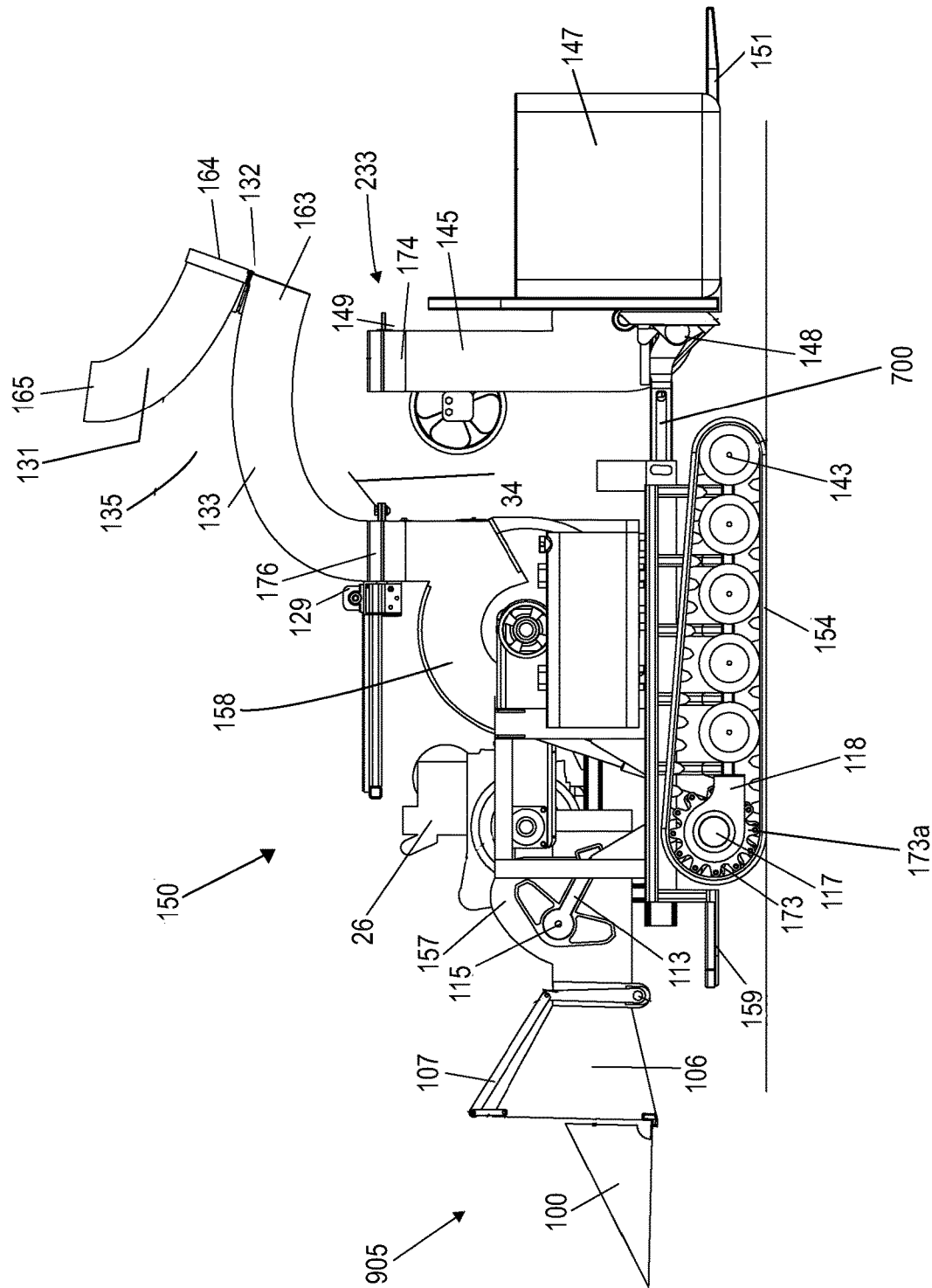
FIG. 14 is a side view of the exemplary vehicle in accordance with an alternative embodiment of the invention.

As shown in FIG. 13, to protect the internal workings of the vehicle 150 from debris and damage, vehicle 150 may include a removable cover 119. Cover 119 provides the desired protection, yet allows access to the internal workings of the vehicle 150 for repairs, maintenance, etc. FIG. 14 illustrates vehicle 150 with the removable cover 199 omitted for purposes of illustration and description. As illustrated in these figures, the vehicle 150 includes a feed roller assembly for guiding wood products toward the drum 16 during, for example, a chipping process. In one embodiment, the feed roller assembly may include a feed roller housing 157, a feed roller control arm 113, and a control arm attachment 115 for a feed roller (not shown) connected to the feed roller control arm 113. Those of ordinary skill in the art will readily understand the construction and operation of the feed roller assembly and therefore, a more detailed description will be omitted for sake of brevity.

In an exemplary embodiment, the vehicle 150 may include a chip and stump grinding discharge chute 135 that facilitates collection of the processed wood products generated from various chipping and grinding processes. As shown in FIG. 14, the discharge chute 135 may be coupled to the shroud 158, such as via the upper shroud portion 300a. The discharge chute 135 may include a generally arcuate base chute 133 having a first end coupled to the shroud 158 and a second end extending therefrom. The second end of base chute 133 is coupled to an outer chute segment 164 via a hinge 132 that allows the outer chute segment 164 to pivot relative to the base chute 133 between a first and second position. In the first position, the outer chute segment 164 operates as an extension of the base chute 133 so as to further direct the processed wood products toward a desired location. In the second position, the outer chute segment 164 is pivoted out of the path of the base chute 133 such that it plays no role in guiding or directing the processed wood products. In this way, the outer chute segment 164 can be hinged rearwardly on the base chute 133 at the operator's discretion in order to direct the processed wood products into a hopper 147, or alternatively, to direct the processed wood products elsewhere, such as into the back of the truck. For example, with the outer chute segment 164 folded down, chips or grindings may be directed into the hopper 147, and with outer chute segment 164 folded back, chips or grindings may be directed a distance beyond the hopper 147, such as in the back of the truck or on the ground. In one embodiment, the hopper 147 may be carried by the vehicle 150. In this regard, the vehicle 150 may include a pair of hopper support arms 700 and a hopper support 151 coupled thereto (e.g., similar to a fork arrangement) configured to support the hopper 147 thereon.

In one aspect of the invention, vehicle 150 includes an outlet chute system that includes a dual mode of operation. More particularly, in one mode, and as illustrated in FIG. 14, the discharge chute 135 may operate to direct the processed wood products into the collection hopper 147. However, in a second mode of operation the discharge chute 135 may operate to guide the processed wood products that have been collected in hopper 147 toward another location, such as in the back of a truck. Thus, the same chute system may be used for dual purposes in accordance with this aspect of the invention.

To this end, the vehicle 150 may include a chute transfer system 233 that moves the discharge chute 135 from the upper shroud section 300a to a blower housing chute 145 that is operatively coupled to the collection hopper 147. In one embodiment, the chute transfer system 233 includes a housing coupled to the shroud 158, a hydraulic motor 129 coupled to the housing, and a bracket fixedly coupled to the discharge chute 135 and movably coupled to the housing. The hydraulic motor 129 is operative to move the bracket relative to the housing. In this regard, when the hydraulic motor 129 is actuated, the bracket moves relative to the housing so as to move the discharge chute 135 from the shroud 158 and toward the blower housing chute 145. In this way, the discharge chute 135 is moved so as to engage an operating end 174 of the blower housing chute 145. A locking pin 134 may be used to lock/release the discharge chute 135 to/from the shroud 158. A locking pin may also be used to lock/release the discharge chute 135 to/from the operating end 174 of blower housing chute 145. Those of ordinary skill in the art may recognize other locking mechanisms for securing/releasing the discharge chute 135 relative to the shroud 158 and blower housing chute 145.

Figure 15:
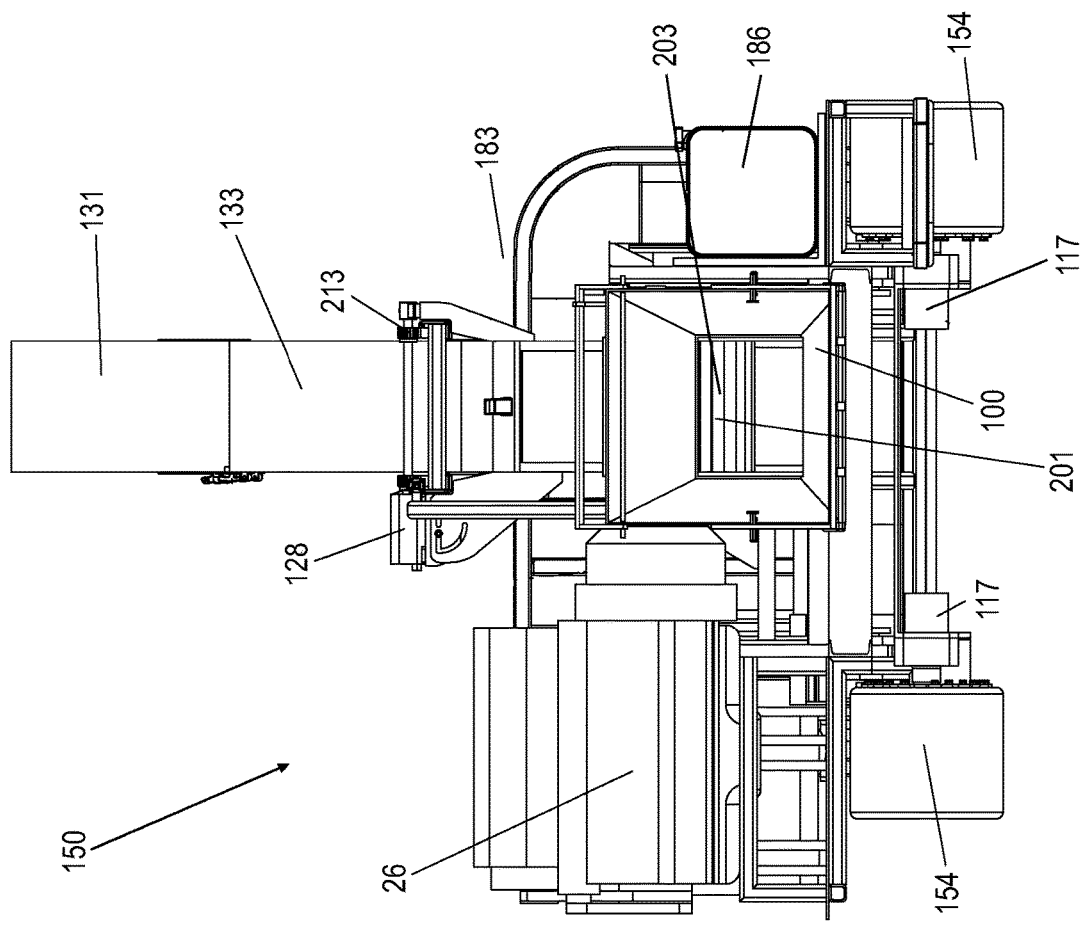
FIG. 15 is a rear view of the exemplary vehicle in accordance with an alternative embodiment of the invention.
Figure 16:
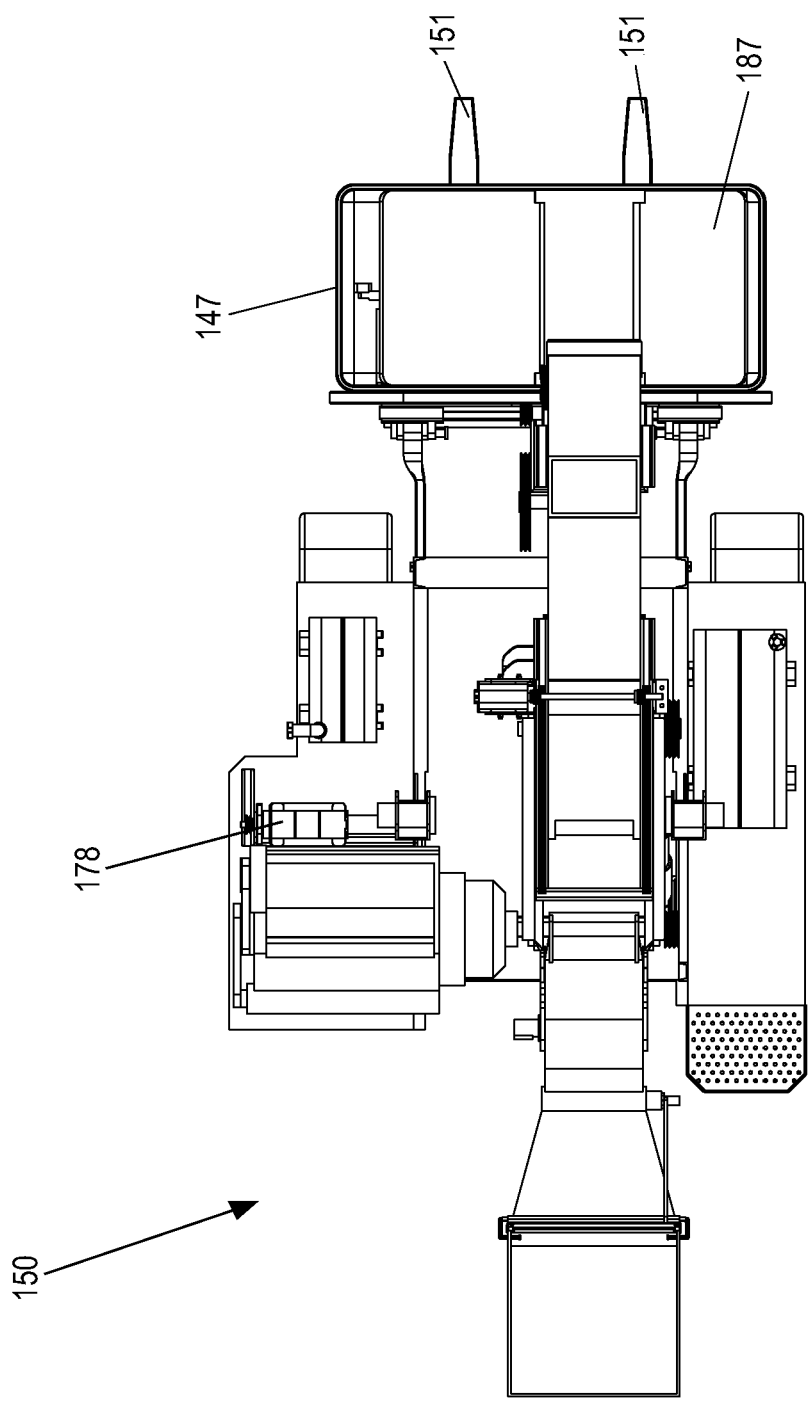
FIG. 16 is a top view of the exemplary vehicle in accordance with an alternative embodiment of the invention.
Figure 17:
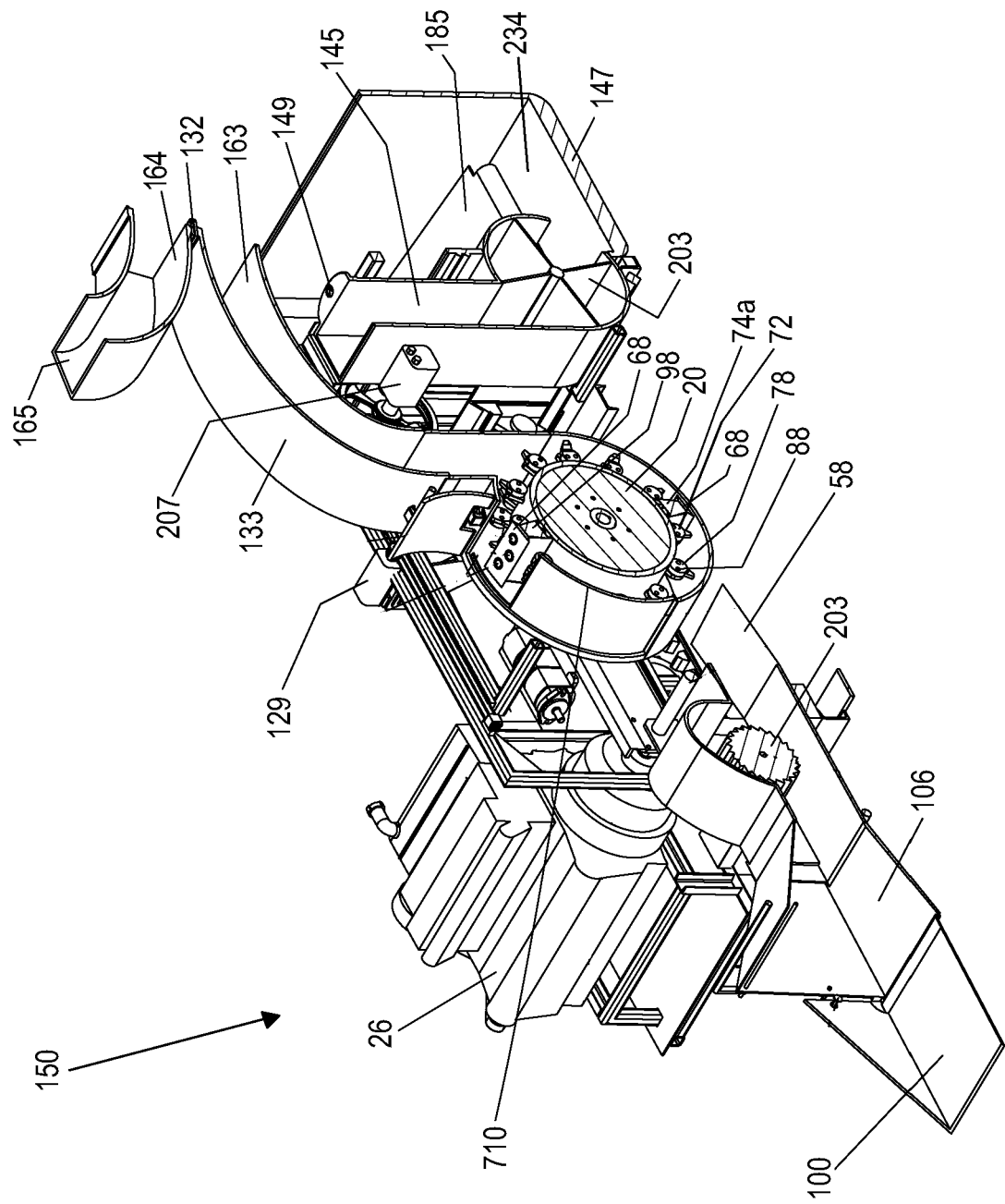
FIG. 17 is a perspective cross-sectional view of the vehicle illustrating a chip collection assembly.

FIGS. 15-17 illustrate additional details of vehicle 150. FIG. 15 illustrates a rearview of the vehicle 150. Wheel motors 197 propel the vehicle tracks 154 in conjunction with other track assembly components as readily understood by those of ordinary skill in the art. This figure also shows additional details of the feed roller assembly that guides wood products toward the drum 16. For example, this figure illustrates a feed roller grip plate 201 extending vertically from a surface of feed roller drum 203. Additionally, FIG. 15 illustrates a hydraulic oil tank 186 for supplying hydraulic fluid to the various components of vehicle 150.

FIG. 16 depicts a top view of the vehicle 150 showing the vertical rear wall of collection hopper 147, a floor 187 of hopper 147 that, as described in more detail below, facilitates removal of the processed wood products from the hopper 147, as well as the hopper fork and support 151 that supports and carries the hopper 147 on vehicle 150. FIG. 17 shows additional details of the feed roller assembly. More particularly, this figure illustrates a feed table 100 transitioning to a conical chute segment 106 that in turn transitions to the feed roller drum 203. As understood, workers at a job site place wood products such as branches, leaves, etc. on the feed table and push them into the conical chute segment 106. The feed roller drum 203 then engages the wood products and moves them toward the drum 16 for processing.

As described above, when in the chipping mode, the blades 68 coupled to drum 16 are proximate anvil surface 58 and cooperate therewith so as to chip the wood products being fed through the feed roller assembly. With reference to FIG. 17, chips produced by the drum 16 transfer through the interior of the shroud 158 and are directed upwardly and above the drum 16, into the base chute section 133 of discharge chute 135. The chips move through the discharge chute 135 and exit at the base chute opening 163. When the upper chute segment 164 is in its second position (i.e., hinged away from base chute 133), the chips may be directed outward and into a truck, other unattached container, or simply onto the ground. When the upper chute segment 164 is rotated into its first position, chips will exit at the upper chute outlet 165 and be deposited into collection hopper 147. In some embodiments, the chips move by their own inertia following the chipping action into the base chute section 133 and into the discharge chute 135, such as for subsequent collection by the hopper 147.

Figure 18:
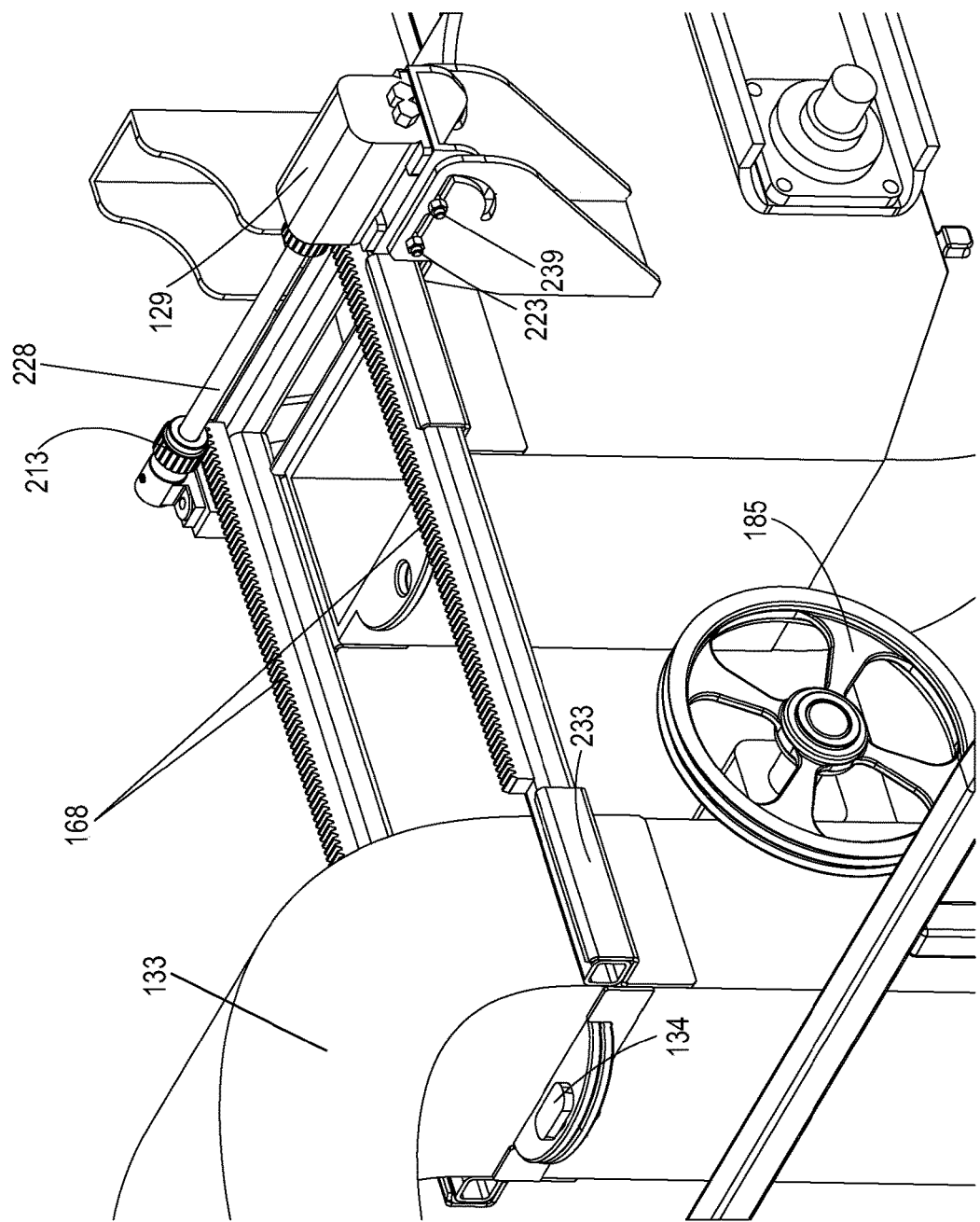
FIG. 18 is a perspective view of a mechanized chute transfer system in accordance with an aspect of the invention.
Figure 19:
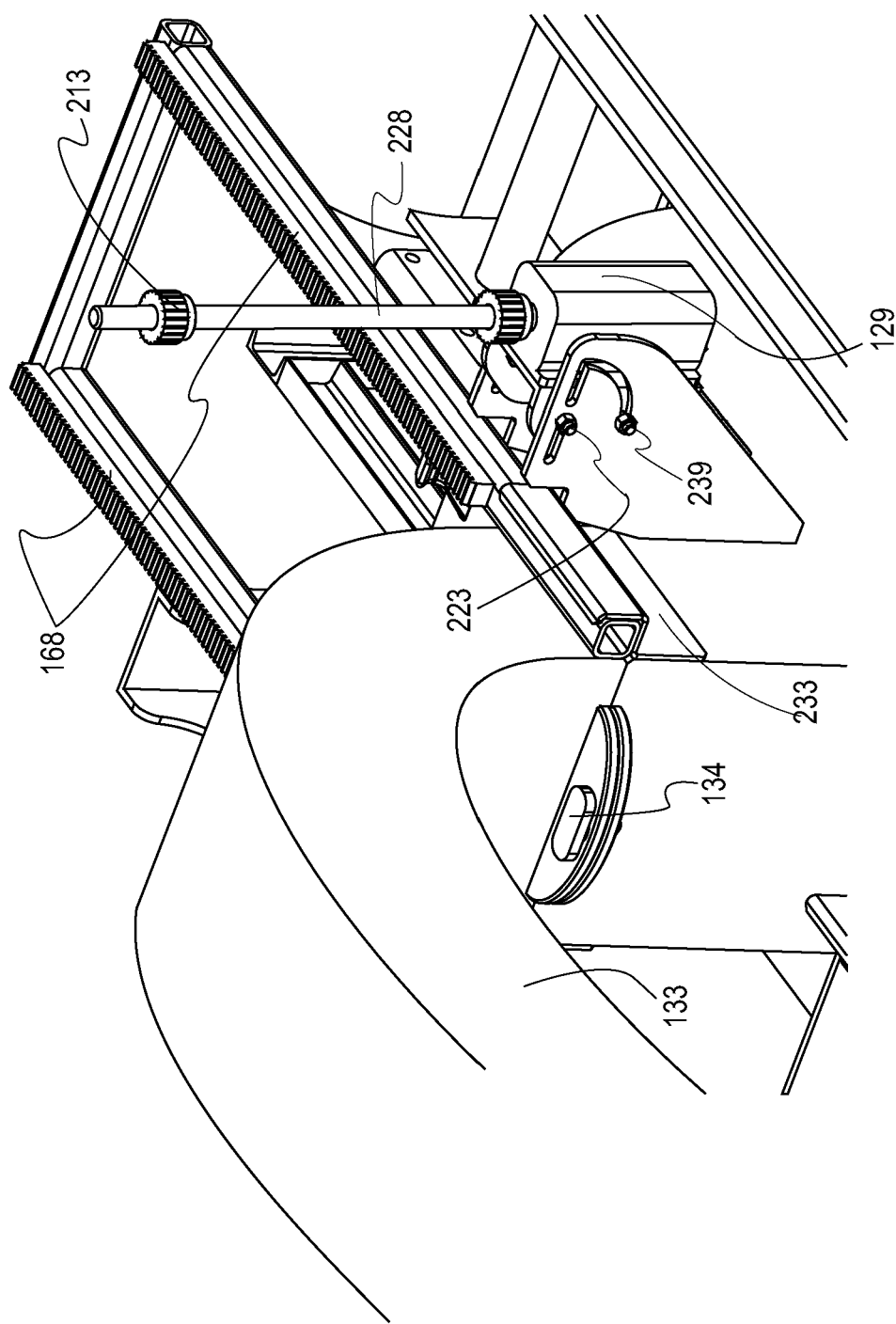
FIG. 19 is another perspective view of the chute transfer system.

In another aspect in accordance with the invention, the vehicle 150 may include an evacuation system configured to evacuate the processed wood products collected in hopper 147. For example, when the collection hopper 147 is full of wood chips, the chips may be drawn into the blower housing chute 145 by an impeller 203 through a chip inlet port 234, where they will be further directed as discussed in reference to other figures. FIG. 18 illustrates the chute transfer system 233 used to move the discharge chute from a first position, wherein it guides the processed wood products to the collection hopper 147, and a second position, wherein it guides the processed wood products away from the hopper 147. In this regard and as previously discussed, the base chute 133 may be advanced from the upper shroud section 300a to the blower housing chute 145 by means of a gear track 168 which is operatively coupled to a gear track pinion 228. The pinions 213 and shaft are connected to the gear track and pinions 228 terminating in pillow block bearing 213. The assembly comprising elements 213, 228 and the pinions 213 are propelled by a hydraulic motor 129.

Figure 20:
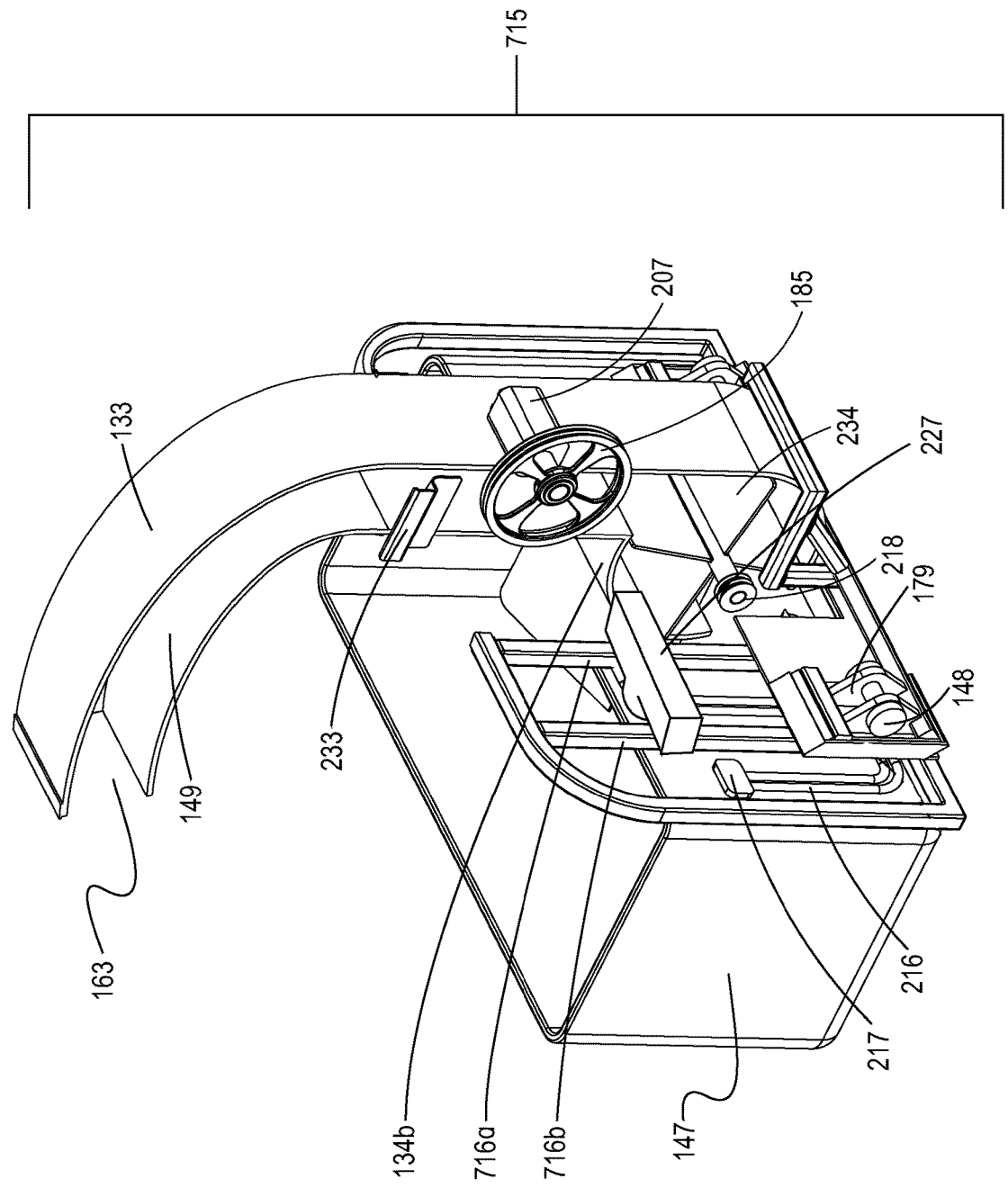
FIG. 20 is a rear perspective view of an exemplary chip collection and evacuation assembly.

In one embodiment, the gear track pinion 228 may be capable of pivoting between an engaged position, wherein the pinions 213 engage the gear track 168, and a disengaged position, wherein the pinions 213 are spaced away from the gear track 168. When the gear track pinion 228 is in the engaged position, actuation of motor 129 causes movement of the base chute 133. However, when the gear track pinion 228 is in the disengaged position, the hydraulic motor 129 is no longer operatively coupled to the base chute 133 and thus movement thereof is prevented. FIG. 20 shows the gear track pinion 228 in the disengaged position. This may be accomplished, for example, by releasing forward motor securement bolt 223 and rearward motor securement bolt 239 and manually pivoting the gear track pinion 228. The bolts 223, 239 may be retightened to secure the gear track pinion 228 in the disengaged position. Of course when the operator desires to move the base chute 133, such as to evacuate the processed wood products from the hopper 147, the bolts 223, 239 may be loosened so as to pivot the gear track pinion 228 back to its engaged position. The bolts 223, 239 may again be tightened to secure the gear track pinion 228 in the engaged position.

Figure 21:
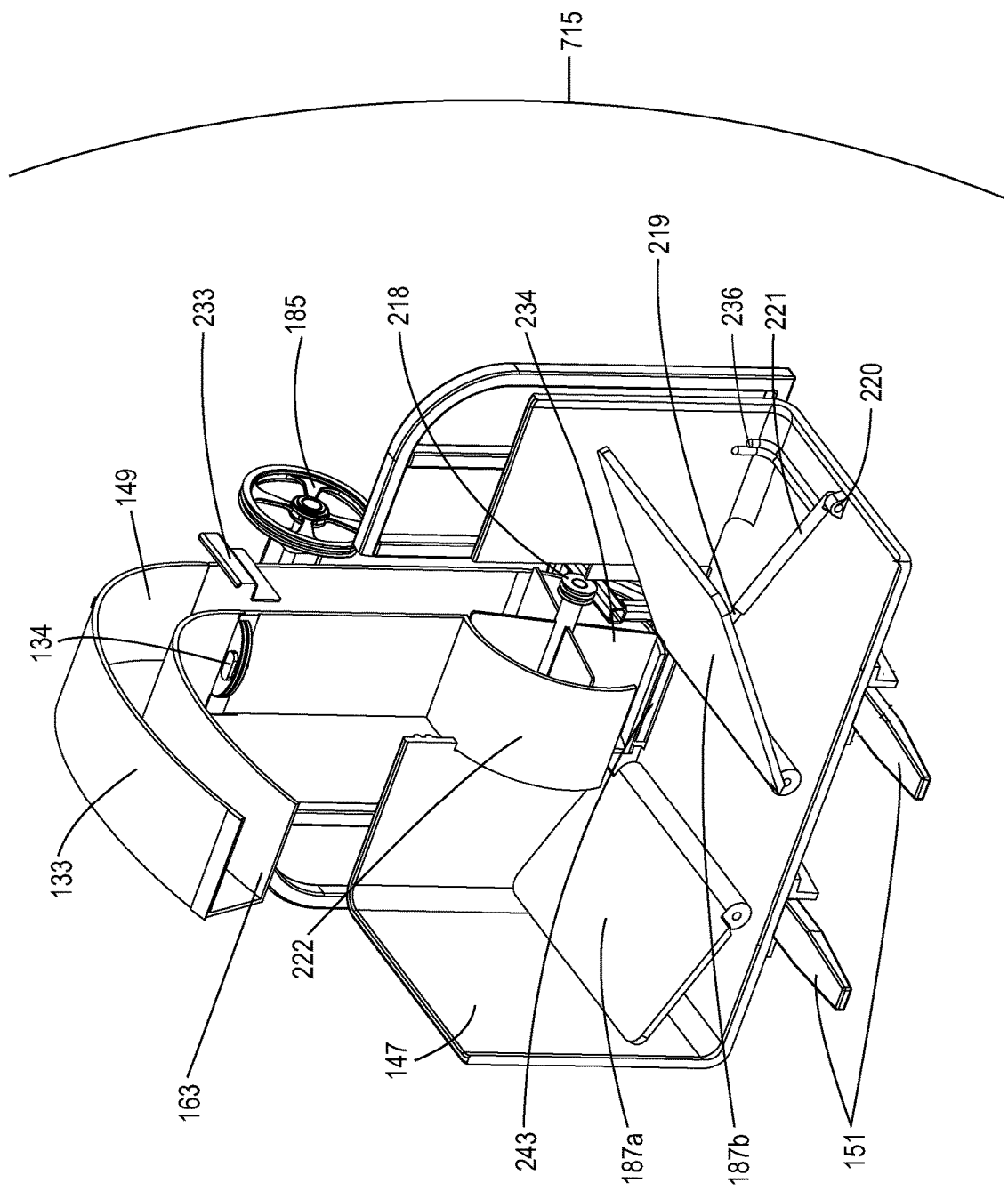
FIG. 21 is a cut away front perspective view of the chip collection and evacuation assembly shown in FIG. 20.

FIG. 21 is a rear view of the chip collection and evacuation assembly. The assembly includes a brace for the chute transfer system 233 and the chip collection hopper 147. In one embodiment, the collection hopper 147 may be secured to the transport support structure 715 by a rotatable latching mechanism 227 and placed on fork and hopper supports 151, as previously described. To secure the chip collection hopper 147 in place, the latching mechanism 227 is rotated to a generally horizontal position whereby it engages vertical support members 716a and 716b. The transport support structure 715 further includes an evacuation system for removing the processed wood products from the collection hopper 147. In an exemplary embodiment, the evacuation system includes an impeller 234 integrated into blower housing chute 145 and positioned adjacent hopper 147 and discharge chute 135 (after it has been moved so as to be operatively coupled to blower housing chute 145 as described above). A blower motor 207 drives a pulley 185, which in turn is coupled to a pulley 218 (such as via a belt) operatively coupled to impeller 234. When the blower motor 207 is actuated, the impeller 234 rotates so as to create a vacuum that sucks the processed wood products into interior chute 149. The evacuation system then directs the processed wood products through the blower housing chute 145, through the discharge chute 135 and out of exiting opening 163. In this way, for example, the processed wood products in collection hopper 147 may be transported to a truck or other area. The transport support structure 715 may also include a hydraulic quick disconnect 217 where hydraulic supply and return lines originating from vehicle base 150 (not shown) may be coupled. The hydraulic power may be generated by engine 26 and hydraulic pump 178 (not shown) via hydraulic lines leading to hydraulic quick connects 217.

In accordance with another aspect of the invention, to facilitate evacuation of the collection hopper 147, the hopper may include various features that work in conjunction with the evacuation system for efficient removal of the processed wood products therein. In this regard, FIG. 21 is a partial cut away front view of the transport support structure 715 illustrating the structure and configuration of the floor of the collection hopper 147. In one embodiment, the collection hopper 147 may include an operable floor 187 defined at least in part by one or more (two shown) pivotable plate-like flaps 187a, 187b. The pivotable flaps 187a, 187b are pivotally fixed at one end thereof and coupled to hydraulic cylinders 221 at another end thereof. The hydraulic cylinders may be operatively coupled to hydraulic lines 236 for providing power thereto. The hydraulic cylinders 221 may be anchored to a base of the floor of the chip collection hopper 147 at one end thereof and coupled to the flaps 187a, 187b at another end thereof. As shown in FIG. 20, the hydraulic cylinders 221 are configured so as to direct the processed wood products toward an opening in the collection hopper 147 in communication with impeller 234 and blower housing chute 145. Because processed wood products are fibrous, stringy and otherwise known to "bridge off" when in a large pile, an inlet 243 is created within the blower housing 222 configured to receive the processed wood products when the impeller 234 is actuated. As the impeller 234 is starved for bridged off material, the flaps 187a, 187b may be raised by means of the operator controlled hydraulic cylinders 221. As the operable flaps 187a, 187b rise up, the processed wood products are freed and able to enter the inlet 243, come in contact with the impeller 234, and consequently be transferred through the blower housing chute 145 and discharge chute 135. While a tiltable floor is described herein, there may be other ways to direct the processed wood products toward the inlet 243 so as to break the bridge chip material. For example, the handle of a tool, like a shovel, broom or rake may be used, alternatively, in the slightly more improved form, a manually operated clearing device could be fashioned. Other mechanical devices could also be used, such as an auger, vibratory devices or other suitable devices.

Figure 23:
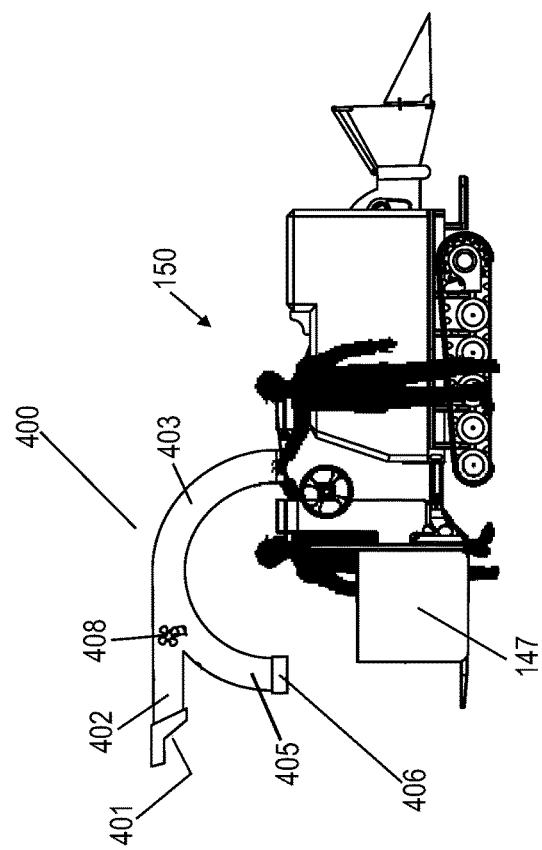
FIGS. 22 and 23 are side views showing a sequence of steps for a method and type of chip discharge chute transfer in accordance with an alternative embodiment.
Figure 22:
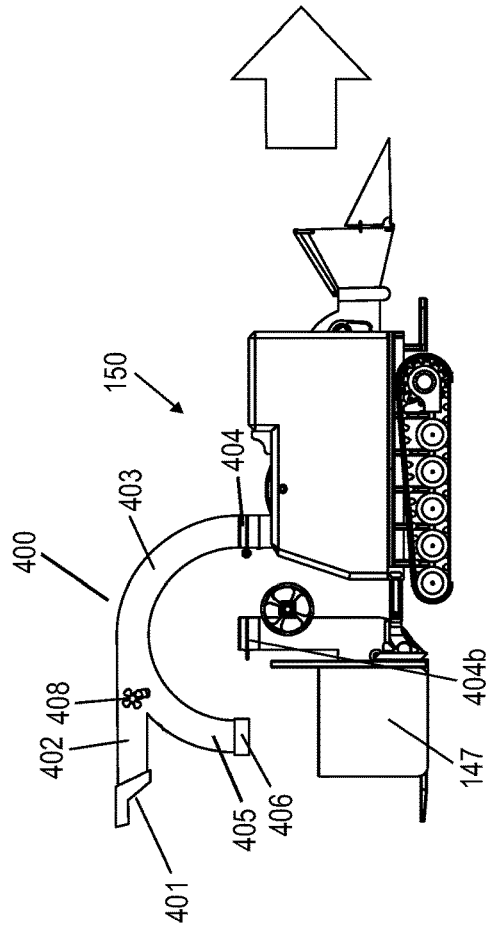

FIGS. 22-23 show an alternative embodiment to the chute transfer system and discharge chute previously described. In this regard, the vehicle 150 may include a discharge chute 400 having a chute coupling 404 for coupling the chute 400 to the shroud 158 or blower housing chute 145 similar to that previously described. In this embodiment, the discharge chute 400 may have a bifurcated configuration that defines multiple outlets (two shown). Similar to above, as chips or grindings are produced, they exit the shroud 158 and flow through curved chute section 403. One section of the discharge chute 400, i.e., the straight chute section 402, continues to the upper discharge outlet 401. Another chute section, i.e., the lower curved chute section 405, continues to the lower discharge outlet 406. The desired outlet of discharge chute 400 may be selected by the operator. In this regard, the discharge chute 400 may include a diverter knob 408 which allows a diverter vane 409, shown in FIG. 22, to be positioned so that the processed wood products are directed to the upper discharge outlet 401 or lower discharge outlet 406. When the processed wood products are diverted to the upper discharge outlet 401, they can be directed into the back of a truck, another non-attached collection device or simply onto the ground. When the processed wood products are diverted to the lower discharge outlet 406, they can be directed into the hopper 147, for example.

As seen in FIG. 23, when hopper 147 is full and it is desirable to evacuate the contents therefrom, the chute coupling 404 may be manually disconnected from the shroud 158 and discharge chute 400 positioned over a coupling 404b on the blower housing chute 145. In this position, processed wood products may be evacuated from the hopper 147 as discussed above (i.e., via the elements of the transport support structure 715, including the impeller 234, blower motor 207, etc.). More particularly, the processed wood products may be evacuated from the collection hopper 147 and directed out of the upper or lower discharge opening 401, 406 (e.g., using diverter vane 409) depending on the desires of the operator). The ability to evacuate the processed wood products from the collection hopper 147 allows a tree care service to drive the vehicle 150 to the site of the tree to be maintained or removed and when the chip collection hopper 147 is full, driven to another location for efficient discharge of the processed wood products.

As noted above, the operator may select the desired outlet from discharge chute 400. In this regard, FIGS. 24-25 include cut away views of the diverter vane 409 positionable to direct chips through the lower curved section 405 and out the lower discharge outlet 406, or through section 402 and out the upper discharge outlet 401. More particularly, FIG. 24 shows the diverter vane 409 in a generally vertical position such that the flow of the processed wood products will bypass the straight cute section 402 and enter the lower curve section 405 so as to exit from lower discharge outlet 406. Similarly, FIG. 25 shows the diverter vane 409 in a generally horizontal position such that the flow of the processed wood products will bypass the lower curve section 405, enter the straight chute section 402, and be discharged from the upper discharge outlet 401.

Figure 26:
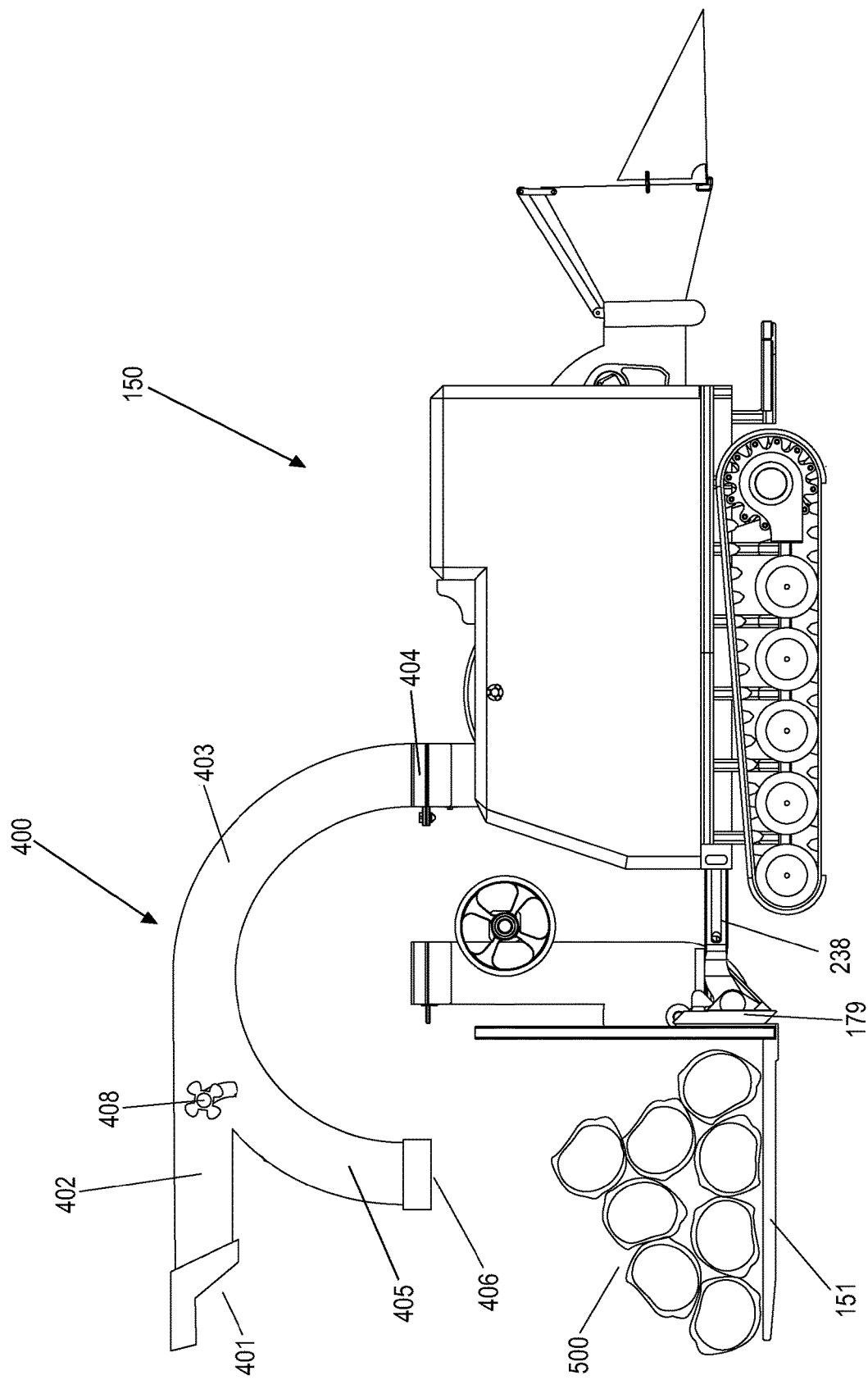
FIG. 26 is a side view of the chip discharge chute with the chip collection hopper removed in order to show log transport.

In various tree removal processes in both residential and commercial applications, some of the tree parts may be too large to chip, for example. In these cases, the larger tree parts may be simply transported and loaded onto a truck, etc. for removal from the work site. In some instances, the sites may be considerably removed from a truck for transporting the larger tree parts from the site. It would therefore be desirable for vehicle 150 to have the capability of transporting larger tree parts from the tree removal site to another site for loading onto a truck, etc. In another aspect in accordance with the invention, vehicle 150 may be so configured. For example, the hopper 147 may be selectively removable from vehicle 150. FIG. 26 is a side view of the vehicle 150 with the hopper 147 removed. This leaves the fork and hopper support 151 attached to the attachment plate 179, which is in turn attached to the support arms 238 of vehicle 150. In this configuration, the vehicle 150 can be used to transport larger tree parts including, for example, a pile of logs 500, using the fork and hopper support 151 to support logs 500 on vehicle 150. Thus, vehicle 150 may provide multiple operating modes in a single apparatus and a tree service company may use fewer pieces of equipment for many of the tasks needed in various applications.

Figure 27:
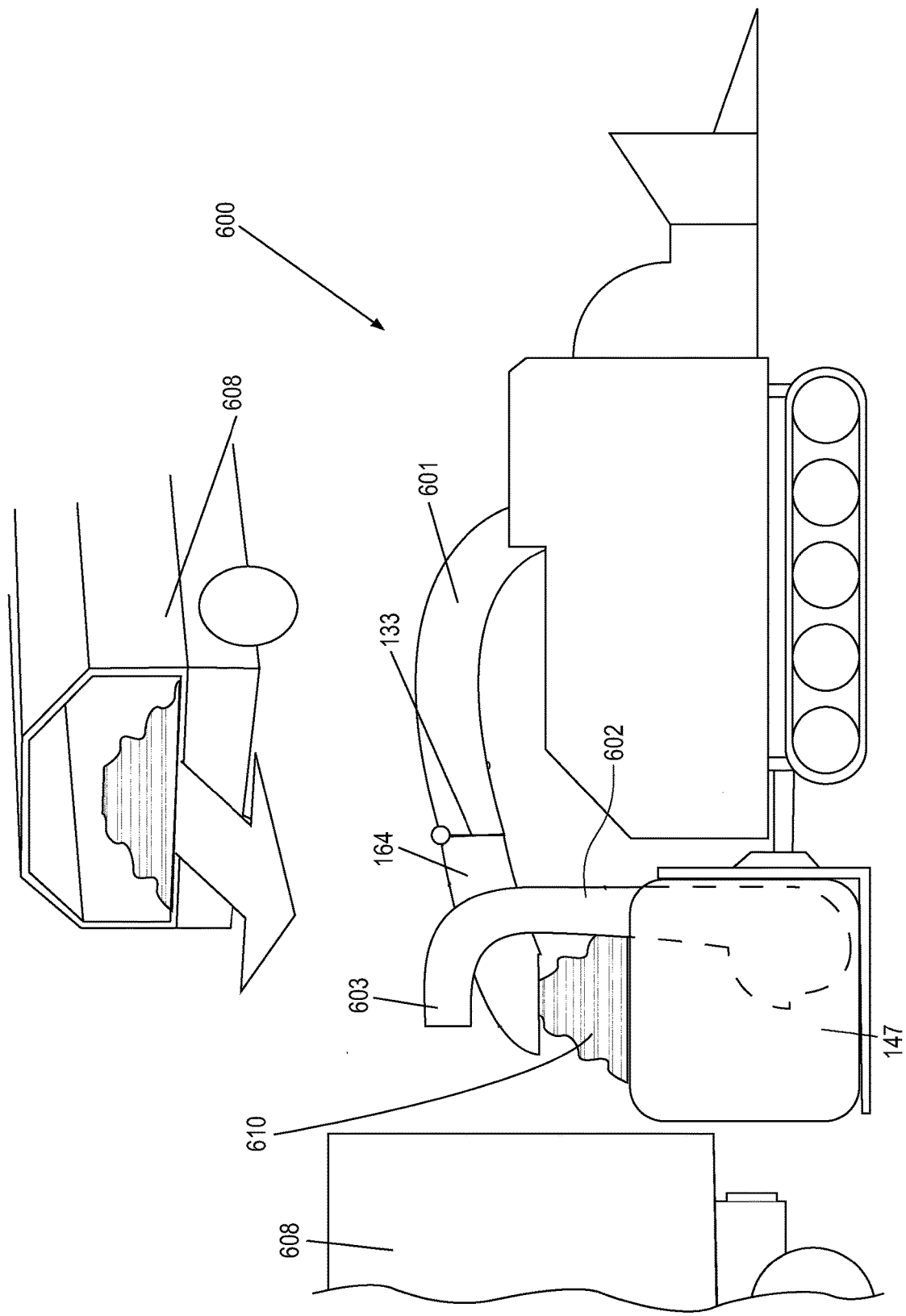
FIG. 27 is a side view illustrating a method of chip discharge into a hopper, and another alternative type of chute system for discharge of chips from the hopper and into a truck mounted chip box.
Figure 27A:
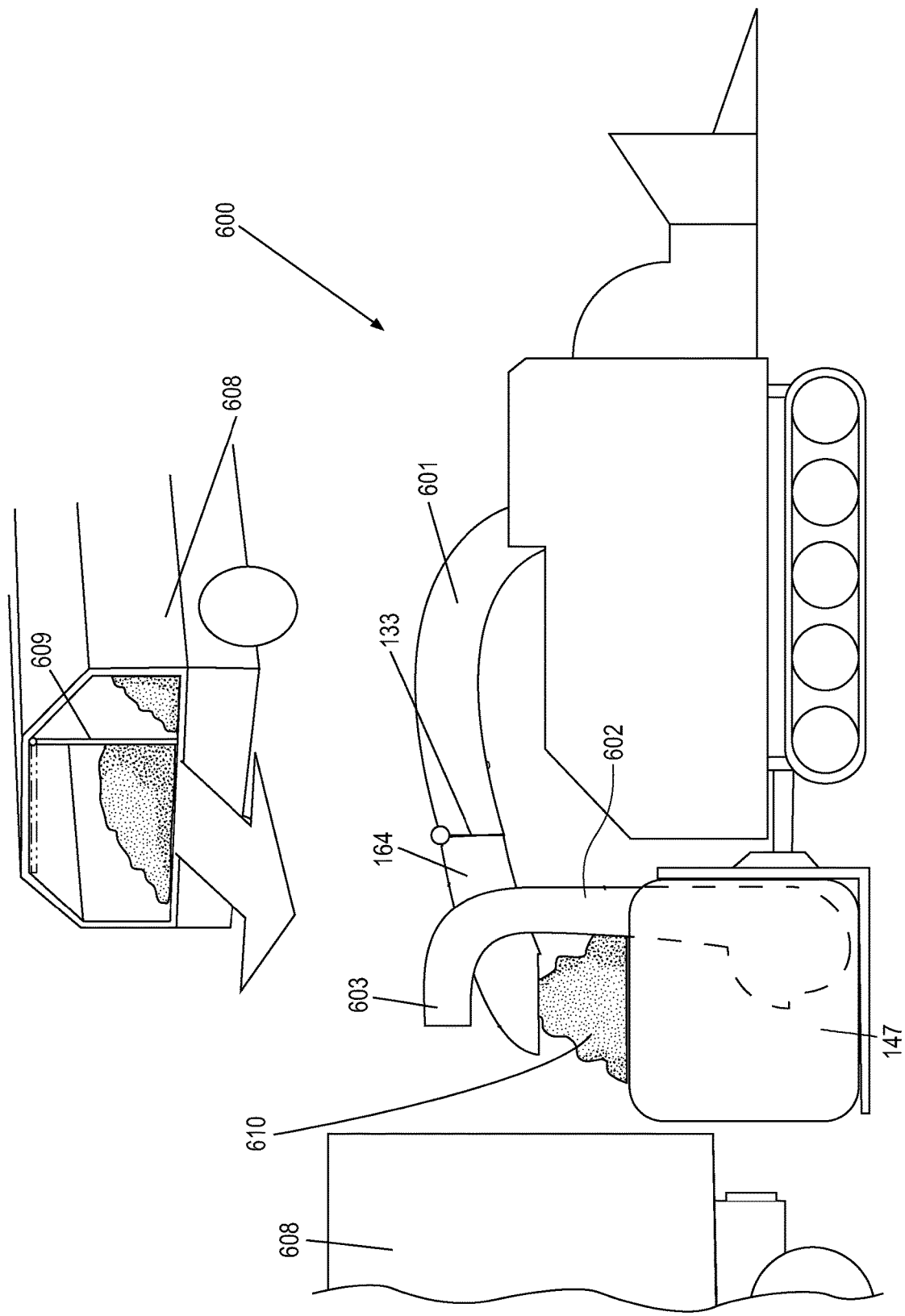
FIG. 27A is a side view illustrating a method of chip discharge into a hopper, and another alternative type of chute system for discharge of chips from the hopper and into a truck mounted chip box including a wall or walls for compartmentalizing chips.
Figure 28:
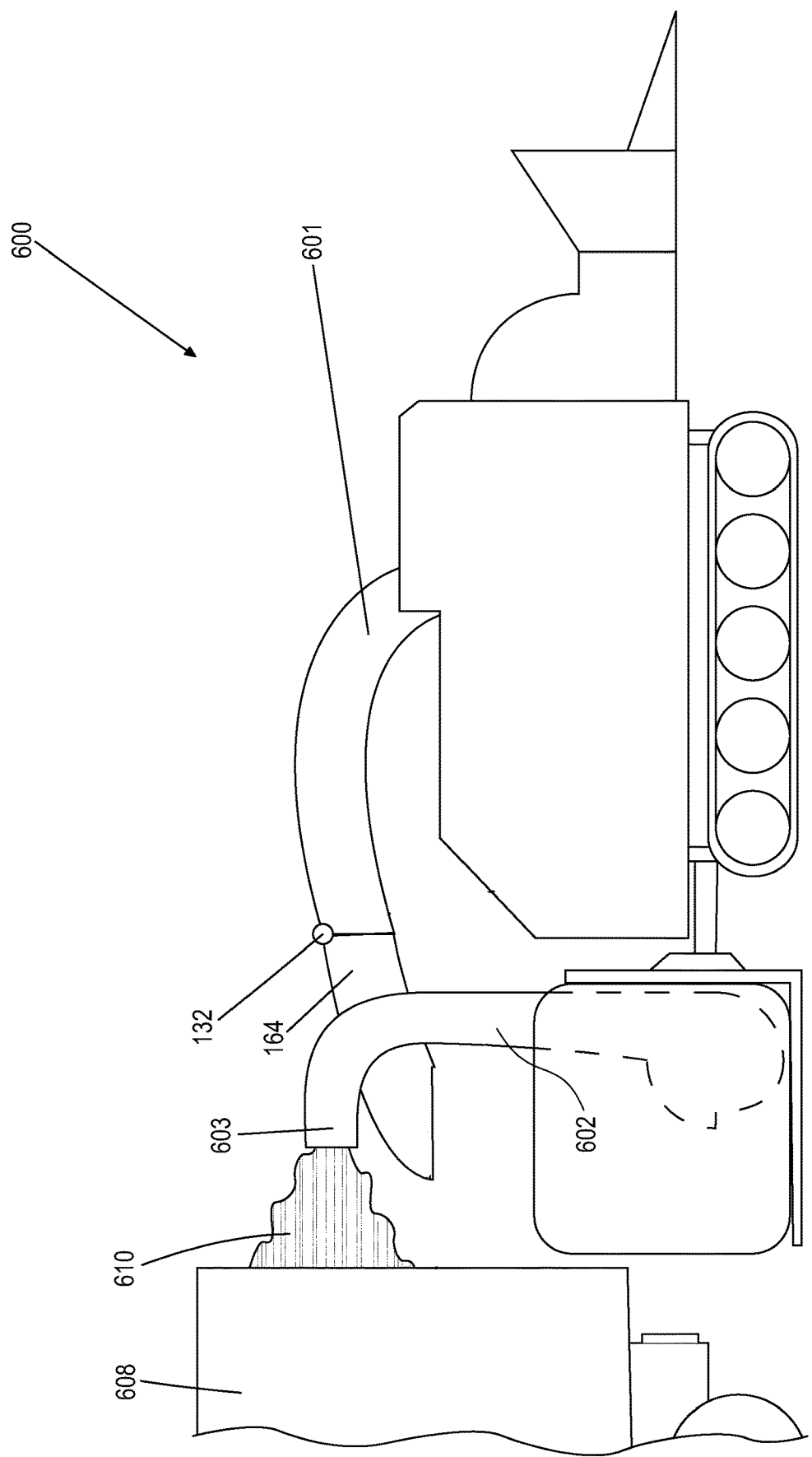
FIG. 28 is a side view illustrating a method for the discharge of chips from the hopper and into a chip box on the back of a truck.
Figure 29:
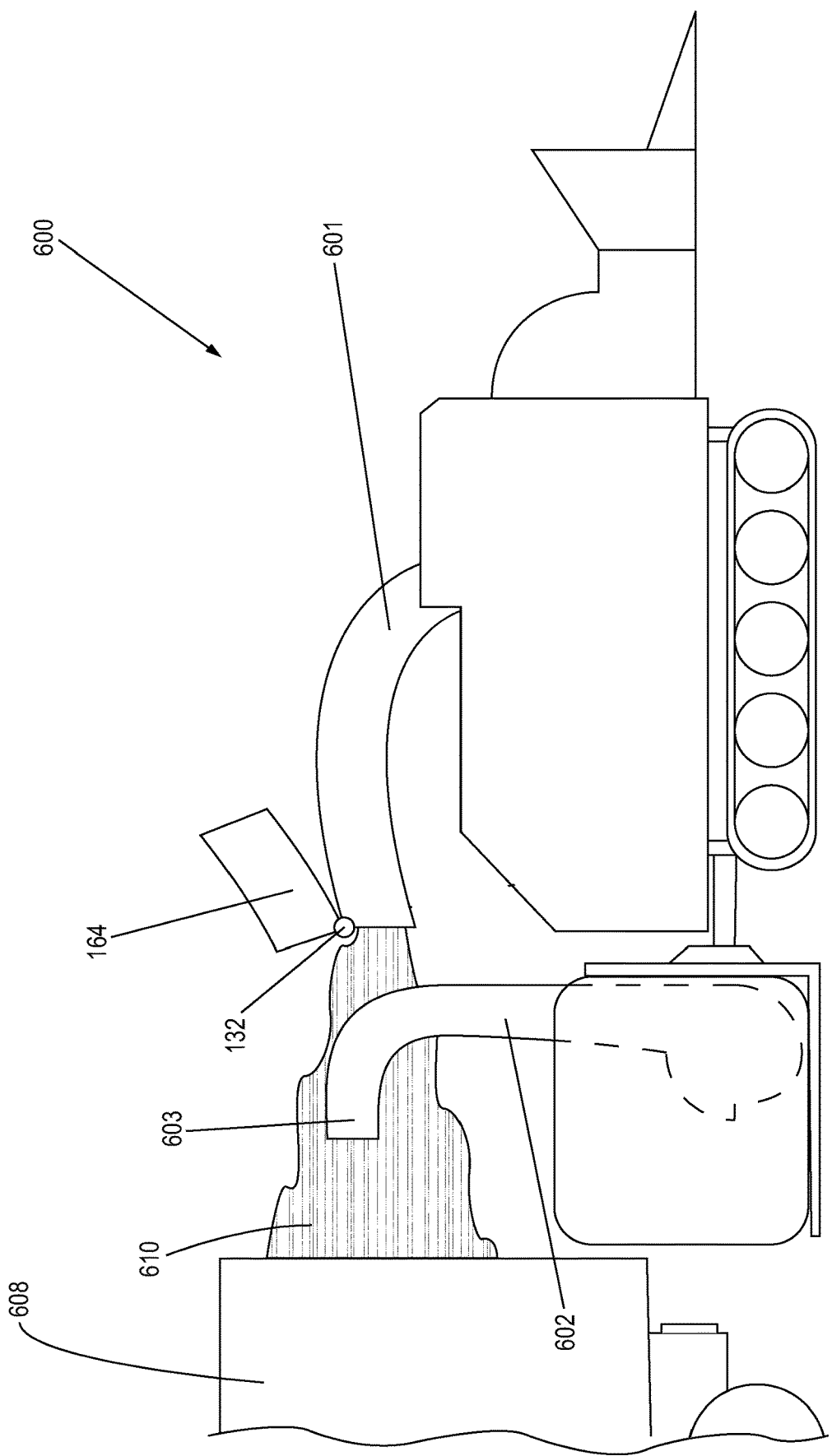
FIG. 29 is a side view illustrating a method for the discharge of chips directly into the back of a truck mounted chip box.

FIGS. 27-29 illustrate yet another alternative embodiment relating to management of the flow of the processed wood products exiting the shroud 158 or exiting the collection hopper 147. In the previous embodiments, the chute transfer system included a discharge chute that was movable from a first location adjacent the shroud 158 to a second location adjacent the blower housing chute 145 (e.g., either manually or through various devices). In other words, the same chute was used to guide the processed wood products into the collection hopper 147 and guide processed wood products out of the collection hopper 147. In contrast to these earlier embodiments, this embodiment includes a chute transfer system 600 having two separate discharge chutes, one for guiding the processed wood products into collection hopper 147, and another chute for guiding the processed wood products out of collection hopper 147. In this regard, chute transfer system 600 includes a curved first chute 601 having one end coupled to shroud 158 and another end coupled to upper chute segment 164 such as via hinge 133. When the upper chute section 164 is engaged with the curved first chute 601, the processed wood products stream 610 may be directed toward the collection hopper 147 and accumulated therein, as illustrated in FIG. 27. When the upper chute section 164 is disengaged from the curved first chute 601, the processed wood products may be directed out of the curved first chute 601 and directly into a chip box truck with an open back 608, as illustrated in FIG. 29. Further shown in FIG. 27 and FIG. 27A, the open back 608 may include at least one interior wall 609 compartmentalizing the opening so that biomass material, such as that produced from chipping or grinding the above grade portion of the tree, can be separated. For instance, the operator may choose to separate clean wood from stump grindings within the same chip box truck. Such clean wood may include wood free from dirt, rock, and other contaminates that may make undesirable for consumption in a power plant furnace or other application. The interior wall 609 may be permanently or temporarily placed. For example, the wall may be hinged and pivotable between a first position and a second position. Furthermore, an interior wall 609 may be used to selectively close a compartmentalized portion by closing all or part of open back 608. This may aid the operator in later sorting any biomass placed in such compartments. For instance, it may be desirable to dump or otherwise unload differing compartmentalized biomass in differing locations. As illustrated in FIG. 28, processed wood products may be evacuated from the collection hopper 147 as described above (e.g., impeller 234, blower motor 207, etc.) and directed through a J-shaped second chute 602 and exiting at the second chute opening 603. The outlet stream 610 may be directed from the second chute opening 603 into a chip box truck with an open back 608. Also, the collection hopper 147 may be mounted as illustrated in FIG. 28 via the hopper support arms 700 shown in FIG. 14 or may be mounted via the lifting arms 130 shown in FIG. 34.

Figure 30:
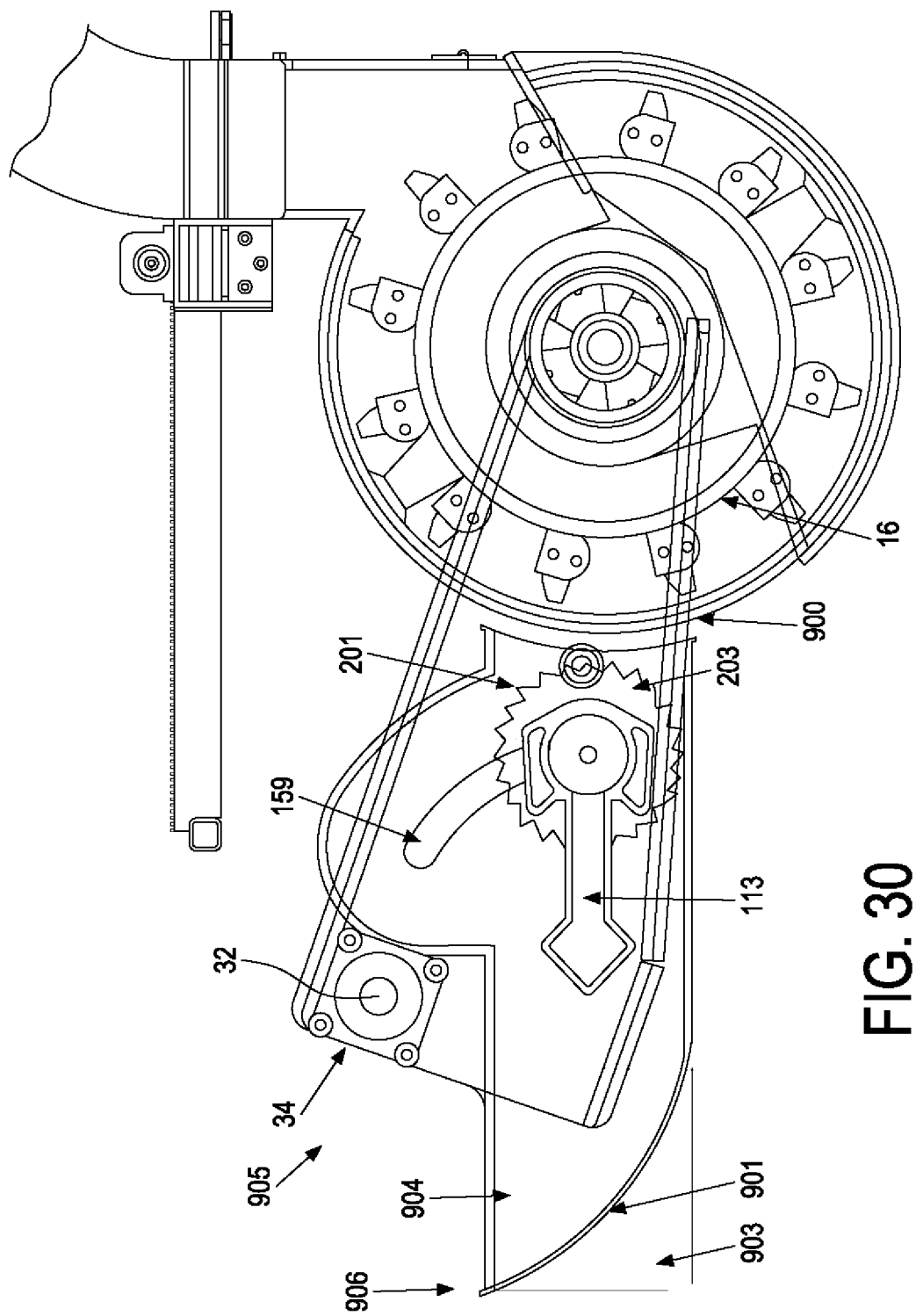
FIG. 30 is a side view illustrating the feed roller housing when the drum is in the chipping position.

FIG. 30 depicts a configuration for the feed roller assembly 905 of the apparatus 10 when it is in the chipping position as discussed above. The drum 16 may be proximate to the anvil surface 58 (shown in phantom) when in the chipping position. The feed roller grip plate 201 is a component of the feed roller 203, and is attached to a feed roller control arm 113 that is restricted to movement within an arcuate slot 159. As the rotation of the feed roller 203 pulls wood products, such as tree limbs, toward the drum 16, the feed roller control arm 113 pivots upward, travelling along the path defined by the arcuate slot 159, thereby accommodating wood products of different sizes. Alternatively, the wood products of differing sizes may be delivered to the drum 16 along a path other than the above mentioned arcuate slot 159. For instance, the wood products of different sizes may be vertically raised above the ground 14 to contact the drum 16 or a portion of the apparatus may lower such that the feed roller control arm 113 moves vertically down with the drum 16 to the wood products located below.

Feed roller assembly 905 may further be designed to accommodate the movement of the drum 16 between the chipping and grinding positions. More particularly, the feed roller assembly 905 includes feed table housing 903 fixed to the frame of apparatus 10 (e.g., chassis of vehicle 150) and a feed housing 904 coupled to the drum 16 such that the feed housing 904 rotates therewith. In this regard, in the chipping position, the end of feed table housing 903 may be positioned proximate feed housing 904 so that wood products fed to feed table housing 903 may be ultimately directed toward drum 16 via feed housing 904 (FIG. 30). However, as the feed housing 904 rotates with the drum 16 to the stump grinding position, the feed housing 904 and feed table housing 903 may be movable relative to each other in a non-interfering manner (i.e., one does not interfere with the other as feed housing 904 rotates to the downward position). This may be accomplished in part by means of a sufficient gap 906 separating the end of feed table housing 903 from feed housing 904. Feed housing edge 901 may be defined by a generally curved surface that corresponds to a similar curve at the end of feed table housing 903 (not shown). In this exemplary embodiment, feed housing 904 is able to rotate with the drum 16 downward to a grinding position without interfering with the end of feed table housing 903. This cooperating geometry, while reflective of the exemplary embodiment is not meant to limit other complementary configurations that result in a non-interfering relationship between the two parts.

Figure 31:
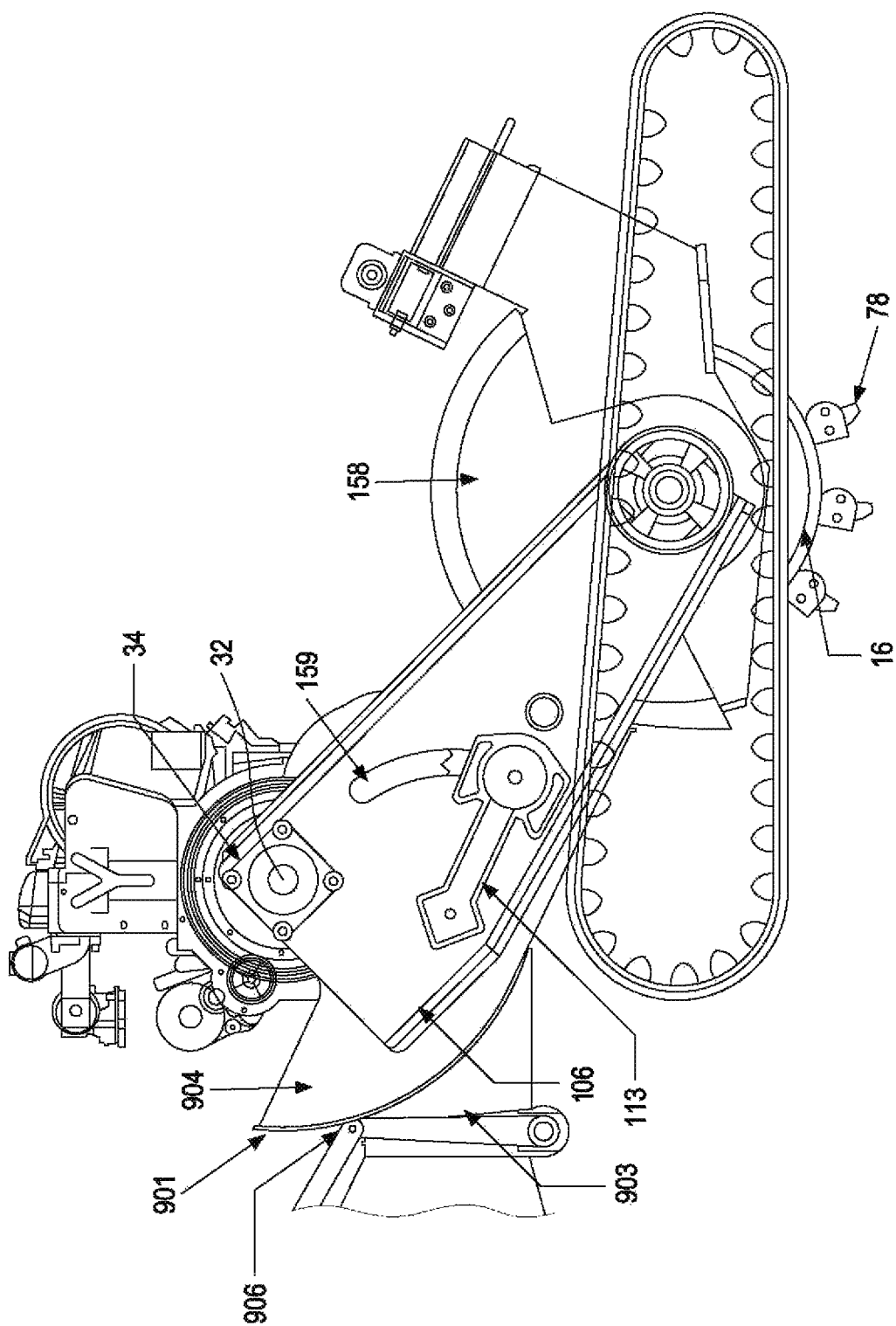
FIG. 31 is a side view illustrating the feed roller housing when the drum is in the grinding position.

FIG. 31 includes the components of FIG. 30 showing the drum 16 in the downward grinding position for the purpose of grinding stumps, as previously discussed. In this position, the support arm 106 pivots on the first drive shaft 32, which is, in turn, supported by the interior bushing 34. Shroud 158 substantially surrounding the drum 16 may be retracted so that the teeth 78 can engage the stump. In this position, feed housing edge 901 may be raised relative to the upper end of feed table housing 903 when compared to the relative position of these two components as shown in FIG. 30.

Figure 32:
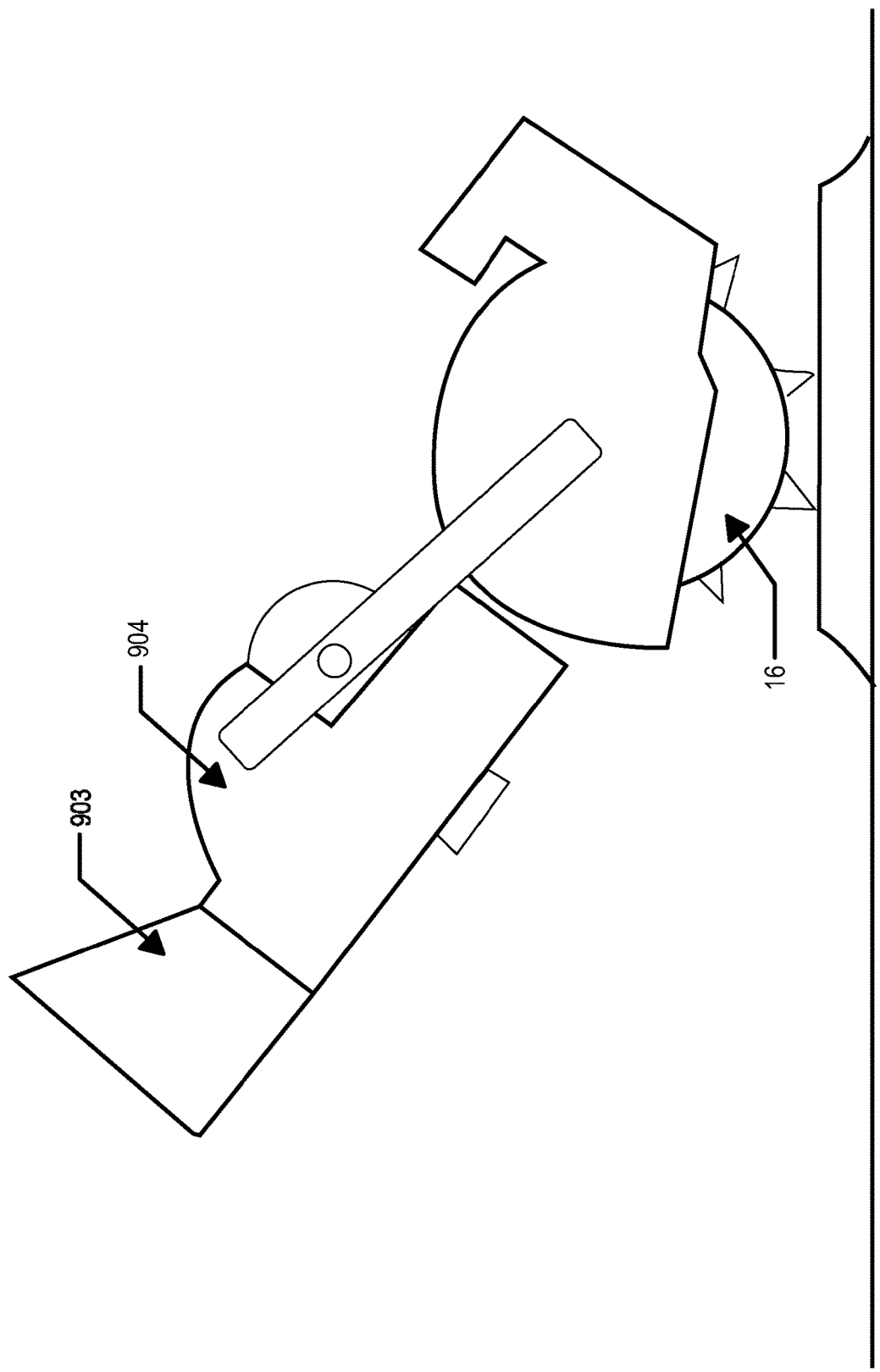
FIG. 32 is a schematic view of alternative feed roller housing.

Additionally, the feed roller housing may have different configurations. In this regard, both the feed table housing 903 and the feed housing 904 may be fixed to the frame so that they do not move with movement of the drum 16. Alternatively, and as schematically illustrated in FIG. 32, the feed table housing 903 and the feed housing 904 may be operatively coupled to the drum 16 so that both move with movement of the drum 16. Thus, the feed roller assembly may have several alternative configurations.

Figure 33:
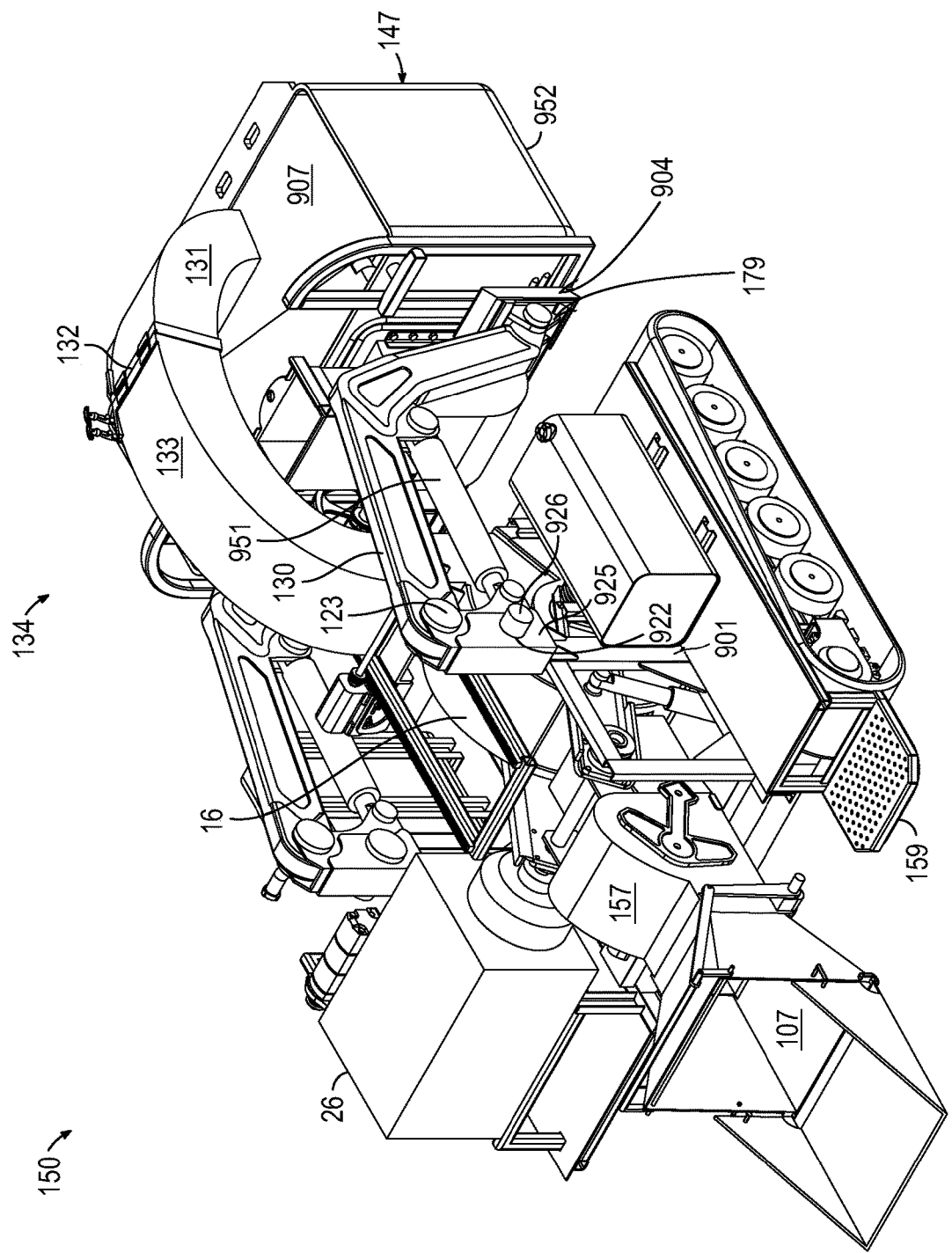
FIG. 33 is a perspective view of an apparatus in accordance with one embodiment of the invention.
Figure 34:
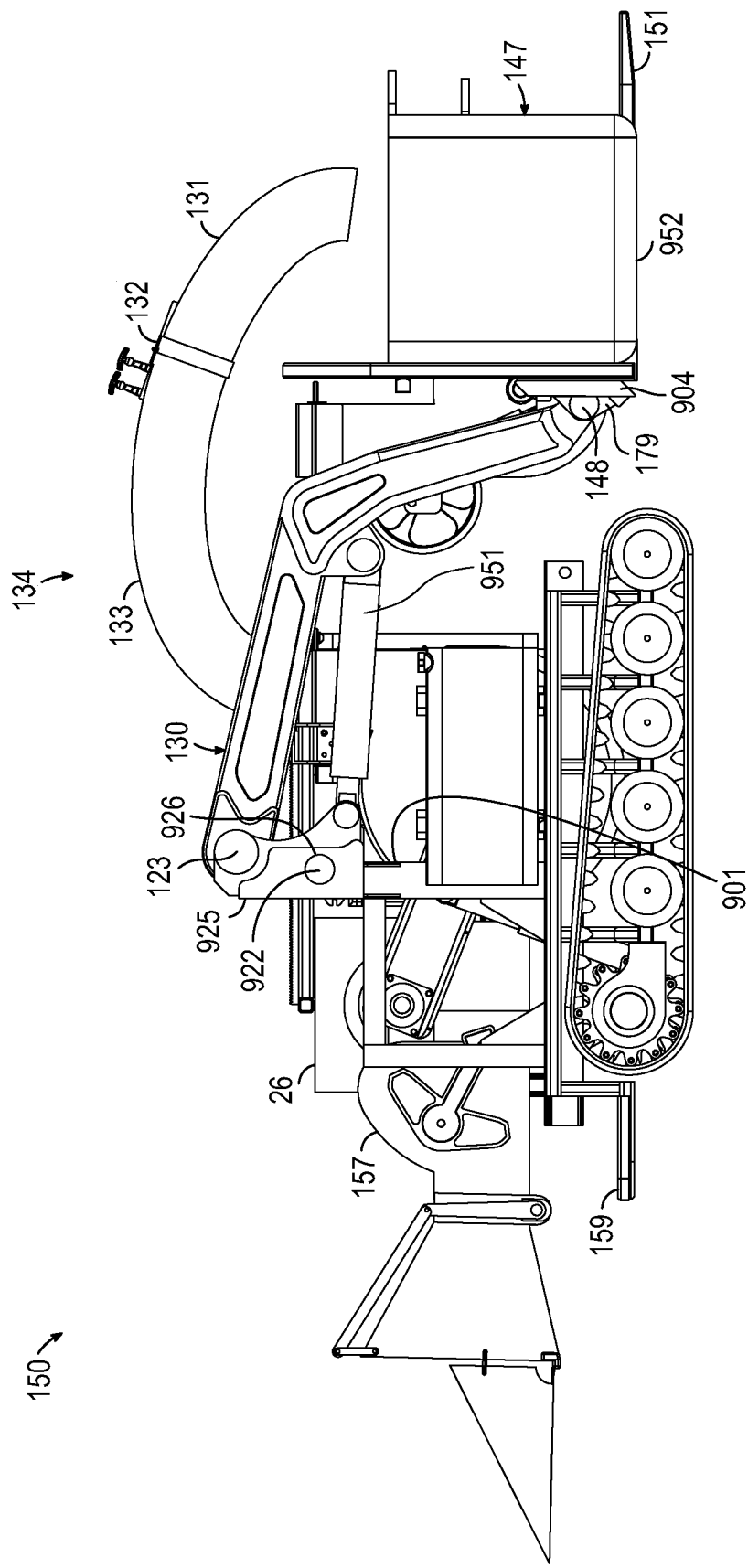
FIG. 34 is a side view of the apparatus of FIG. 33.

With reference now to FIGS. 33 and 34, an exemplary embodiment of an apparatus 150 is illustrated. For ease of understanding and brevity of explanation, like reference numerals in FIGS. 33 and 34 and in the other succeeding figures refer to similar features in any of the other figures in the present disclosure. The apparatus 150 in the embodiment illustrated in FIGS. 33 and 34 takes the form of a wood chipper vehicle 150. Chipper vehicle 150 is a track-driven device propelled by a prime mover in the form, in this embodiment, of a hydraulic motor or engine 26 that provides enough power to the vehicle 150 such that it may move relative to the ground. Chipper vehicle 150 includes a main portion that contains the hydraulic motor 26, as well as an operator platform 159 that permits the operator to drive the vehicle 150 and control operation of its various components. The vehicle 150 includes a wood chipping device, which could for example be a controlled-feed type, as shown in the figure, or a direct-feed type (not shown). The chipper vehicle 150 is capable of performing a variety of functions, all of which are powered by a suitably chosen power system, such as a fluid power system or an electric power system, for example, and which may additionally take the form of the same hydraulic motor 26 that serves as the prime mover for the chipper vehicle 150. Self propelled vehicles, wood chippers and fluid power systems are well known by those of ordinary skill in the art and are not discussed in detail herein.

Figure 37:
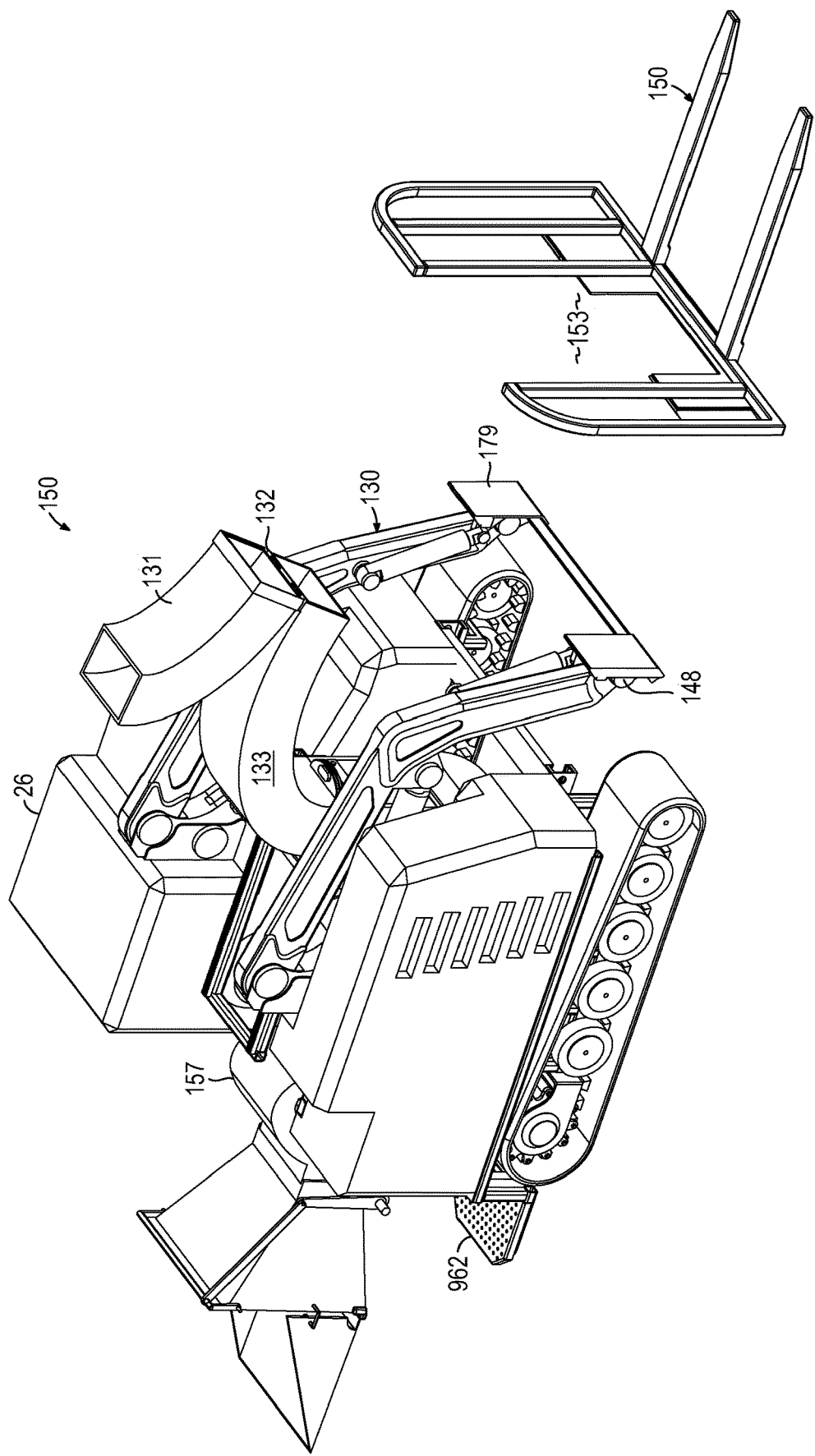
FIG. 37 is another perspective view of the apparatus of FIGS. 33 and 35 illustrating an exemplary connection between the lifting arms and a fork and hopper support.
Figure 38:
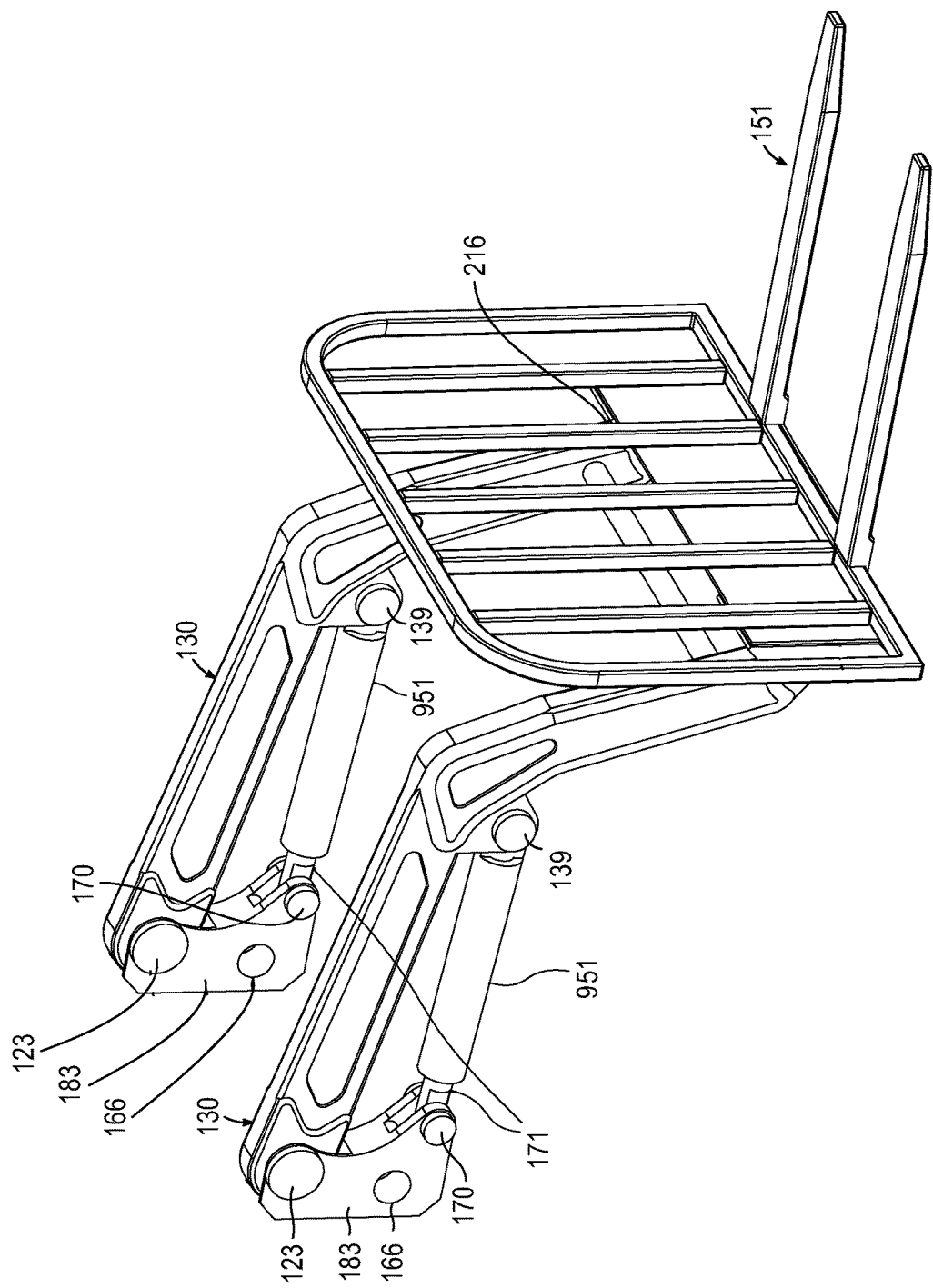
FIG. 38 is a perspective view of a pair of lifting arms supporting an optional fork and hopper support assembly.

The chipper vehicle 150 includes a pair of lifting arms 130, which are connected to the main portion of the chipper vehicle 150 by a pair of structural arm attachment posts 901. The lifting arms 130 are nestled into a generally U-shaped arm attachment receiving bracket 925 that includes a lifting arm pin receiver hole 922 that selectively receives a pin 926, the engagement of which couples the lifting arms 130 to the main portion of the chipper vehicle 150. The lifting arms 130 are selectively raised and lowered, with such raising and lowering being facilitated in this embodiment by power from the chipper vehicle's hydraulic system through an extension of a hydraulic cylinder 951. The lifting arms 130 are in this embodiment coupled, by means of an attachment plate 904, to a fork and hopper support assembly 151 (FIGS. 37 and 38). The fork and hopper support assembly 151 can then be used to support and carry a chip collection hopper 147 having a ground engaging surface 952 and a scoop edge 908 adjacent the ground engaging surface 952 and positioned so as to facilitate transfer of material such as wood chips into an interior 907 of the collection hopper 147.

In use, wood pieces (e.g., tree branches) are fed into an inlet port 107 of the chipper vehicle 150, and a feed roller 157 pulls the wood pieces into a chipping drum 154 of vehicle 150. The chipping drum 154 reduces the wood pieces to wood chips, where they are then directed through a chute unit 134 into the collection hopper 147. The chute unit 134 includes a base chute 133 that is coupled to an upper chute section 131 through a hinge 132.

Figure 35:
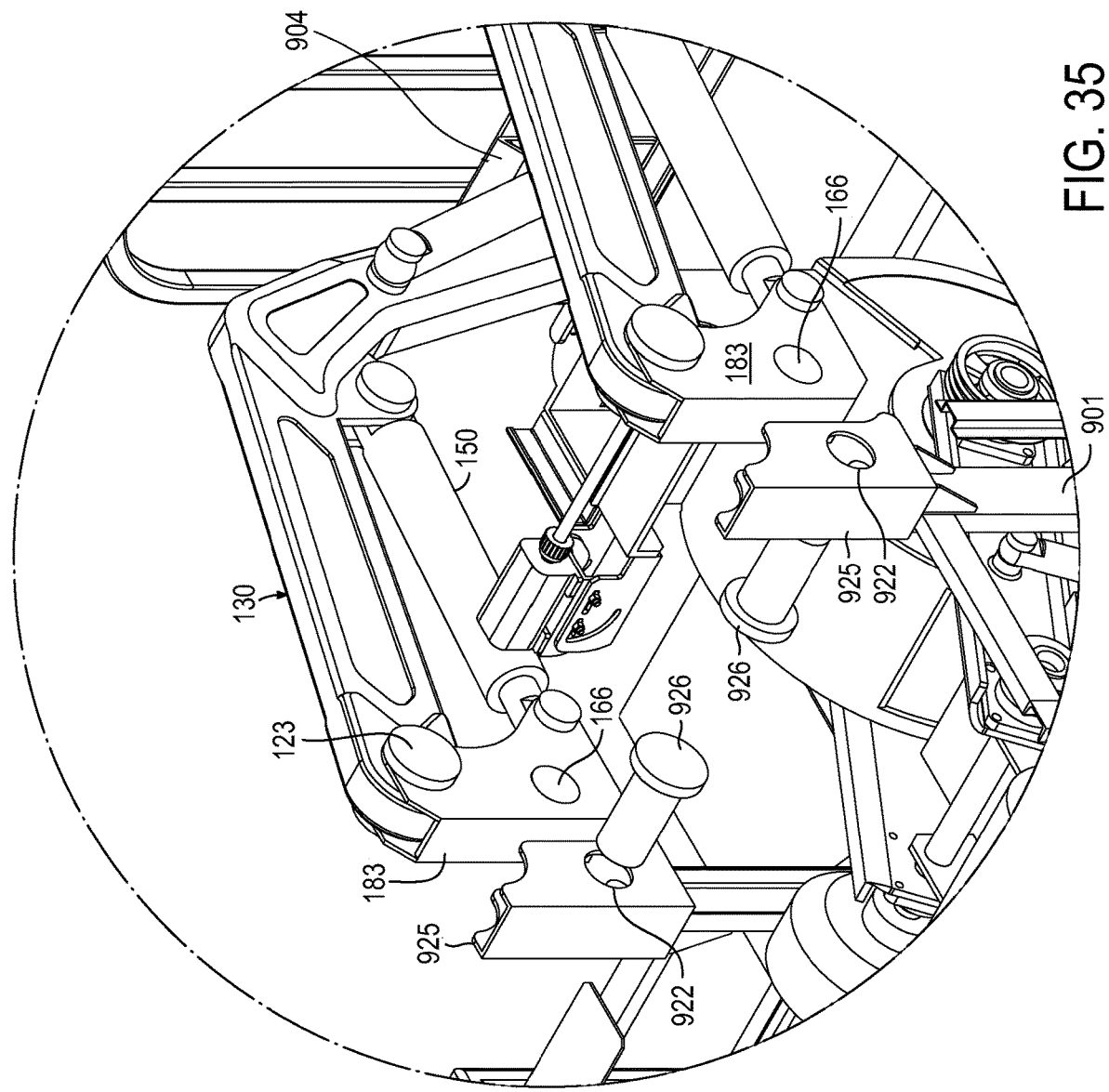
FIG. 35 is an enlarged perspective view illustrating an exemplary connection between a pair of lifting arms and another portion of the apparatus of FIG. 33.

FIG. 35 illustrates the lifting arms 130 in the process of connecting to the main portion of chipper vehicle 150. The structural arm attachment post 901 is mounted on the chassis of the chipper vehicle 150. The arm attachment receiver bracket 925 is attached to the arm attachment post 901. The shape of the receiver bracket 925 accommodates the operating end of the arm attachment bracket 183. When the arm attachment bracket 183 and the receiver bracket 925 are coupled together, the receiver pins 926 are inserted through the arm pin receivers 922 and a pair of lifting arm receivers 166. Once coupled, the lifting arms 130 can pivot within the arm attachment bracket 183 about a pivot location 123.

Figure 36:
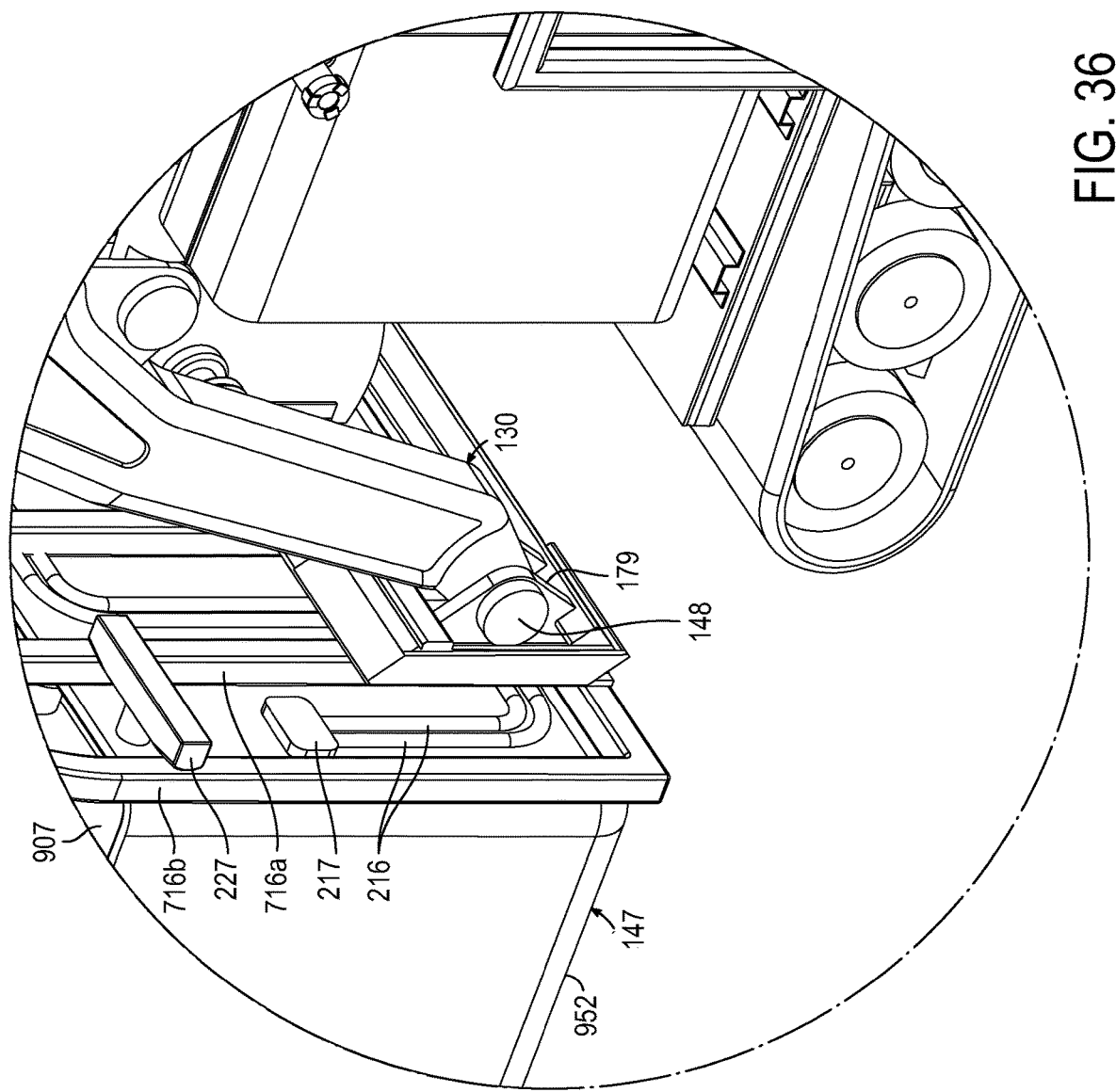
FIG. 36 is another enlarged perspective view illustrating another portion of the apparatus of FIG. 1.

Each of the distal ends of the lifting arms 130 includes a tiltable attachment base 179 (FIGS. 36, 37 and 38). The attachment base 179 permits a variety of attachments to be coupled to the lifting arms 130. The fork and hopper support assembly 151 is one of those optional apparatus that may be selectively coupled to the lifting arms 130 through a pair of attachment receivers 904 that respectively receive one of the attachment bases 179. Each pair of coupled attachment receiver 904 and tiltable attachment base 179 jointly defines a pinch cleat-type hanger. Tiltability of base 179 is facilitated by a hydraulic element that includes one or more hydraulic supply lines 216 fluidly coupled to a hydraulic actuator 148. A quick-disconnect element 217 permits rapid coupling and uncoupling of the supply hydraulic fluid to the actuator 148. As shown in FIG. 37, to accommodate for clearance when attached to the lifting arms 130, the hopper support 151 has been augmented with frame gap 153. The frame gap 153 permits clearance of the arcuate base shoot 133 while in operation.

Figure 38A:
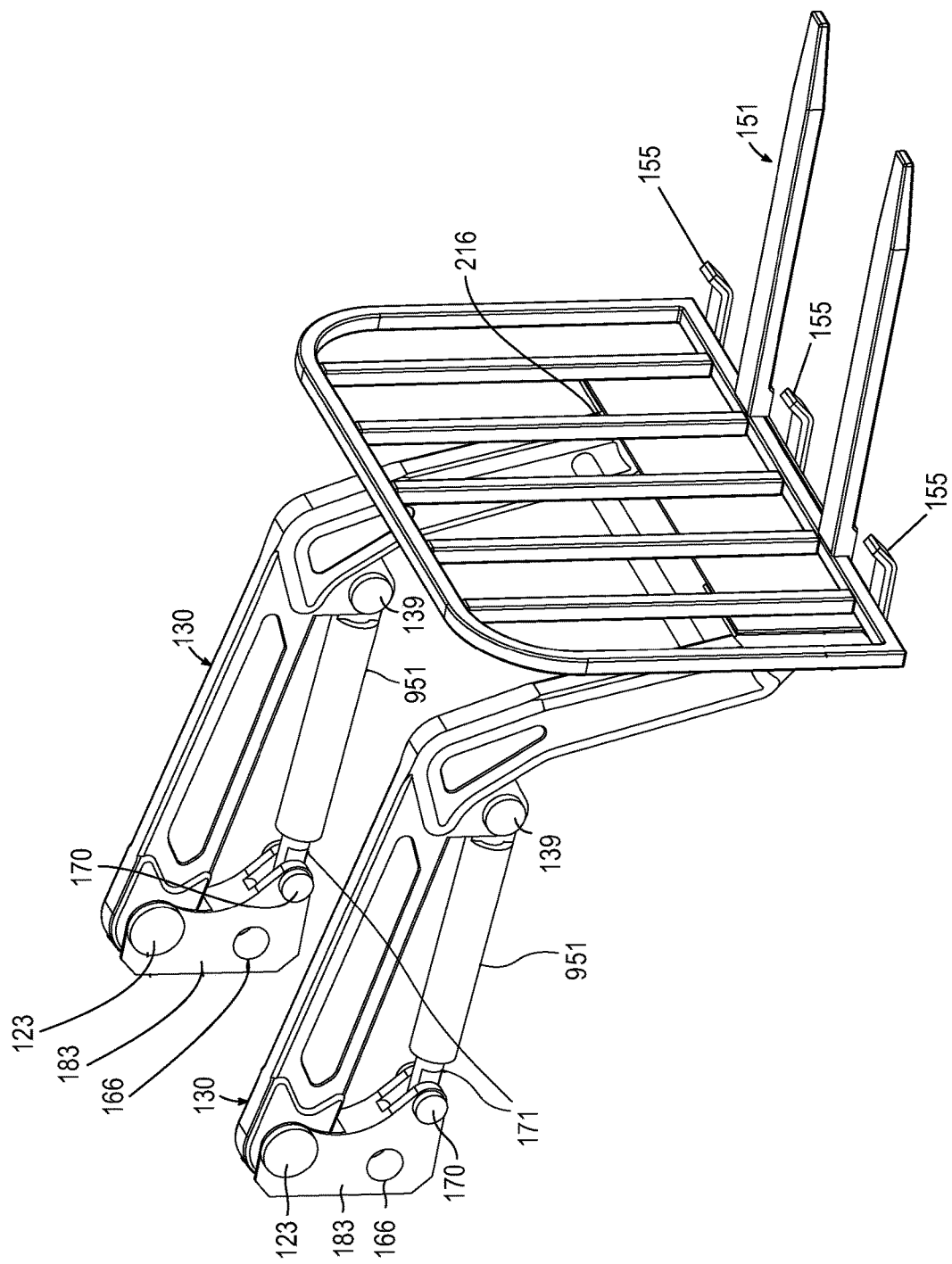
FIG. 38A is a perspective view of a pair of lifting arms supporting an optional fork and hopper support assembly including protective plates.

FIG. 38 also illustrates other features of the lifting arms 130. Specifically, the figure illustrates each arm 130 having a hydraulic cylinder 951 cooperating with a respective coaxial piston 171. Movement of the piston 171 within the cylinder 951 permits movement of pins 139 and 170 relative to one another which, in turn, translates into tiltable movement of the arm attachment bracket 183 supporting the tiltable base 179 through a front segment of the arm 130. Moreover, to minimize damage to the ground, especially over uneven terrain, protective plates 155 may be added to the bottom of the hopper support 151 as shown in FIG. 38A by welding or other like connection means. These protective plates 155 increase surface area in the event of ground contact and may further include a coating to aid in sliding over the surface of the ground.

Figure 39:
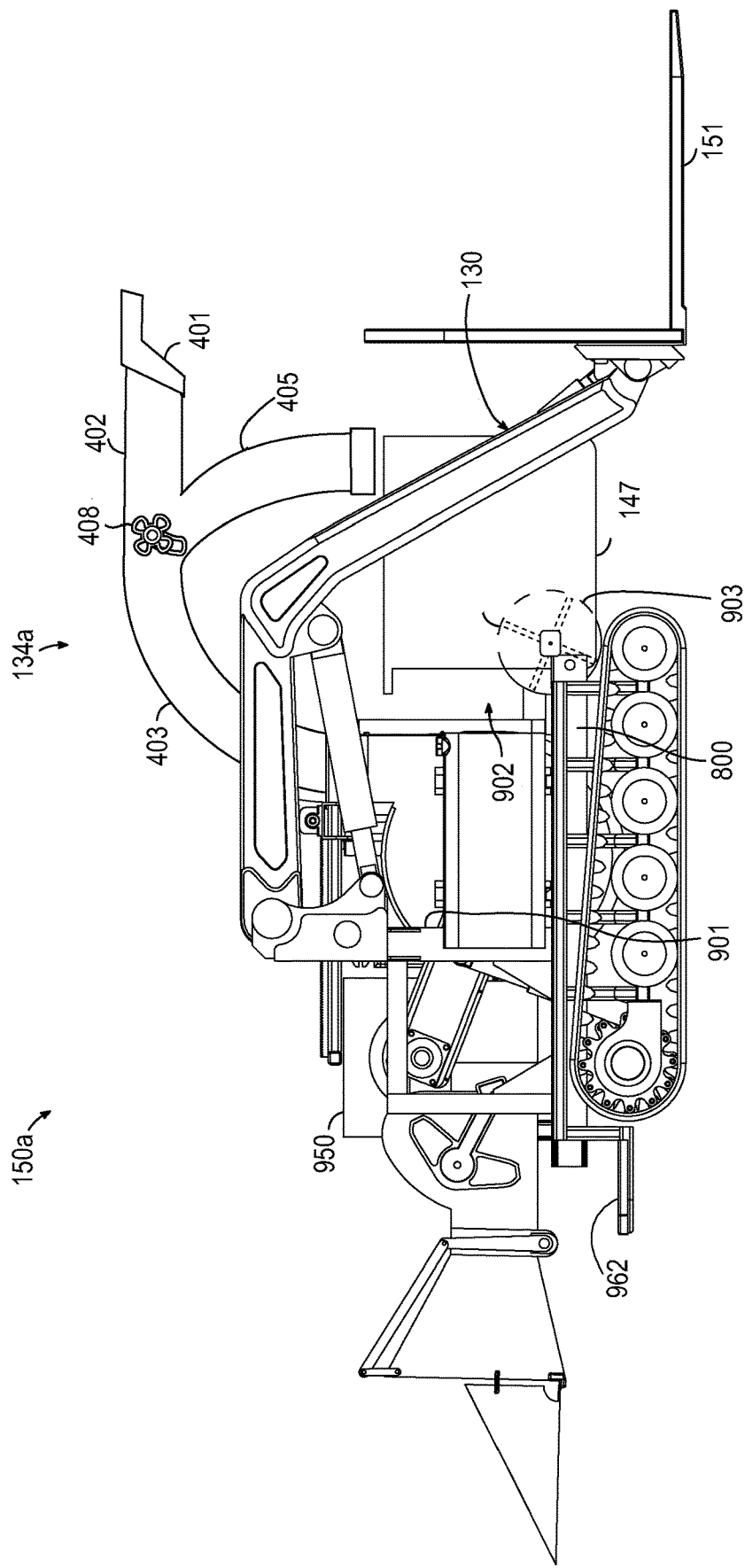
FIG. 39 is a side view of an apparatus in accordance with another embodiment of the invention.

FIG. 39 depicts an alternative embodiment of a chipper vehicle 150a featuring a set of extended lifting arms 900. The collection hopper 147 is supported, in this embodiment, by a hopper support 800 such that the hopper 147 is nested under the extended lifting arms 900, rather than at the distal ends of the lifting arms 900, as in the embodiment of FIG. 33. In the configuration illustrated in FIG. 39, chips on the ground or other types of shredded debris are collected in the hopper 147 and evacuated through an alternative evacuation impeller 903. The evacuation impeller 903 is powered by a hydraulic engine or motor 950, or by some other suitably chosen power source.

Figure 40:
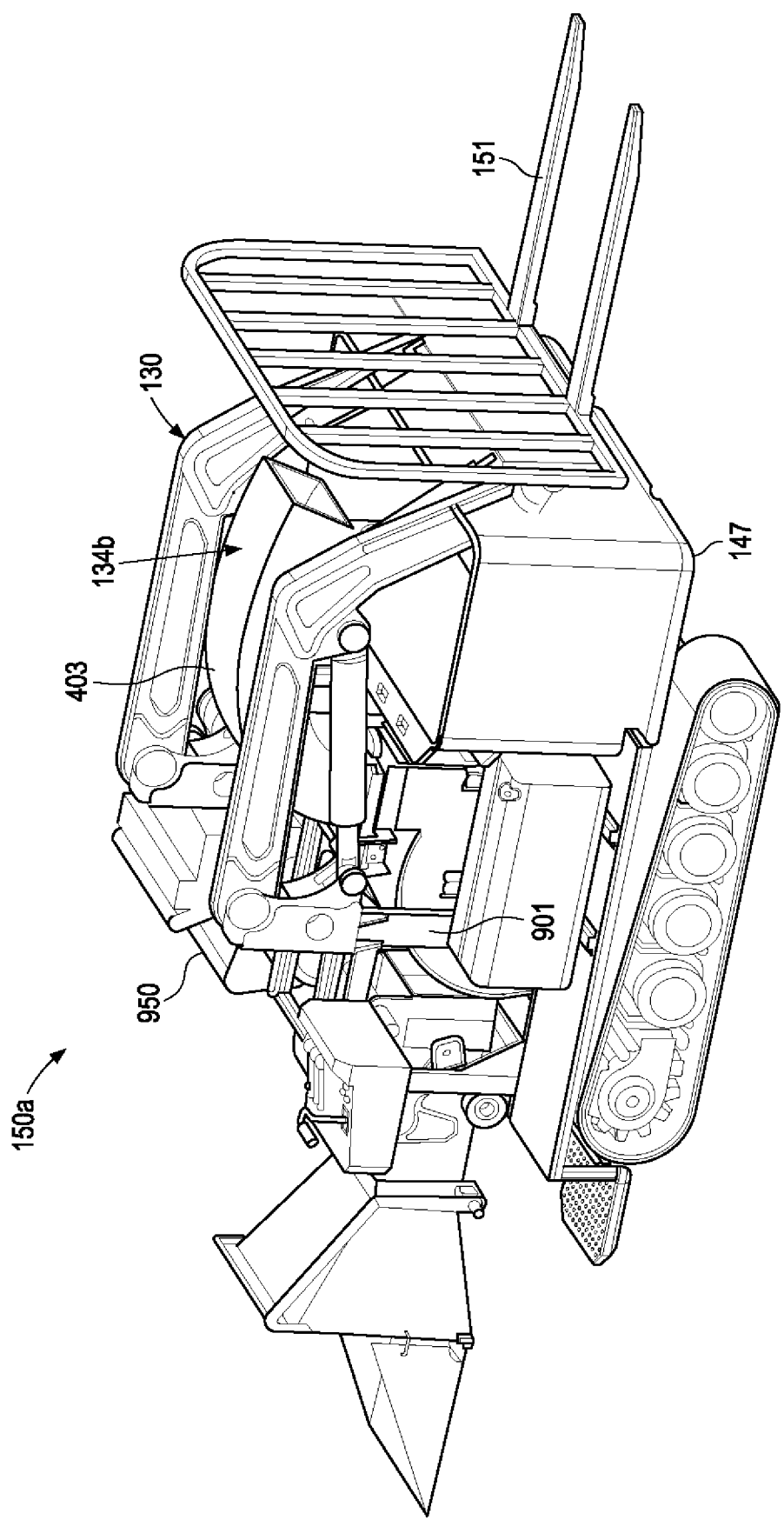
FIG. 40 is a perspective view of an apparatus similar to that of FIG. 4, illustrating a chute unit different from that of FIG. 39.

In operation, chips travel along a blower passageway 902 and enter a curved chute section 403 of a chute unit 134a. A diverter vane (not shown), housed within the chute unit 134a, and actuatable by a diverter knob 408, directs chips into either a straight chute section 402 or a lower curved section 405 of chute unit 134a. Chips and other shredded debris being evacuated from the hopper 147 exit the chute unit 134a through an upper discharge outlet 401. FIG. 40 illustrates a variation of the apparatus 150a, which includes a chute unit 134b having a different configuration from that of chute unit 134a of FIG. 39. In that embodiment, chute unit 134b does not include a lower curved section 405. Like numerals in FIG. 40 refer to similar features in FIG. 39.

Figure 41:
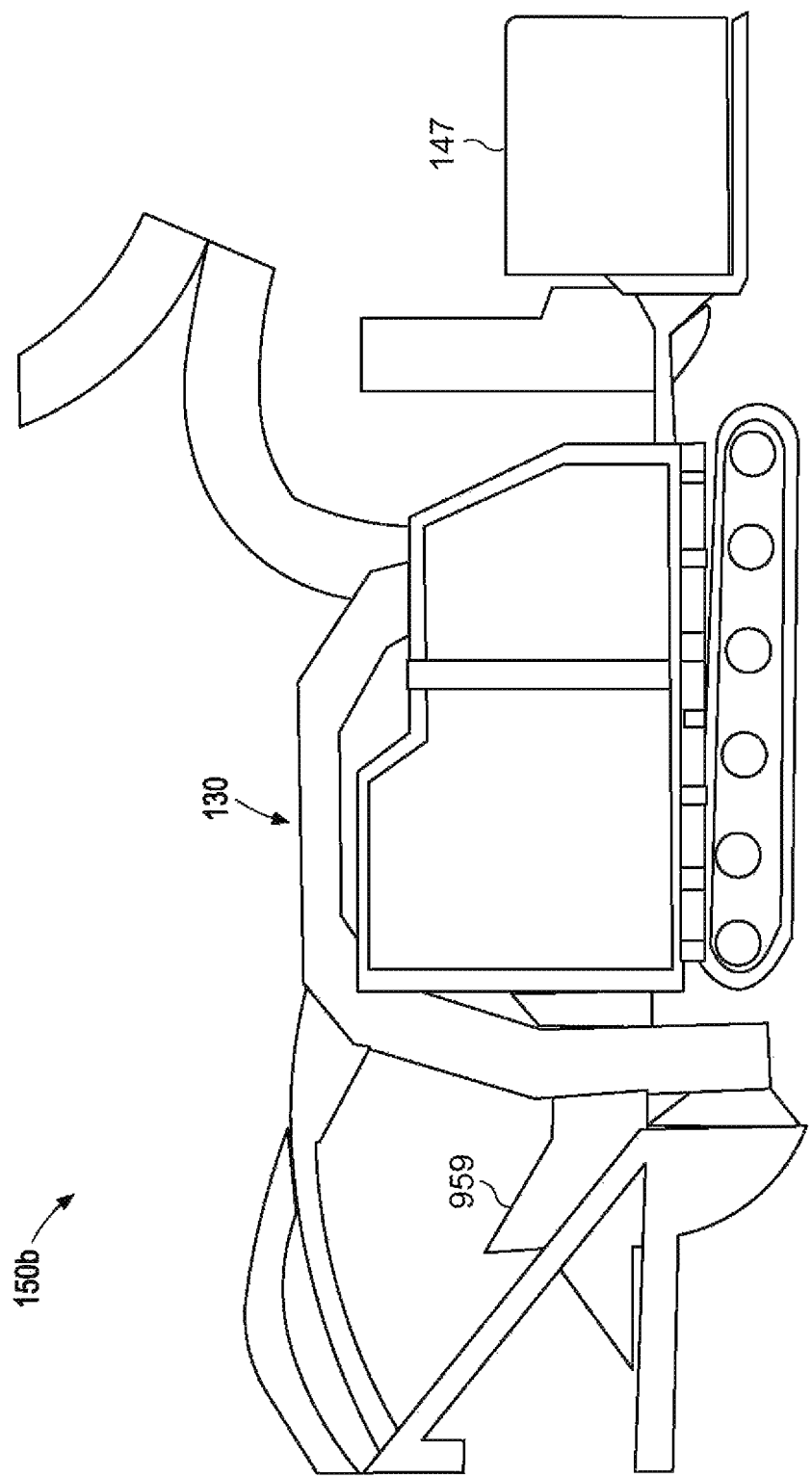
FIG. 41 is a side view of the apparatus of FIG. 33 with an alternative orientation of the lifting arms.

FIG. 41 depicts an alternative embodiment of a chipper vehicle 150b, in which each of a pair of lifting arms 917 is oriented opposite from the orientation of the lifting arms 130 of the embodiment of FIG. 33. The lifting arms 917 are mounted on the side of the chipper vehicle 150b, proximate the hopper 147, at a first end of the vehicle 150b. The lifting arms 917 are configured to extend over the infeed table 959 of the chipper device, at a second end of the vehicle 150b opposite the first end.

Figure 42:
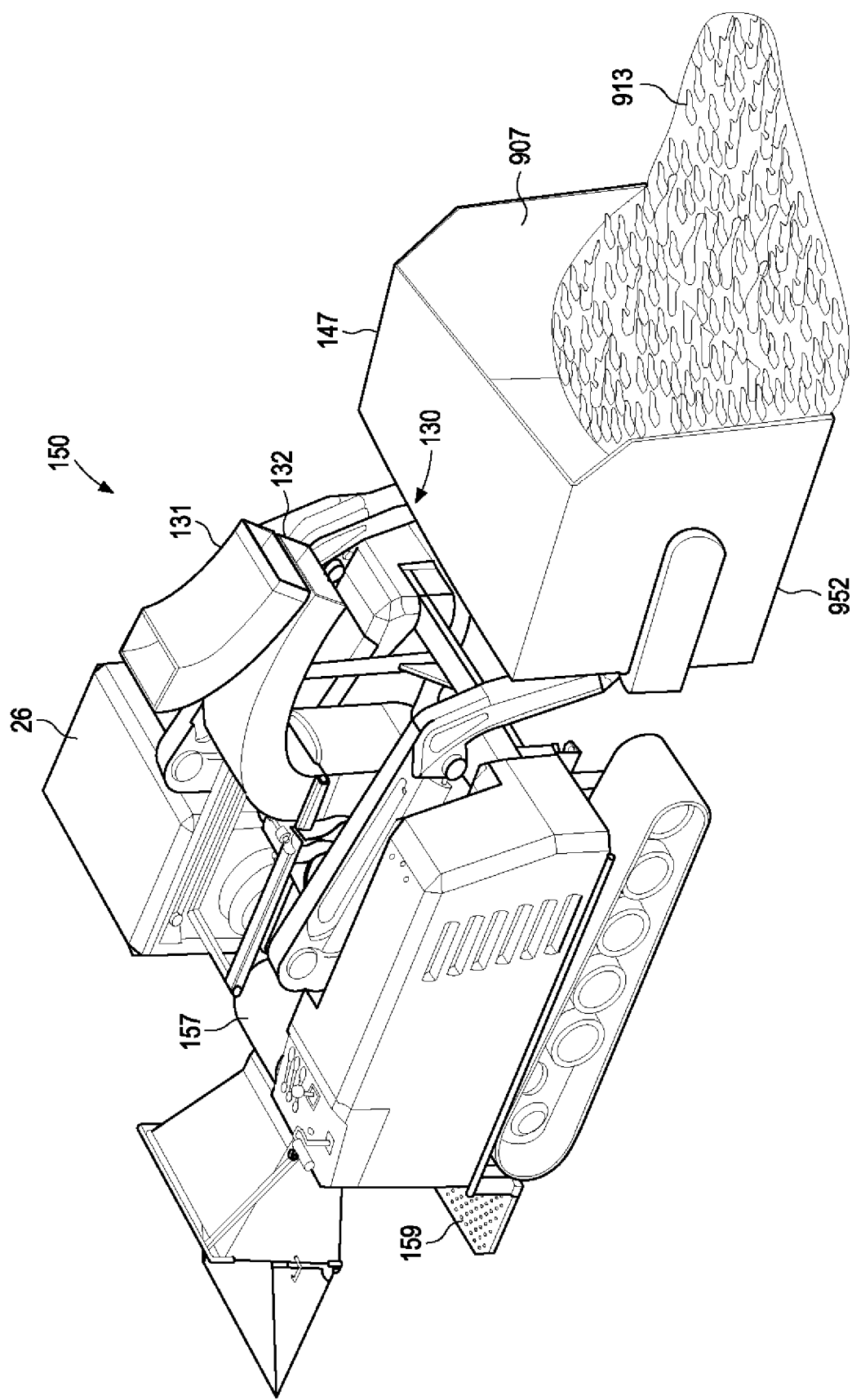
FIG. 42 is a perspective view of the apparatus of FIG. 33 with an optional tiltable hopper attachment.
Figure 43:
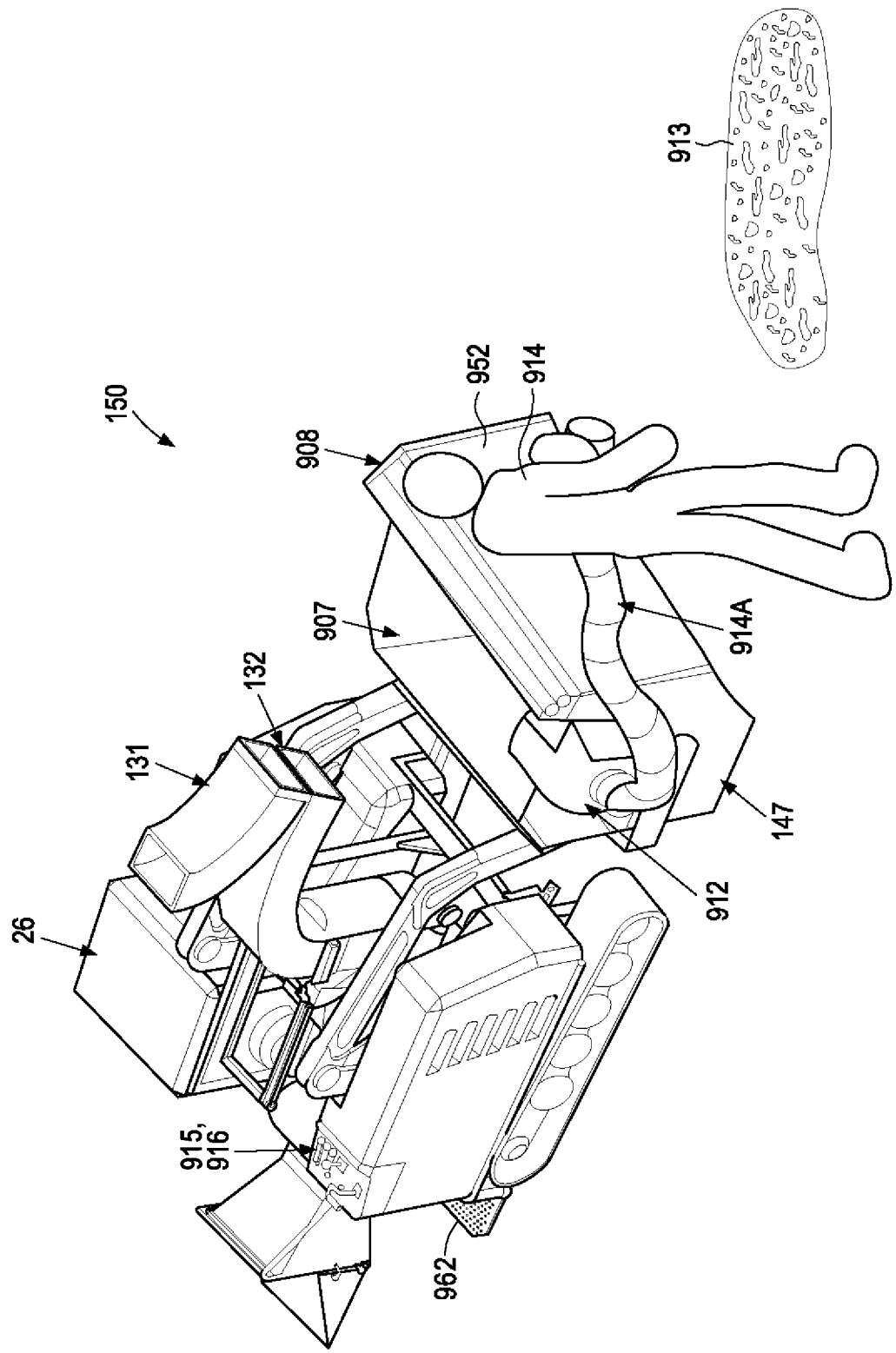
FIG. 43 is a perspective view of the apparatus of FIG. 33 with an optional hopper attachment including an integrated vacuum and hose assembly.
Figure 44:
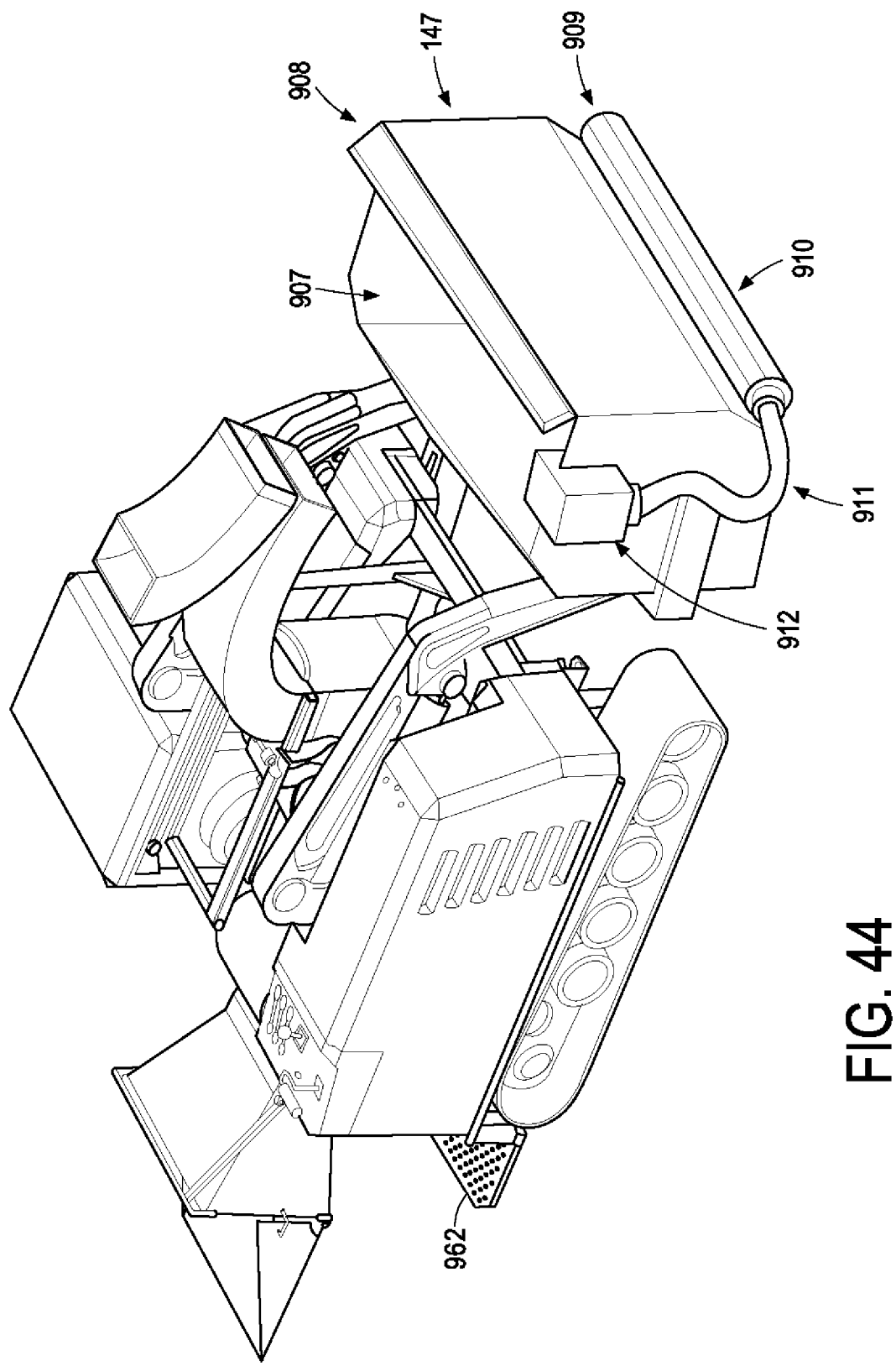
FIG. 44 is a perspective view of the apparatus of FIG. 33 with an optional hopper attachment including an integrated vacuum and suction bar assembly.

FIGS. 42, 43, and 44 illustrate various optional attachments for any of chipper vehicles 150, 150a, 150b, and various corresponding methods for collecting wood chips and other debris from the ground. The hopper 147 can be directly connected to the tiltable attachment base 179, allowing the hopper 147 to be selectively tilted forward approximately 90 degrees. When the ground engaging surface 952 of the hopper 147 is in direct contact with the ground, the chipper vehicle 150, 150a, 150b can be driven forward. Loose debris such as wood chips 913 are then scooped into the hopper interior 907 by virtue of the forward movement of the chipper vehicle 150. Once the hopper 147 is full, the hopper 147 is tilted backwards through a corresponding tilting movement of attachment base 179 so that the ground engaging surface 952 is generally parallel to the ground. In this configuration, the wood chips 913 can then be transported to a selected site for further disposition.

FIG. 43 illustrates another alternative method of collecting wood chips 913. The chipper vehicle 150 of FIG. 33 (or alternatively the chipper vehicles 150a or 150b of other figures) is equipped with a collection hopper 147 having an integrated vacuum assembly 912. The integrated vacuum assembly is connected to a handheld debris tube 914A. The operator 914 directs the handheld debris tube 914A to a pile of wood chips 913 on the ground such that they may be drawn into the collection hopper 147. The integrated vacuum assembly 912 is hydraulically powered by the same hydraulic motor 26 (FIG. 31) that powers the chipper vehicle 150, although it is contemplated that it could alternatively be powered by another power source, such as a dedicated engine, for example. FIG. 43 also illustrates a direction control panel 915 and a set of auxiliary controls 916 for all other functions of chipper vehicle 150. The controls 915, 916 include a plurality of hydraulic spool valves (not shown) that allow the operator of chipper vehicle 150 to incrementally apply a proportionate amount of hydraulic flow corresponding to the specific task at hand, although it is contemplated that other means of hydraulic control or other type of control may be employed instead or in addition.

Yet another alternative method of collecting wood chips 913 is illustrated in FIG. 44. The collection hopper 147 in that figure includes an integrated vacuum assembly 912 having a debris hose 911 connected to a hopper suction bar 909 on the front end of the collection hopper 147, proximate to the ground. Wood chips 913 enter the hopper suction bar 909 through a receiving aperture 910 on the hopper suction bar 909. In operation, the integrated vacuum assembly 912 pulls wood chips 913 in through the debris hose 911 and discharges the wood chips 913 into a hopper interior 907 of hopper 147.

Figure 45:
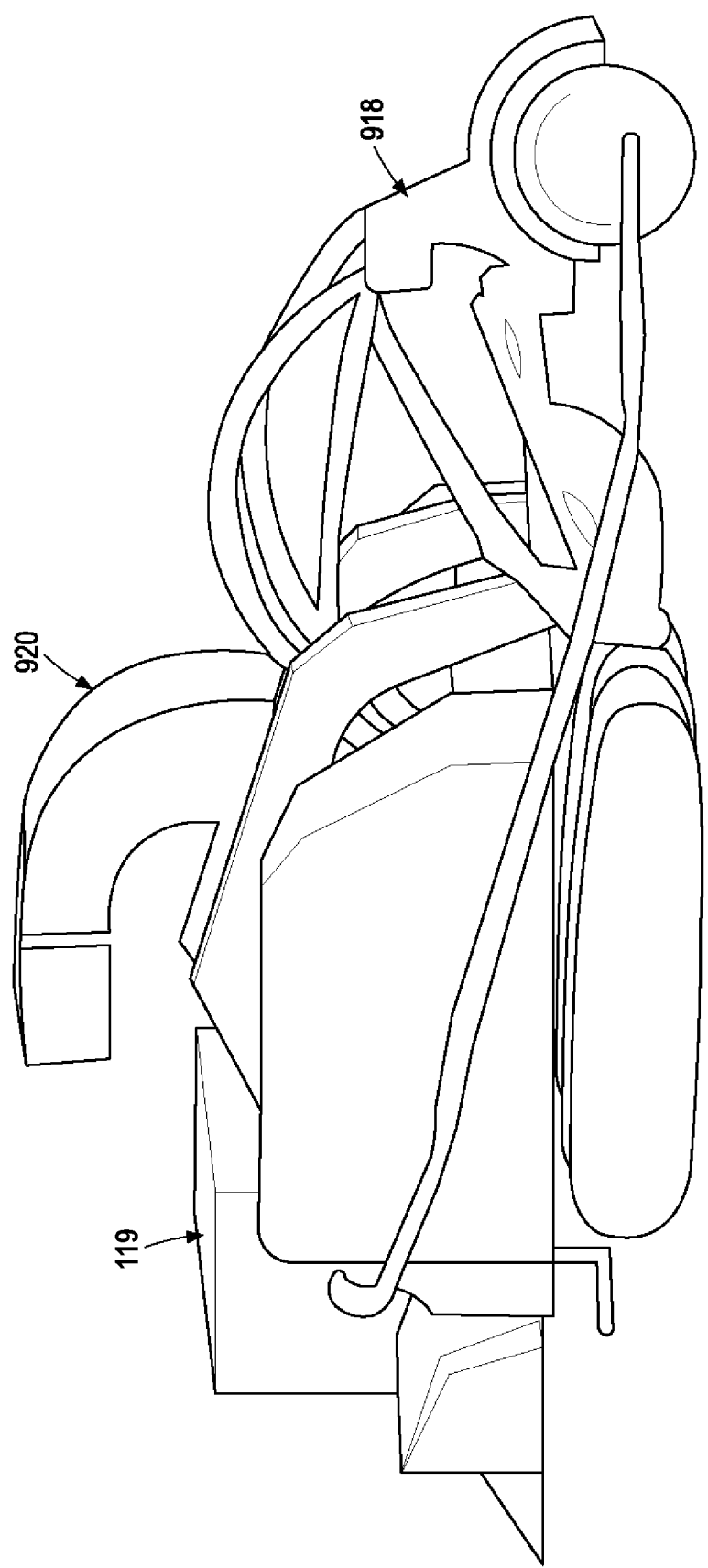
FIG. 45 is a perspective view of the apparatus of FIG. 33 with an optional stump grinder attachment.
Figure 46:
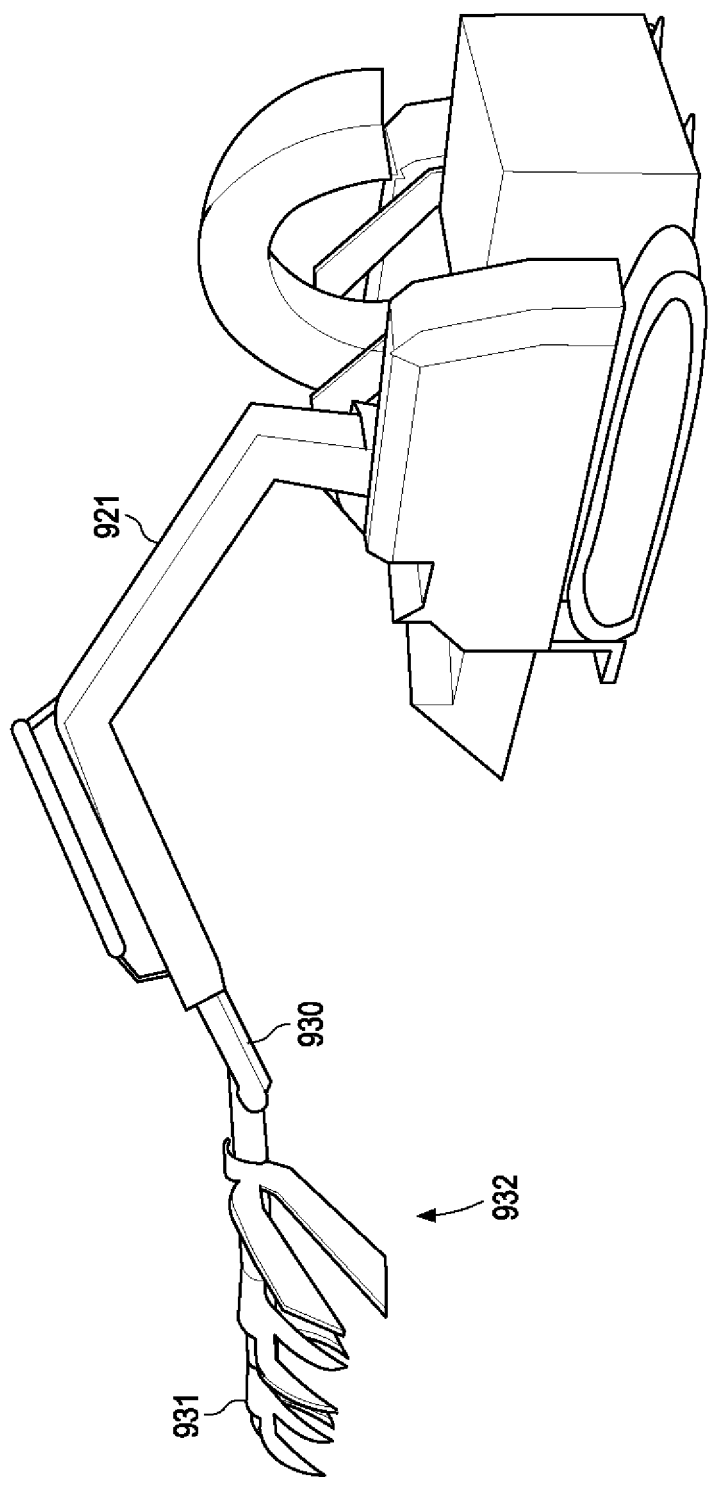
FIG. 46 is a perspective view of the apparatus of FIG. 33 with an optional self-feeding shear arm attachment.
Figure 47:
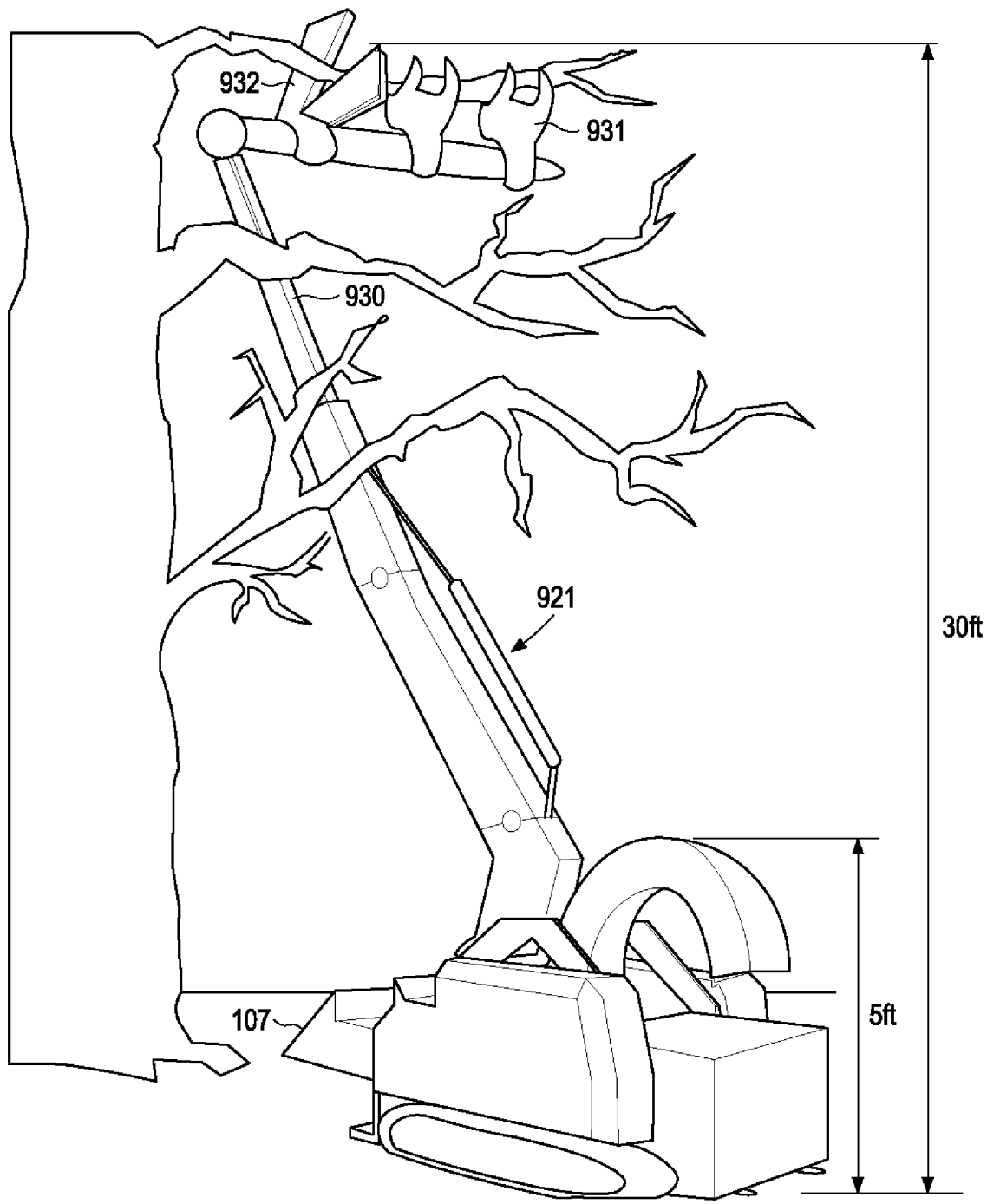
FIG. 47 is a perspective view of the apparatus and optional attachment of FIG. 46 in use on a tree.

With respect to FIGS. 45-47, various other examples of optional attachment apparatus that can be selectively coupled to the lifting arms 130 of chipper vehicle 150 (or 150a or 150b) are illustrated. FIG. 45, for example, depicts a stump grinder attachment 918. Wood chips 913 generated by the operation of the stump grinder attachment 918 are sent through a rearward directed chute 920 into a rear-mounted collection hopper 119. FIGS. 46 and 47 depict a self-feeding shear arm 921 that can be mounted to the lifting arms 130 of chipper vehicle 150 using the receiving bracket 925 (FIG. 33), though alternative methods of mounting the self feeding shear arm 921 can be used instead. The self-feeding shear arm 921 has a telescoping component 930 that may be selectively extended to thereby facilitate a greater reach for the chipper vehicle 150. A set of clamps 931 hold tree limbs in place while a scissor element 932 removes the tree limbs from the tree. FIG. 47 illustrates the self-feeding shear arm 921 in operation. Specifically, once the tree limbs have been removed, the self-feeding shear arm 921 feeds the limbs into the inlet port 107 of chipper vehicle 150 so that they may be reduced to wood chips.

Figure 48:
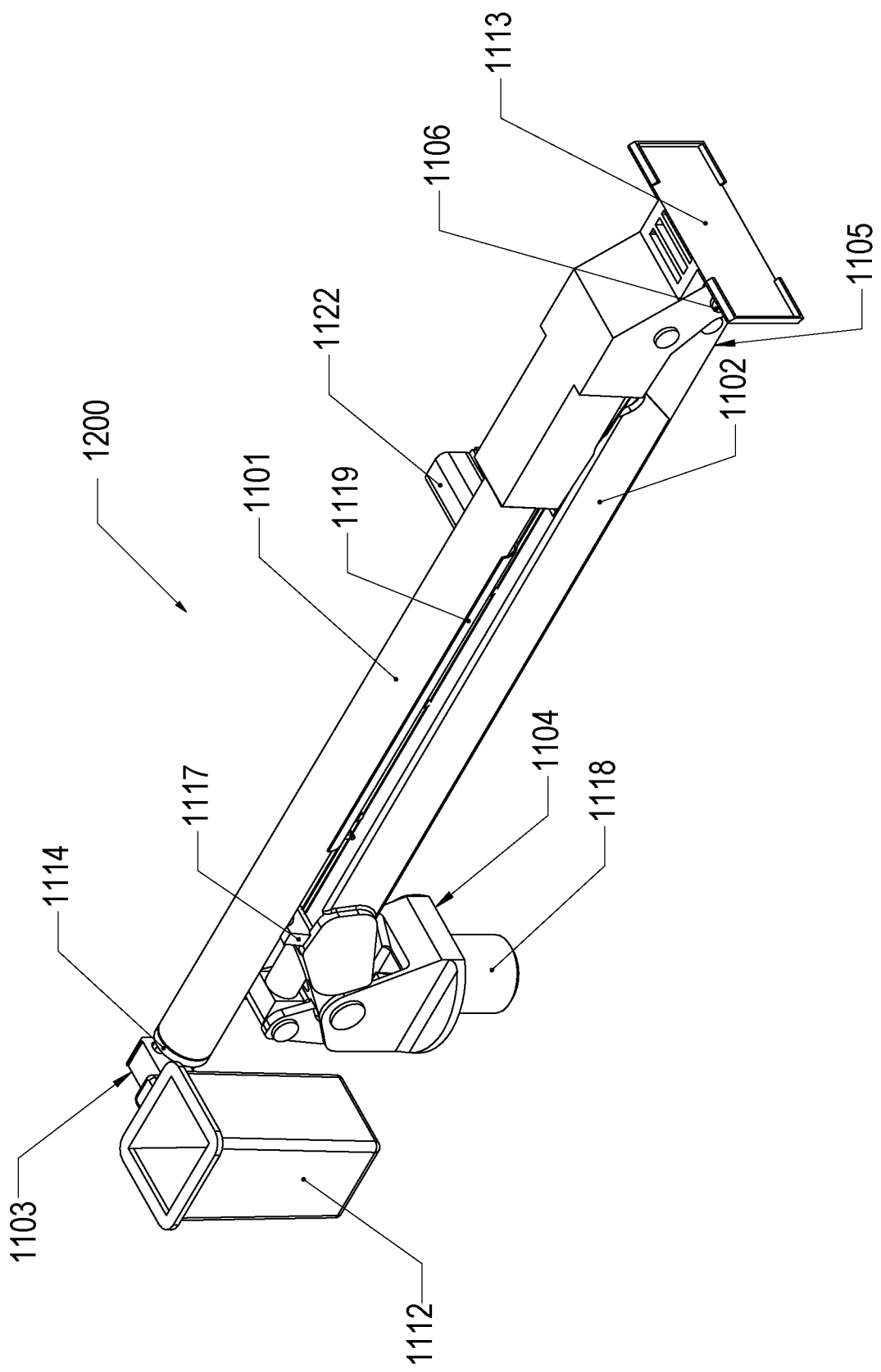
FIG. 48 is a perspective view of an exemplary embodiment of a lifting apparatus in accordance with one embodiment of the invention.
Figure 49:
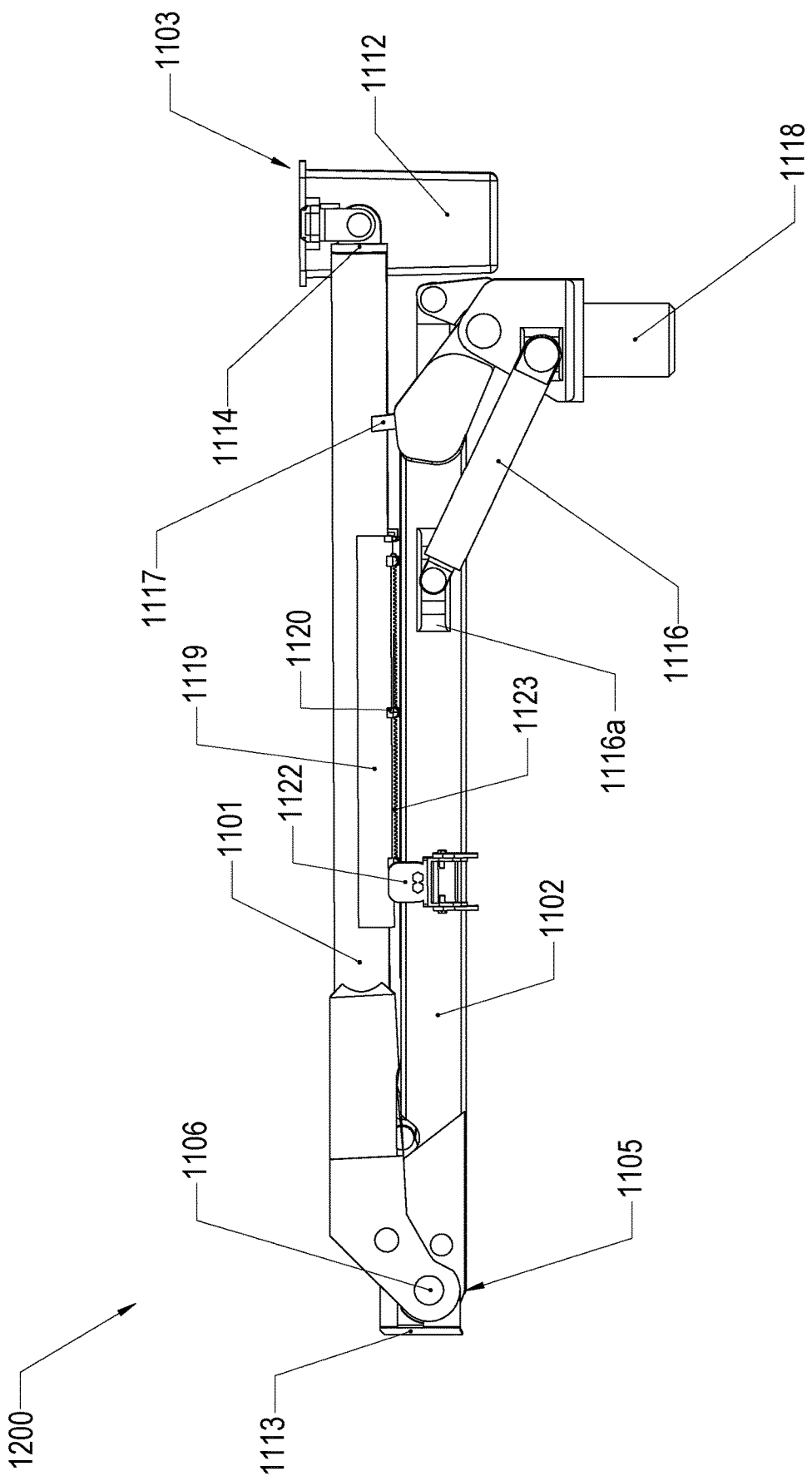
FIG. 49 is an elevation view of the apparatus of FIG. 48 with the primary and secondary bodies thereof coupled to one another.
Figure 50:
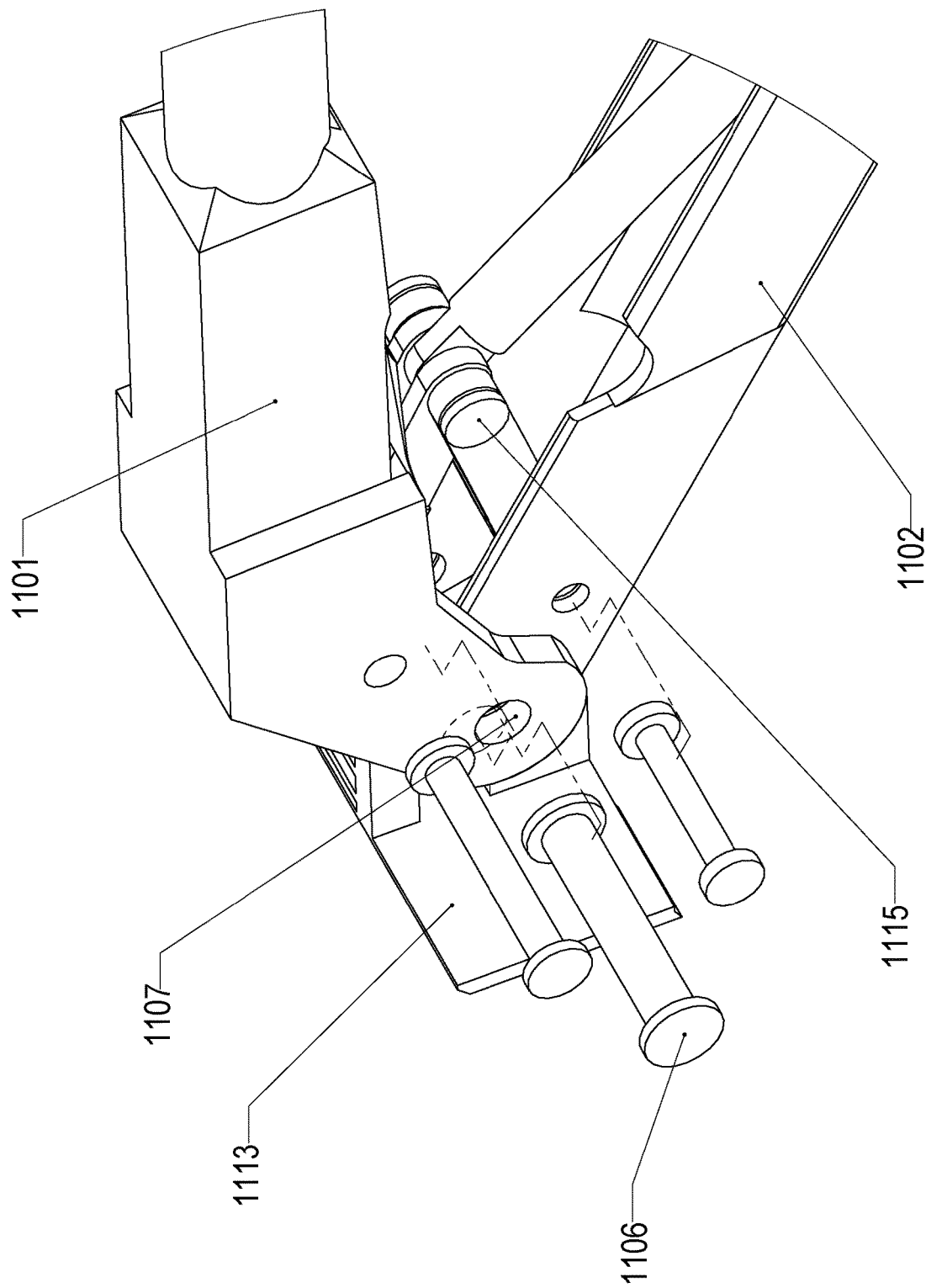
FIG. 50 is a perspective view illustrating an exemplary coupling between the primary and secondary bodies of the apparatus of FIGS. 48-49.

FIGS. 48-59 illustrate one exemplary embodiment of a lifting apparatus in the form of a boom lift (or "boom") 1200 that can be partially dismantled while retaining full functionality to meet the needs of the operator in a given situation. FIGS. 48 and 49, in particular, illustrate, respectively in perspective and elevation views, a primary body 1101 of the boom 1200 having a first operating end 1103, and a secondary body 1102 having a second operating end 1104. The secondary body 1102 includes a connection bar 1115. When the primary body 1101 is coupled with the secondary body 1102, as illustrated in FIGS. 48-49, the connection bar 1115 provides containment of electrical and/or mechanical components of the secondary body 1102 that communicate with the primary body 1101.

The primary body 1101 and secondary body 1102 in these figures are illustrated coupled to one another at a hinge mount 1105 which, along with a hydraulic cylinder 1116, provides pivotal movement between the primary and secondary bodies 1101, 1102. The hydraulic cylinder 1116 is selectively extendable and is coupled to the secondary body 1102 through a coupling element 1116a. Hydraulic cylinder 1116 facilitates pivotal movement of the secondary body 1102 during use, which in turn permits elevation of the secondary body 1102 and primary body 1101 relative to a transport truck 1300 (FIG. 51) supporting the boom 1200. Pivotal movement of the primary body 1101 relative to the secondary body 1102, in turn, further elevates the primary body 1101, thereby permitting the boom 1200 to reach the required height.

The primary body 1101 has a telescoping member 1114 housed within the primary body 1101. When the telescoping member 1114 is extended, the boom 1200 is able to reach even higher areas. When the primary body 1101 is not extended (FIGS. 48-49), a generally U-shaped support bar 1117 of the secondary body 1102 provides a base on which the primary body 1101 can rest. More specifically, the U-shaped configuration of the support bar 1117 conforms to the generally cylindrical profile of the primary body 1101.

Figure 51:
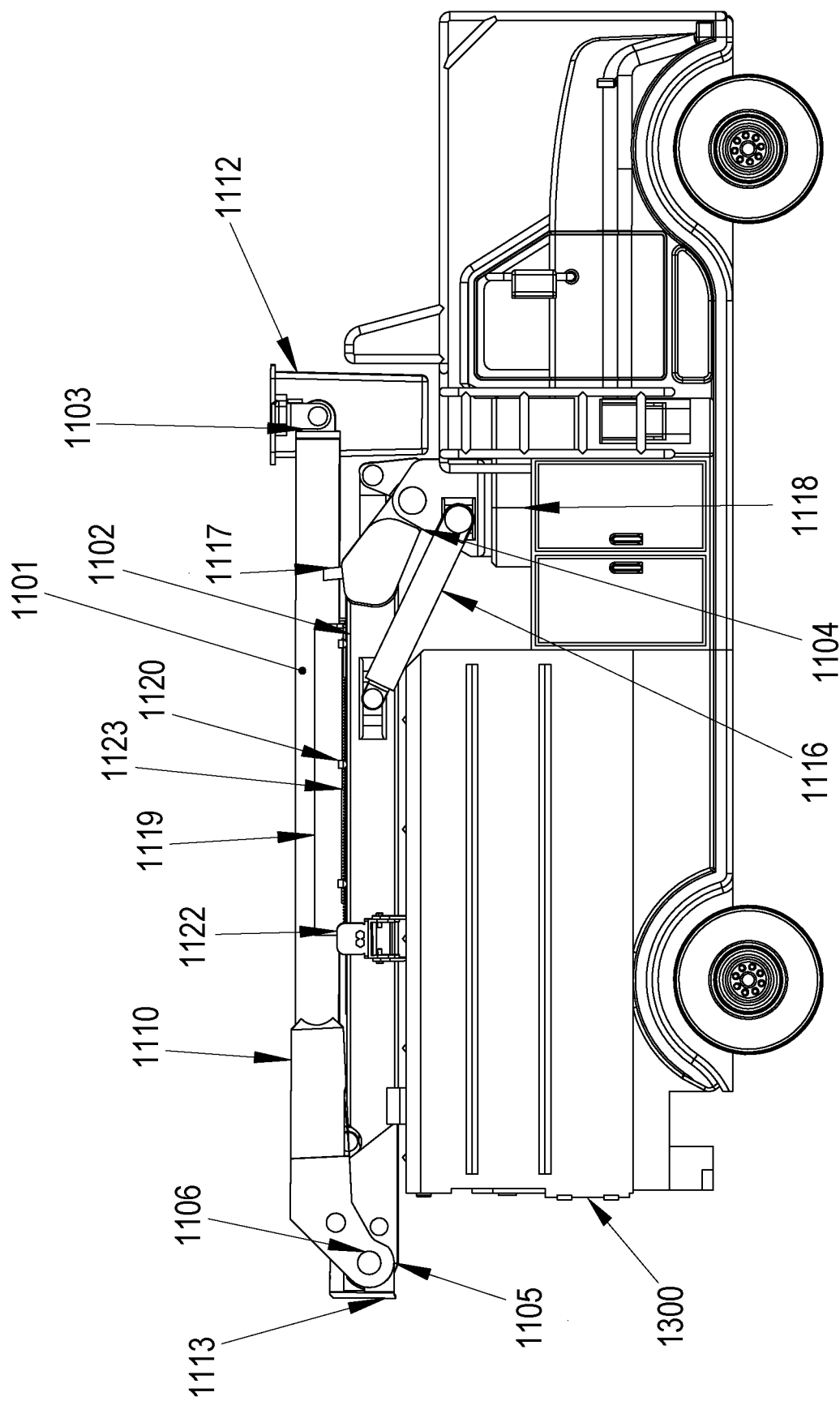
FIG. 51 is an elevation view of the apparatus of FIGS. 48-50 supported by a truck.

In the illustrated views of FIGS. 48-49, the primary and secondary bodies 1101, 1102 are in a stowed, folded condition, such that the primary and secondary bodies 1101, 1102 are generally parallel to one another. With continued particular reference to FIGS. 48-49, and further referring to FIG. 50, coupling of the primary and secondary bodies 1101, 1102 to one another further includes one or more securing pins 1106 extending through respective holes 1107 in the primary and secondary bodies 1101, 1102. FIG. 51 illustrates the boom 1200, in the stowed, folded condition illustrated in FIGS. 48-49, being supported on the transport truck 1300. As explained in further detail below, a boom mount 1118 of the boom 1200 is configured to be received within a cooperating receiving structure of the transport truck 1300, thereby permitting operative support of the boom 1200 by transport truck 1300.

Figure 52:
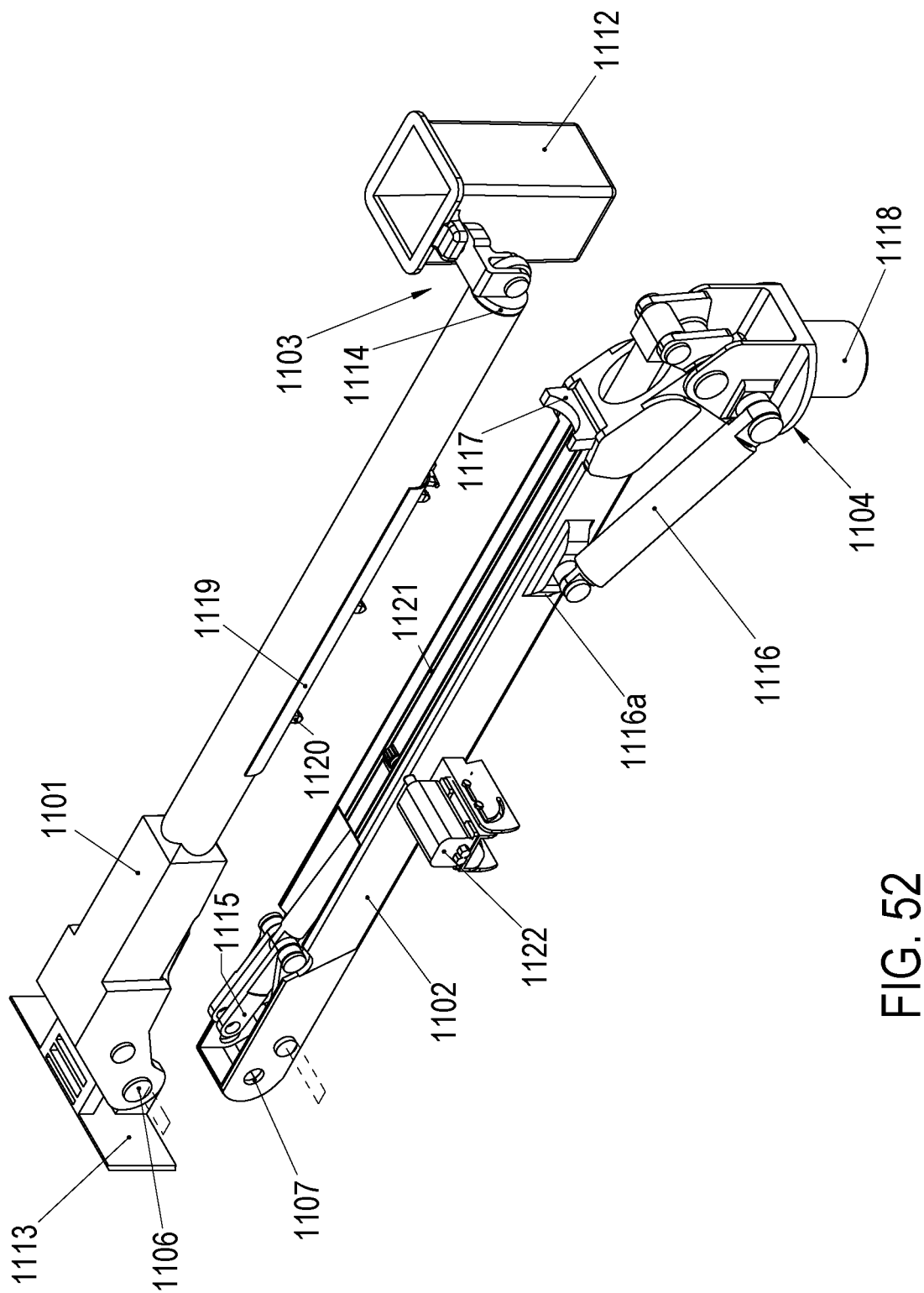
FIG. 52 is a perspective view of the apparatus of FIGS. 48-51 illustrating the primary body and secondary bodies of the apparatus separated from one another.
Figure 53:
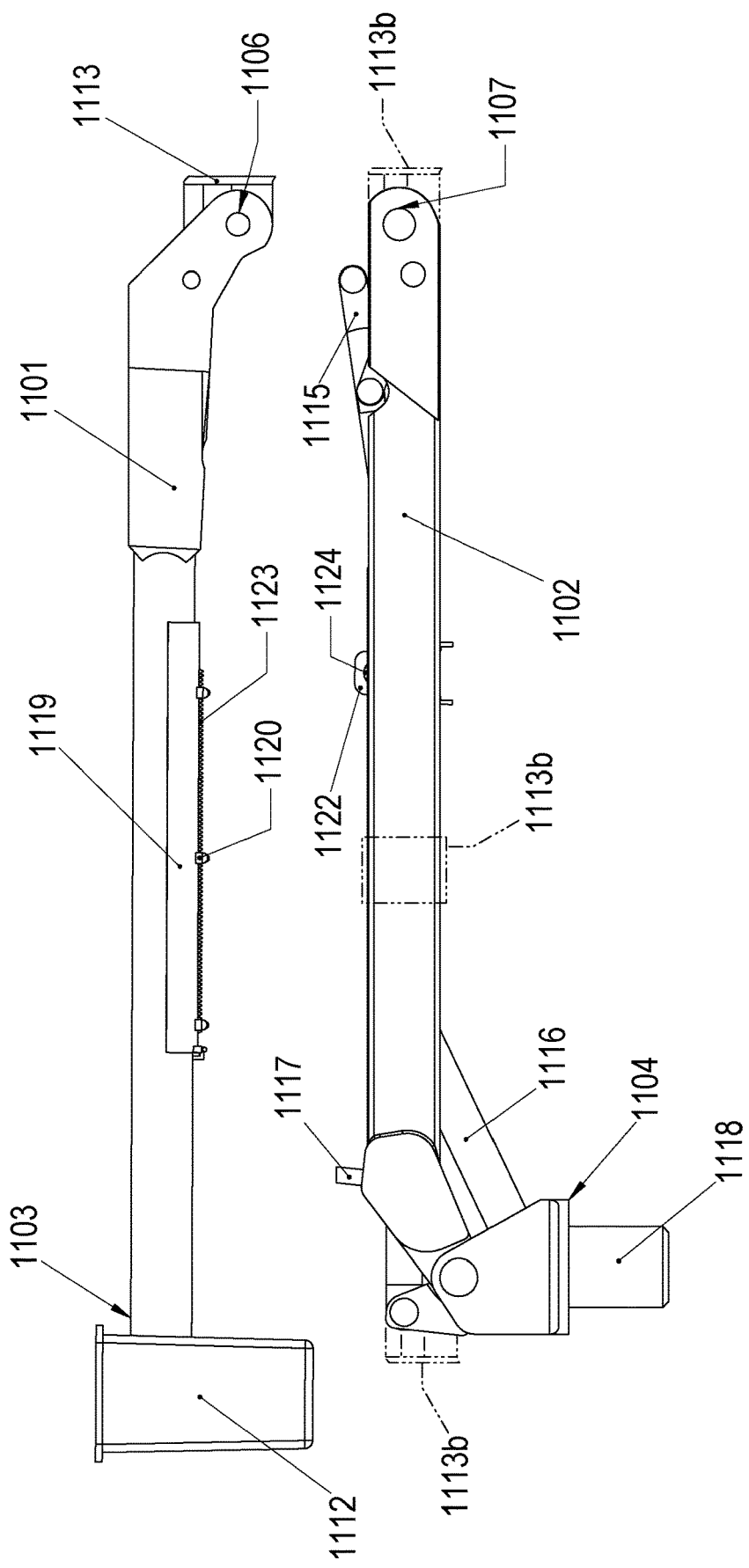
FIG. 53 is an elevation view of the apparatus of FIGS. 48-52 with the primary and secondary bodies thereof separated from one another.

FIGS. 52 and 53 are perspective and elevation views, respectively, of the boom 1200 in a decoupled condition. In this condition, the securing pins 1106 have been removed from the holes 1107 in the primary and secondary bodies 1101, 1102 to permit selective decoupling of these bodies from one another. In this condition, and as explained in further detail below, a user is able to move the primary and secondary bodies 1101, 1102 relative to one another, for example to selectively couple the primary body 1101 to a relative small, maneuverable, secondary machine or vehicle 1400. In operation, once the primary body 1101 is coupled to the small machine or vehicle 1400 (such as a tree removing machine or "TRM" or a mobile chipper), the same may be driven to an otherwise hard-to-reach location to remove tree branches, for example.

Figure 47A:
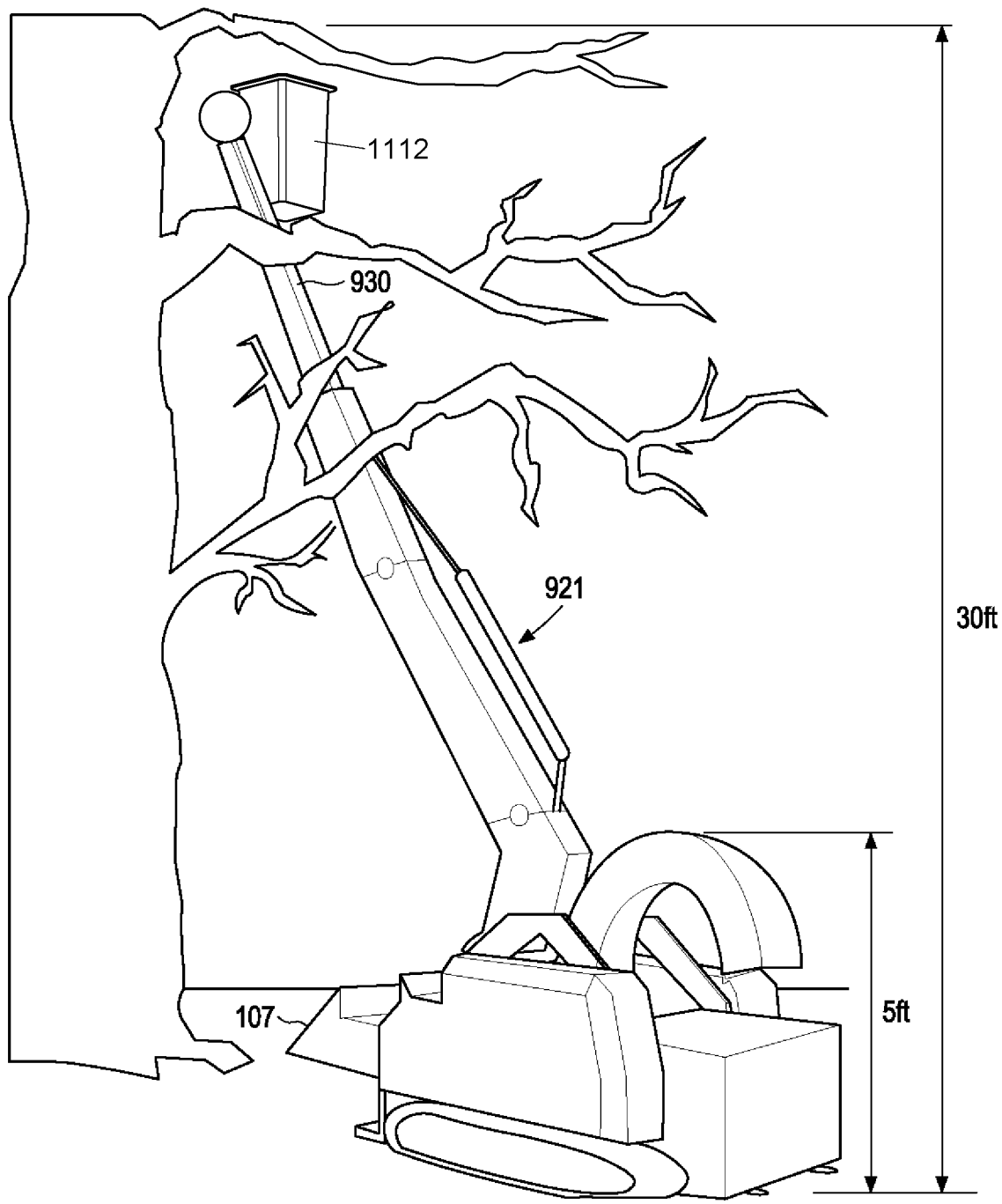
FIG. 47A is a perspective view of the apparatus and another optional attachment of FIG. 46 in use on a tree.

With continued reference to FIGS. 48-53, the boom 1200 includes a bucket 1112, which in this exemplary embodiment defines an enclosed space in which the operator may stand during use of the boom 1200. The bucket 1112 may, alternatively, have any other shape or construction. Whether the primary body 1101 is coupled to the secondary body 1102 (and therefore to the transport truck 1300) or to the small machine or vehicle 1400, pivotal and/or translational movement (e.g., through telescoping member 1114) of the primary body 1101 is effective to elevate the bucket 1112, thereby permitting increased access for tree removal and/or maintenance by allowing the operator to reach the required height. Additionally, other attachments may be used instead of the scissor element 932 shown in FIG. 47. By way of example and as shown in FIG. 47A, the bucket 1112 or other cutting device used in tree removal and/or maintenance may be so attached. Furthermore, such attachments may be connected to a boom 1200 as shown in FIG. 48 or to a telescoping component 930 as shown in FIG. 47.

Figure 54:
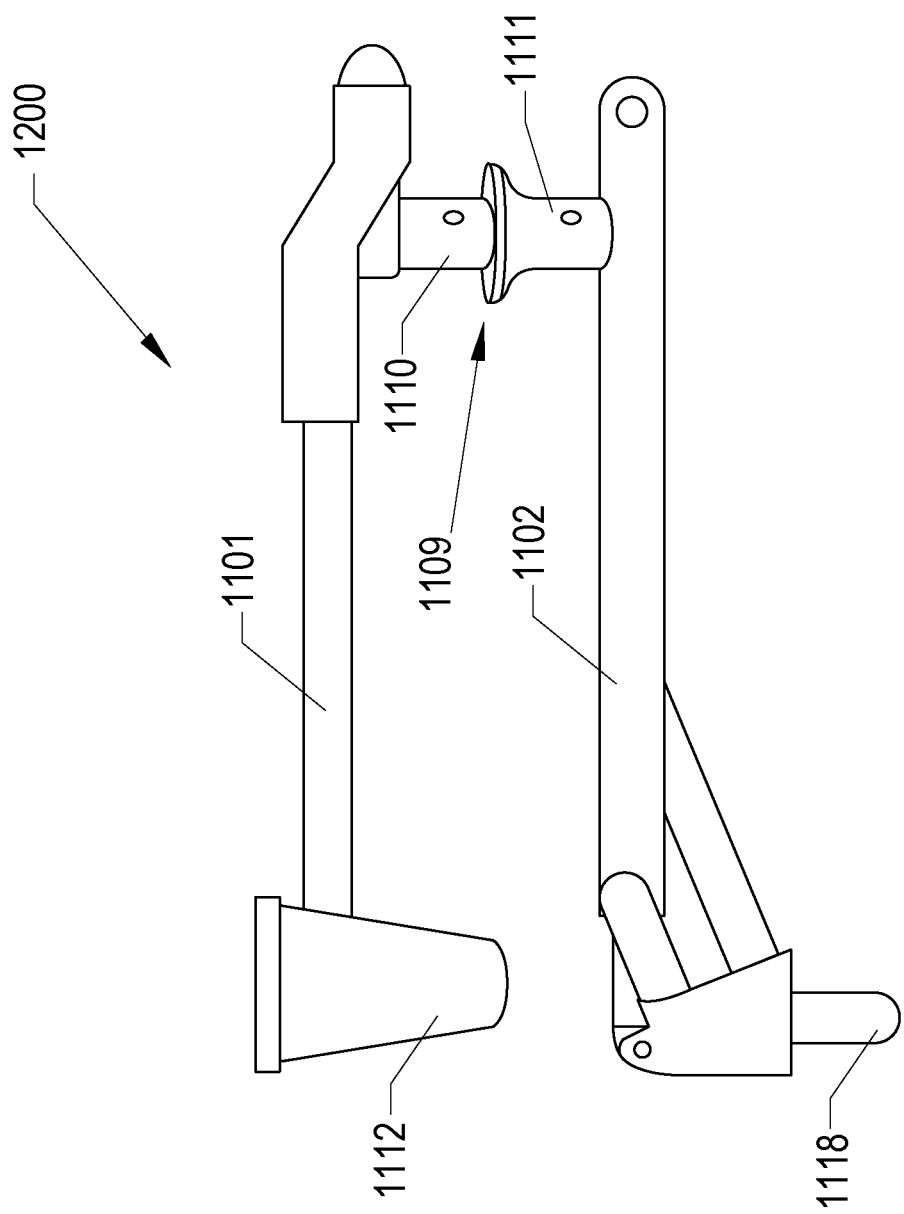
FIG. 54 is a schematic view of the apparatus of FIGS. 48-53, illustrating an exemplary passive safety device thereof.

With reference to FIG. 54, the boom lift 1200 has a primary passive safety device, generally assigned the numeral 1109, and which is defined by components on the primary and secondary bodies 1101, 1102. The primary passive safety device 1109 includes a magnetic lock key 1110 on the primary body 1101 and a magnetic lock receiver 1111 on the secondary body 1102. The primary passive safety device 1109 is engaged when the primary and secondary bodies 1101, 1102 are coupled together (FIGS. 48, 49, 51), and the boom lift 1200 is mounted on the transport truck 1300 (FIG. 51). When the magnetic lock key 1110 and magnetic lock receiver 1111 are engaged with one another, and the engine of the truck 1300 is running, the magnets in the lock key 1110 and lock receiver 1111 are energized and therefore are held together, which in turn holds the primary and secondary bodies 1101, 1102 coupled to one another and their separation prevented.

Figure 55:
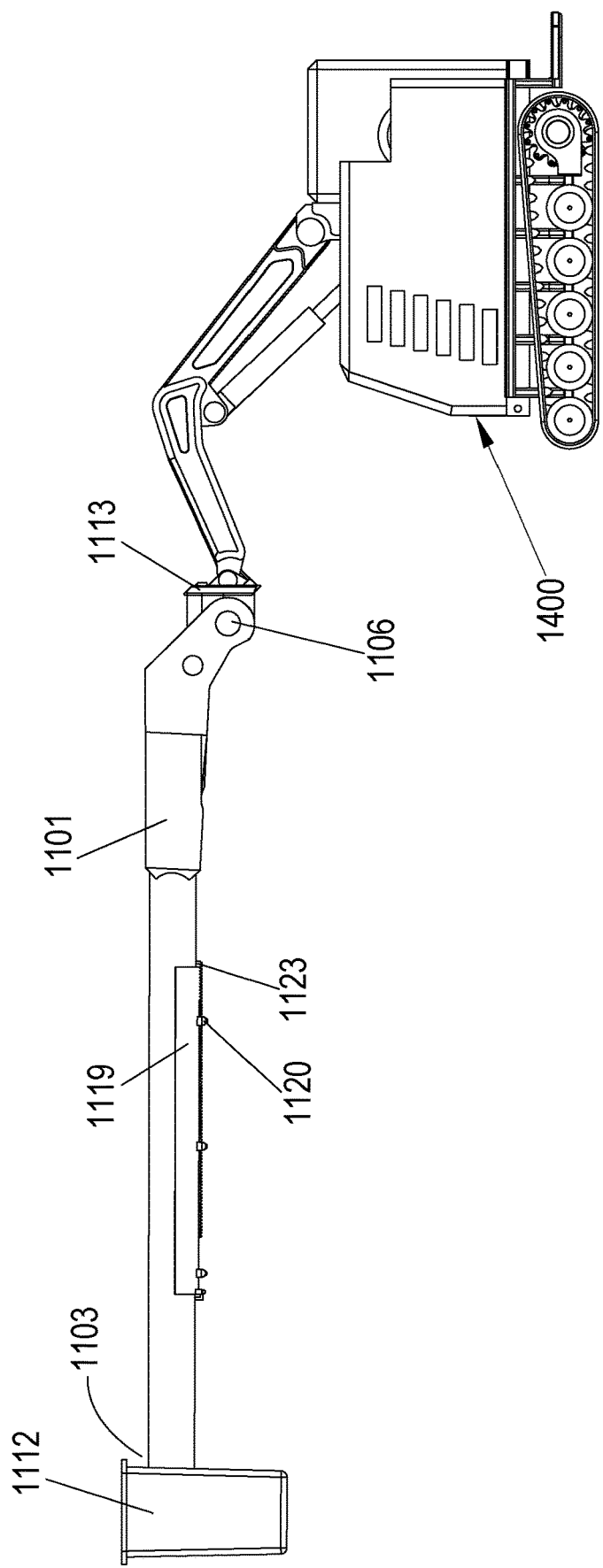
FIG. 55 is an elevation view of the primary body of the apparatus of FIGS. 48-54 coupled to an exemplary secondary vehicle in the form of a mobile chipper.
Figure 56:
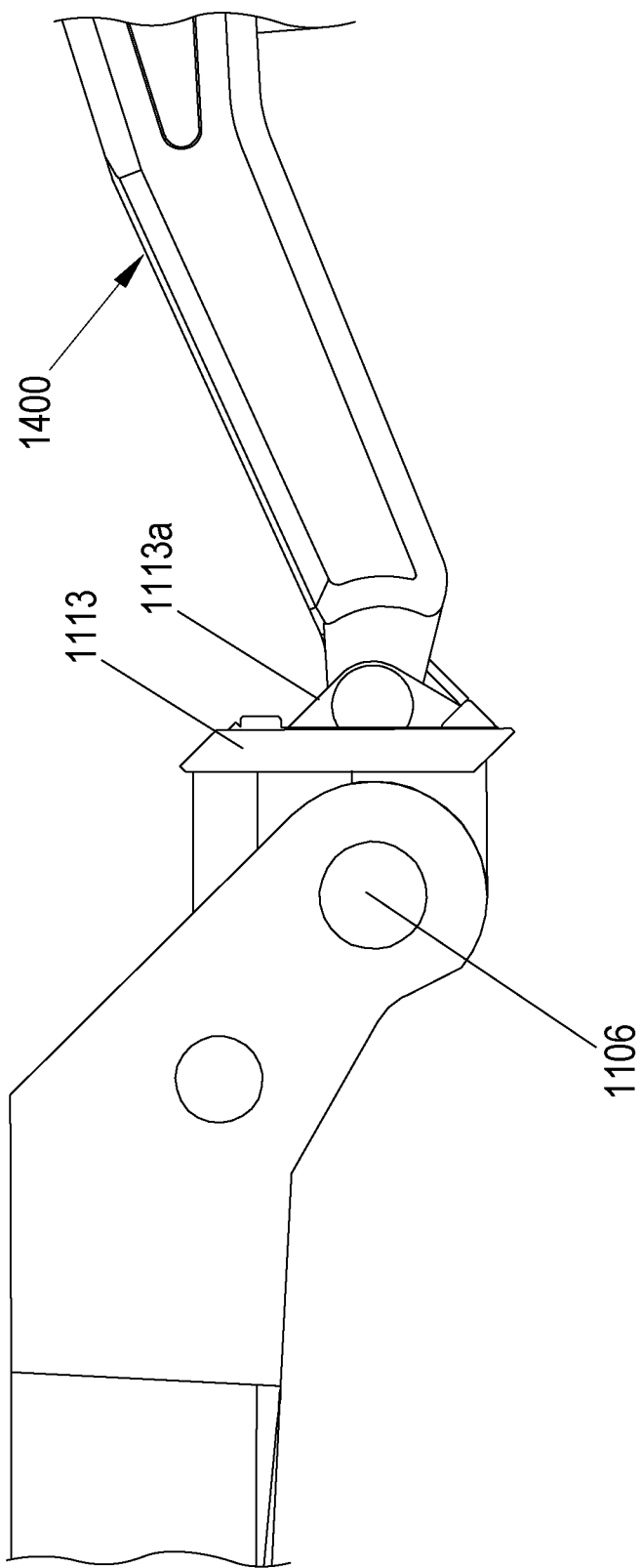
FIG. 56 is a perspective view illustrating an exemplary coupling between the primary body of the apparatus of FIGS. 48-54 and an exemplary secondary vehicle in the form of a mobile chipper.

The primary body 1101 has, proximate the hinge mount 1105, a connection plate 1113. Referring now to FIGS. 55-56, when the primary body 1101 is separated from the secondary body 1102 (FIGS. 52-53), the primary body 1101 can be selectively coupled to the small machine or vehicle 1400. Specifically, the connection plate 1113 is shaped for coupling with a cooperating coupling element 1113a of a small machine or vehicle 1400, such as a mobile chipper, a backhoe loader, a bulldozer, a crane, an excavator, a grader, a front loader, or a tractor, for example. FIG. 56 illustrates an exemplary coupling between the connection plate 1113 and the cooperating element 1113a of small vehicle 1400. Additionally or alternatively, as illustrated in FIG. 53, the boom 1200 may have a secondary coupling element such as a plate 1113b, for example (shown in phantom) at one of the ends or anywhere along the length of the secondary body 1102. This optional secondary plate 1113b permits coupling the entire boom 1200 (i.e., primary and secondary bodies 1101, 1102) to the small vehicle 1400.

As noted above, the boom 1200 includes, at the second operating end 1104 of the secondary body 1102, a boom mount 1118 that facilitates mounting of boom 1200 to the transport truck 1300 (FIG. 51) or to other machinery. The boom mount 1118 is magnetic so as to define a secondary passive safety device. More specifically, when the engine of the transport truck 1300 is running, one or more magnetic elements of the boom mount 1118 are energized and remain energized until the operator manually de-energizes the boom mount 1118. When energized, the secondary passive safety defined by the one or more magnetic elements of mount 1118 restricts movement of boom 1200, and particularly movement of the secondary body 1102, relative to the truck 1300. This may be particularly useful during transportation of the boom 1200, in its coupled condition (FIGS. 48-49), in which secure mounting of boom 1200 to the truck 1300 is advantageous.

As noted above, the primary and secondary bodies 1101, 1102 may be selectively decoupled. To this end, and with particular reference to FIGS. 48-49, 52, and 53, the boom lift 1200 includes a rack and pinion system that allows the primary body 1101 to move relative to and along the secondary body 1102 during such decoupling. Specifically, the rack and pinion system includes a hydraulic motor 1122 mounted onto the secondary body 1102, and which drives a gear 1124. Gear 1124, in turn, engages a gear track 1123 that is secured (e.g., welded) to the primary body 1101. In operation, actuation of motor 1122 results in translational movement of the gear track 1123 and thereby translational sliding movement of the primary body 1101 to which gear track 1123 is coupled, relative the secondary body 1102.

This translational sliding movement is further facilitated by a set of rollers 1120 secured to the primary body 1101 through a C-brace 1119 that is welded to the primary body 1101, and which rotate on a track 1121 of the secondary body 1102. This allows the primary body 1101 to be easily moved off of the secondary body 1102 without any external hardware. When partially moved off of the secondary body 1102, the primary body 1101 can then be coupled to a smaller, more maneuverable machine or vehicle 1400, such as a mobile chipper (FIGS. 55-56), for example, or to some other machine. When coupled to the smaller machine or vehicle 1400, the smaller vehicle can then finish separating the primary and secondary bodies 1101, 1102 using its own mechanical and/or powered components.

Figure 57:
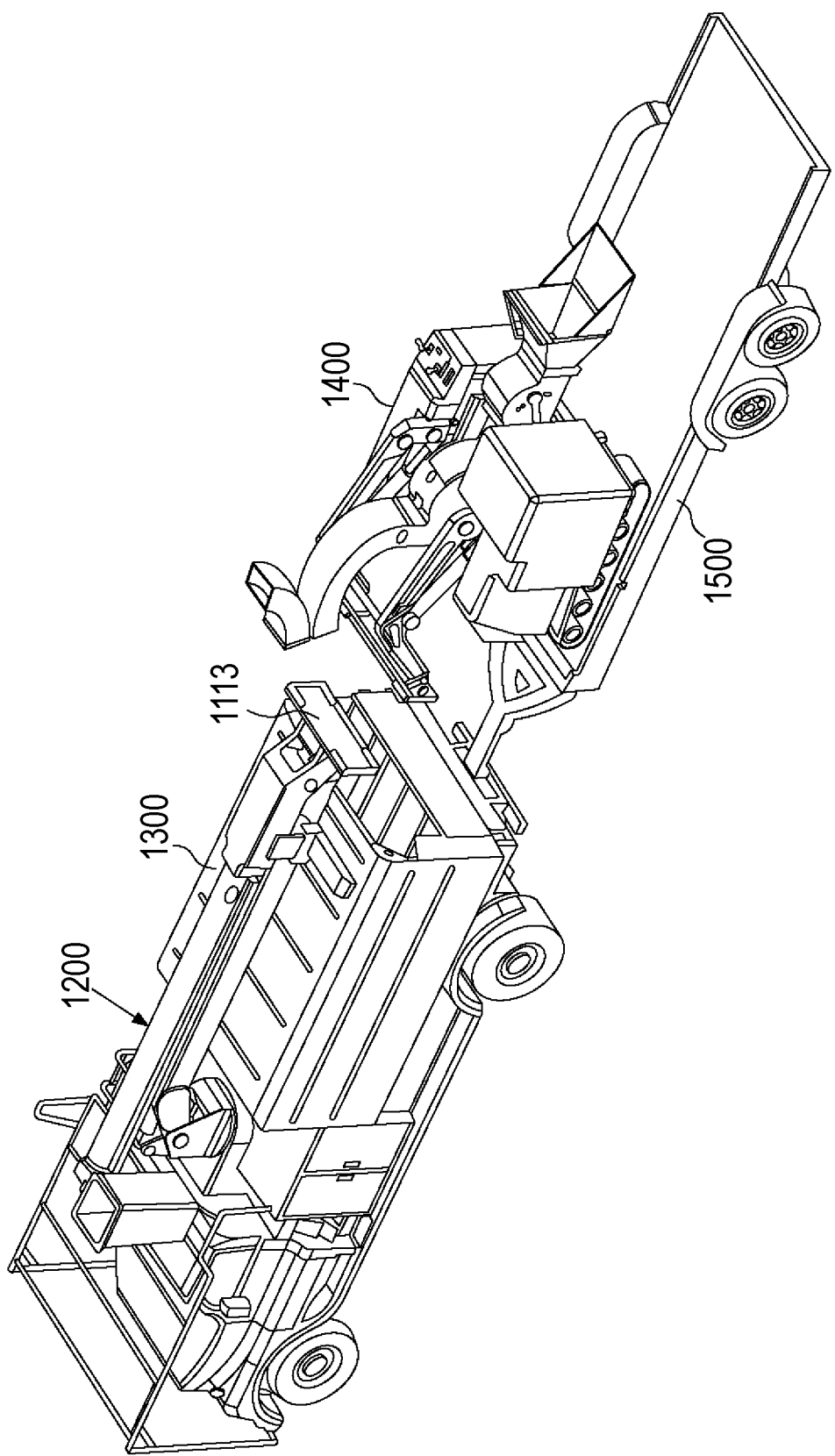
FIG. 57 is a perspective view illustrating the truck and apparatus of FIGS. 48-54 coupled to a trailer that, in turn, supports a chip box bucket.
Figure 58:
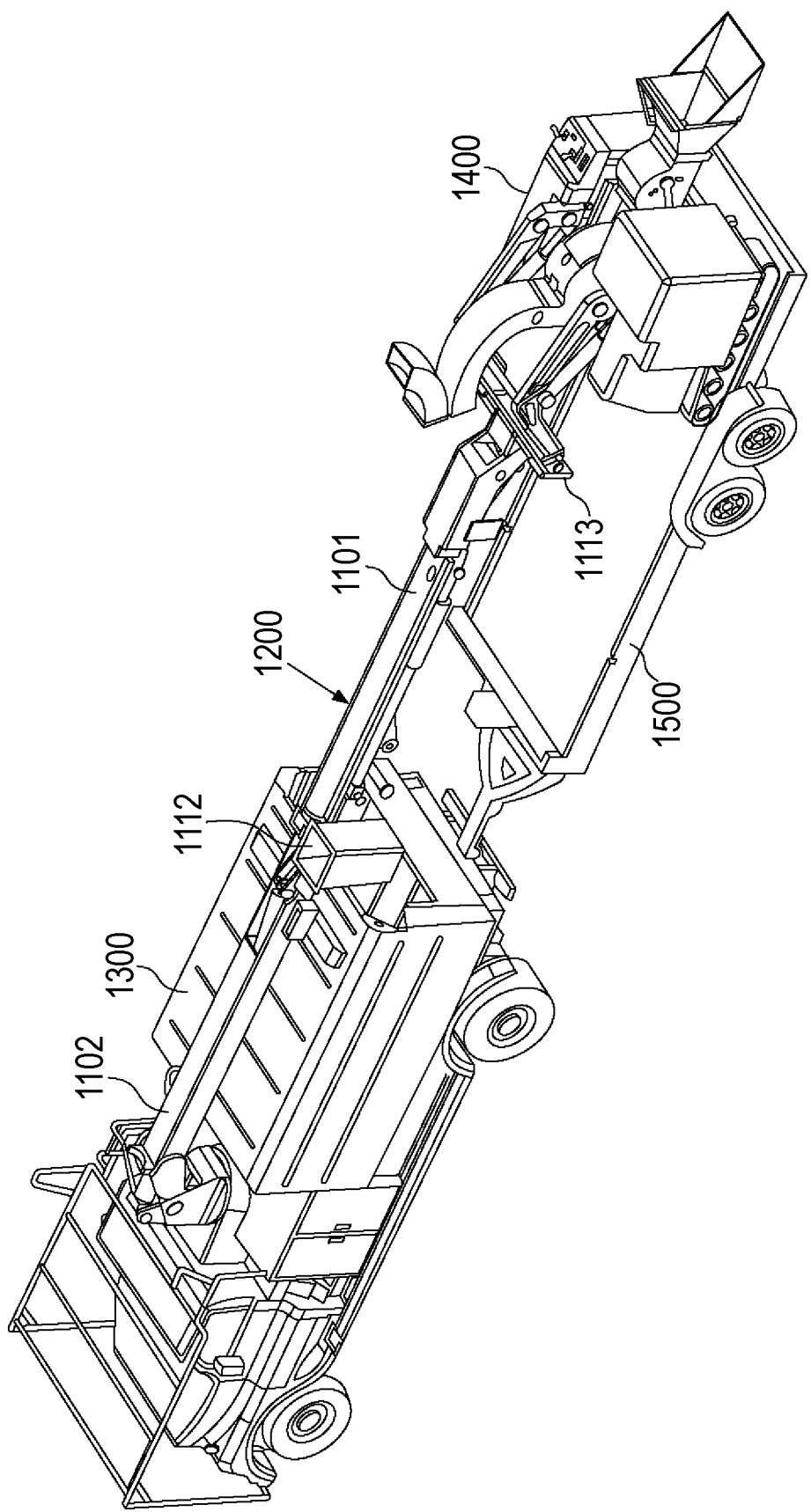
FIG. 58 is a view similar to FIG. 57 illustrating the lifting apparatus in a position different from that illustrated in FIG. 57.
Figure 59:
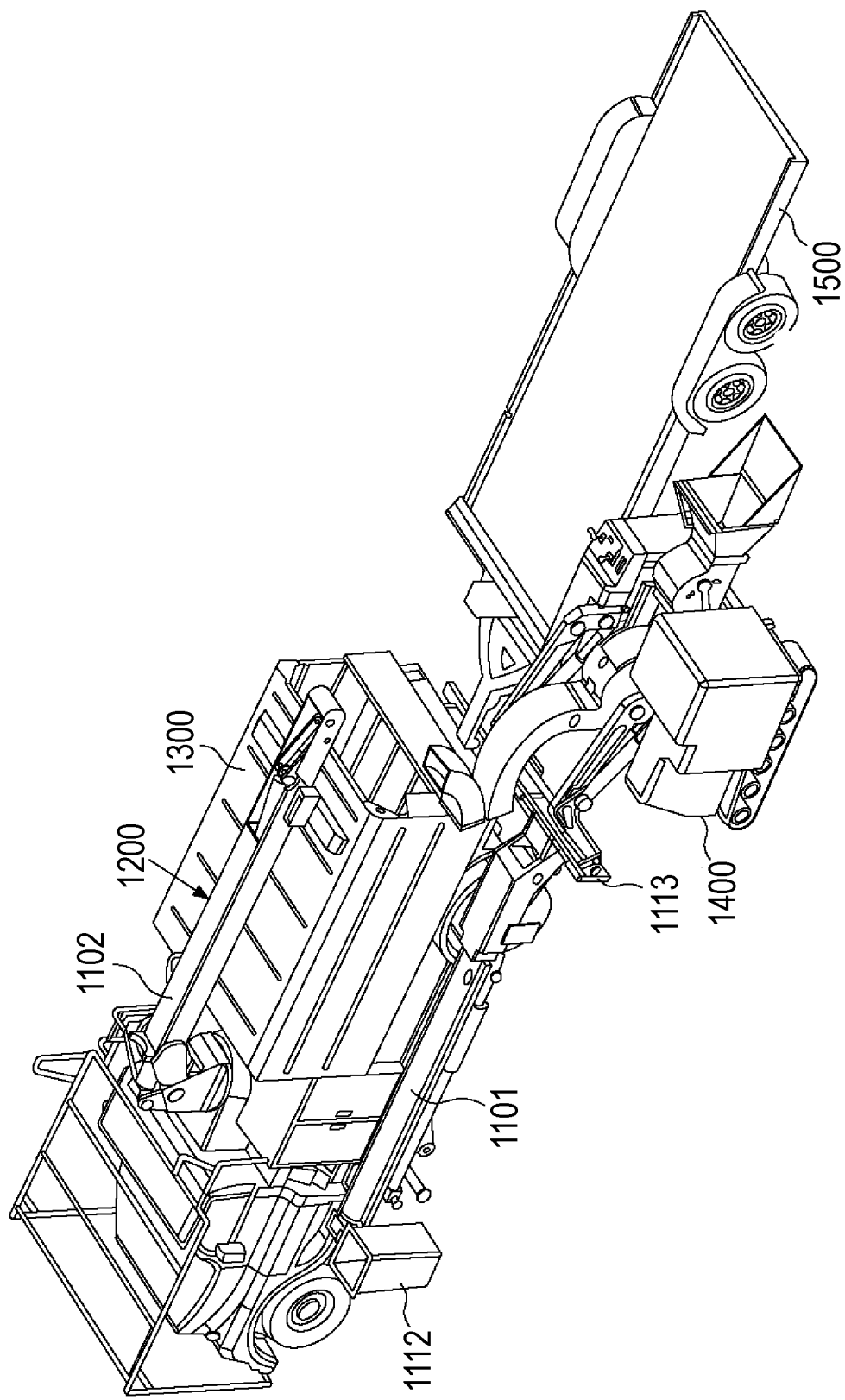
FIG. 59 is a perspective view illustrating the secondary body of the lifting apparatus of FIGS. 48-58 decoupled from the primary body thereof.

With reference to FIG. 57, the boom 1200 may be transported in its coupled, stowed and folded condition (FIGS. 48-49), by a transport truck 1300 which, in turn, may tow a secondary, unpowered vehicle or trailer 1500. The trailer 1500, in turn, supports an exemplary small machine or vehicle 1400, in the form, in the illustrated embodiment, of a mobile chipper. In use, the truck 1300 may be driven, on its own power, to the general vicinity of a work site, thus transporting all of the equipment necessary for a tree-removal or tree-maintaining event. Referring now to FIG. 58, upon arrival to the general vicinity of the work site, the small vehicle 400 may be moved to the rear portion of the trailer 1500, as illustrated in the figure, and the primary body 1101 of boom 1200 decoupled from secondary body 1102 to permit coupling of primary body 101 with the small machine or vehicle 1400 through connection plate 1113. Once the primary body 1101 is coupled to small vehicle 1400, the now-loaded small vehicle 400 may be moved off the trailer 1500 and onto the ground, as illustrated in FIG. 59. The loaded small vehicle 1400 may then be driven, on its own power, to an otherwise hard-to-reach work site to carry out the tree-removal or tree-maintaining event.

Figure 60:
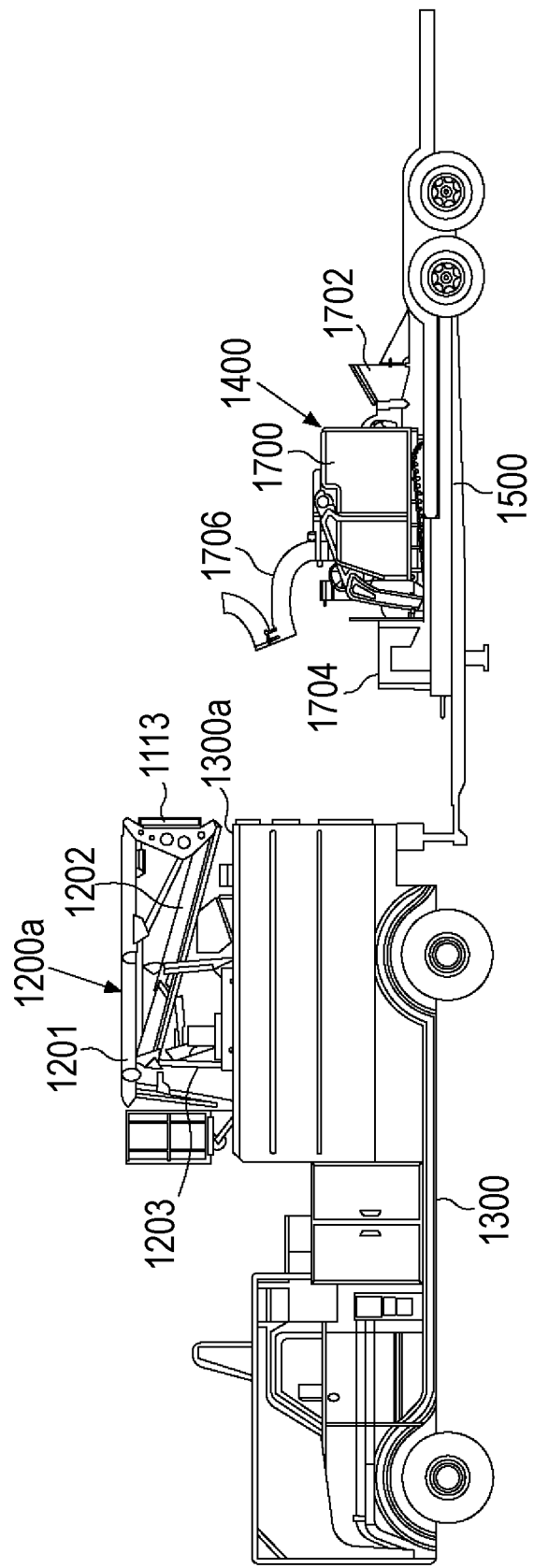
FIG. 60 is an elevation view illustrating another exemplary embodiment of a lifting apparatus stored on a truck.
Figure 61:
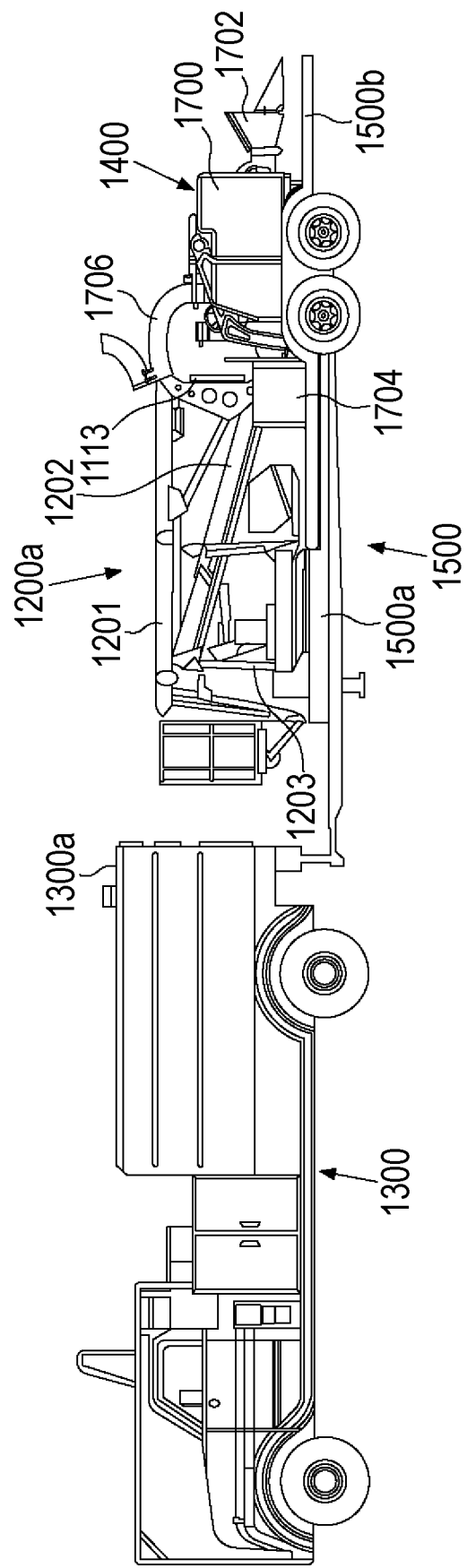
FIG. 61 is an elevation view illustrating the lifting apparatus of FIG. 60 stored on a trailer.
Figure 62:
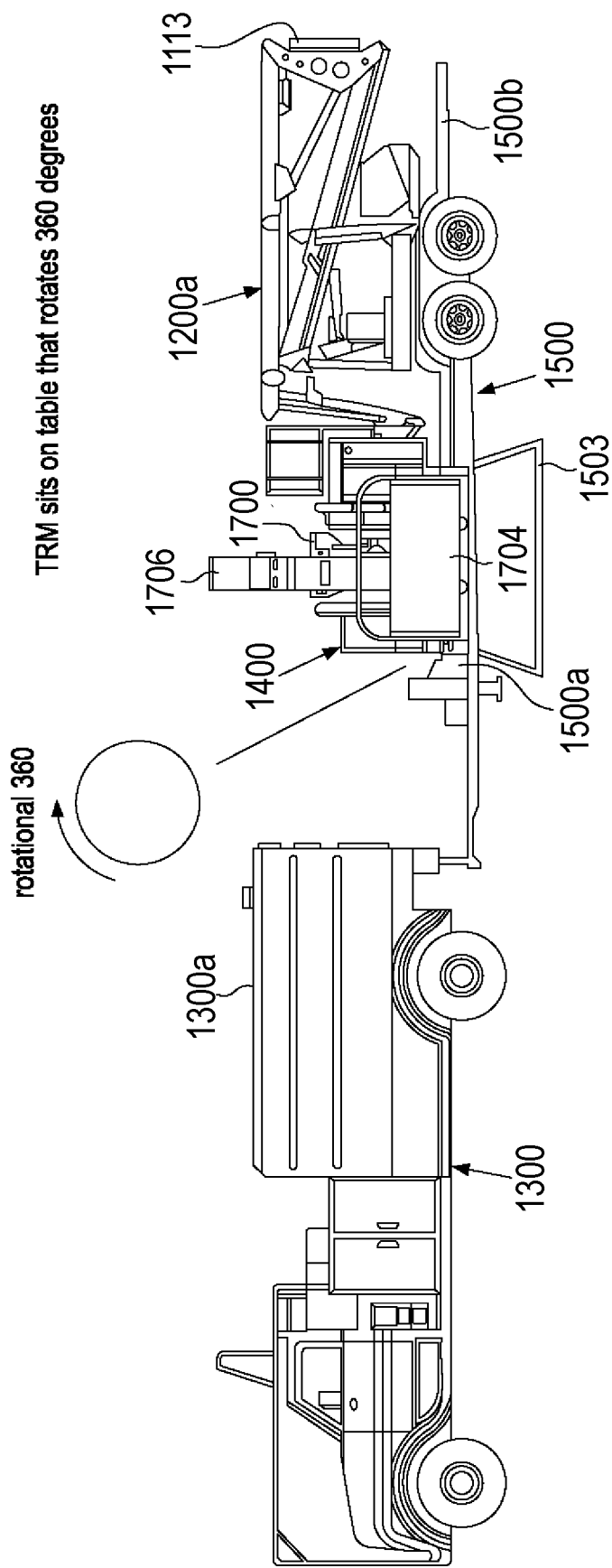
FIG. 62 is an elevation view illustrating the lifting apparatus of FIGS. 59-60 supported in a rear portion of a trailer and an exemplary secondary vehicle in the form of a mobile chipper supported on the trailer in a transverse orientation.

With reference to FIGS. 60-62, another exemplary embodiment of a lifting apparatus 1200a is illustrated. For ease of understanding, like reference numerals in FIGS. 60-62 refer to similar features in FIGS. 48-59, the description of which may be referred-to for an understanding of the features of the embodiment of FIGS. 60-62 as well. Apparatus 1200a is a segmented apparatus similar to the boom lift 1200 of FIGS. 48-59, and which is foldable into at least three segments 1201, 1202, 1203. As illustrated in FIG. 60, when folded, the apparatus 1200a may be such that its footprint substantially conforms within the perimeter of a roof 1300a of a truck 1300. Alternatively or additionally, the apparatus 1200a, when folded, may be supported in the front portion 1500a of a trailer 500 (FIG. 61) or in the rear portion 1500b of the trailer 1500.

In the illustrated embodiments of FIGS. 60-62, the trailer 1500 is towable by the truck 1300 in ways known in the art, and also supports, in addition to the apparatus 1200a, a relatively small, powered secondary vehicle 1400, in the form, in this embodiment, of a mobile chipper. With particular reference to FIG. 62, the secondary vehicle (e.g., mobile chipper) 1400 may be selectively loaded and unloaded respectively onto and from the trailer 1500 via a ramp 1503 or other means such as a drop bed trailer, tilting bed trailer, dovetail trailer or what is referred to as an integrated trailer wherein the road-worthy wheels would be integrated with secondary vehicle (e.g., mobile chipper) 1400. Moreover, the secondary vehicle mobile chipper 1400 may be supported on the trailer 1500 such that at least the discharge chute can be rotatable by about 360 degrees, which maximizes its operability and positioning relative not only to the apparatus 1200a but also to a discharge chute 1706 of the secondary vehicle 1400, described in further detail below. In this regard, it is contemplated that the apparatus 1200a may be used in combination with the wood chipping and storing features of the exemplary secondary vehicle (e.g., mobile chipper) 1400 while supported on the trailer 1500 in a variety of available relative orientations or while being off of the trailer 1500.

With continued reference to FIGS. 60-62, the secondary vehicle 1400 includes various features, as explained above. Secondary vehicle 1400 includes, for example, a chipping unit 1700 that receives wood pieces from a feed roller assembly 1702 and which directs the resulting wood chips to a collection hopper 1704 or, when used in the trailer-based configuration, chips can be directed into the back of truck 1300 through a discharge chute 1706. In the embodiment of FIG. 61, the apparatus 1200a is supported on trailer 1500 and coupled to the secondary vehicle 1400 through connection plate 1113. The apparatus 1200a and secondary vehicle 1400 are oriented generally end-to-end in this exemplary arrangement. In this embodiment, moreover, the apparatus 1200a is supported on trailer 1500 at a location between the truck 1300 and the secondary vehicle 1400. Notably, the positions and orientations of the apparatus 1200a and secondary vehicle 1400 relative to one another are such that the flow of wood chips from the discharge chute 1706 to truck 1300 is substantially unobstructed. While not shown, the discharge chute 1706 may alternatively be repositioned to a greater altitude relative to the rest of the secondary vehicle 1400, so as to further prevent any obstruction with the flow of wood chips described above. It also may be desirable to extend the length of chute 1706 or attach another chute or other device (not shown) to chute 1706 such that the distance between the discharge end of chute 1706 and the chip receiving end at the back of truck 1300 is minimized.

The arrangement illustrated in FIG. 61 permits the secondary vehicle 1400 to be used for its intended chipping purpose while being supported on the trailer 1500 and, particularly, while sharing the trailer 1500 with the apparatus 1200a that is also supported thereon. Further, the illustrated relative positions and orientations of the apparatus 1200a and secondary vehicle 1400 permit the secondary vehicle 1400 and apparatus 1200a to move, on its own power and as a stand-alone assembly, to a location that may be inaccessible by the truck 1300, with such assembly having tree reaching and tree chipping (and chip storage) capabilities.

In FIG. 62, a different arrangement is illustrated, with the secondary vehicle 1400 being oriented orthogonal to the apparatus 1200a. In this arrangement, accordingly, the feed roller assembly 1702 receives wood to be chipped from a location that is laterally adjacent the trailer 1500, rather than adjacent the distal end of the trailer 1500, as in the arrangement of FIG. 61. In the arrangement of FIG. 62, moreover, the apparatus 1200a is still supported on the trailer 1500, as is the secondary vehicle 1400, and their relative positions and orientations are also configured to permit the unobstructed flow of wood chips from the discharge chute 1706 to the bed of truck 1300 or the hopper 1704. More specifically, in this arrangement, the connection plate 1113 is located at the rear, distal end of the trailer 1500, and the secondary vehicle 1400 and apparatus 1200a, though commonly supported on trailer 1500, are not coupled to one another.

Figure 63:
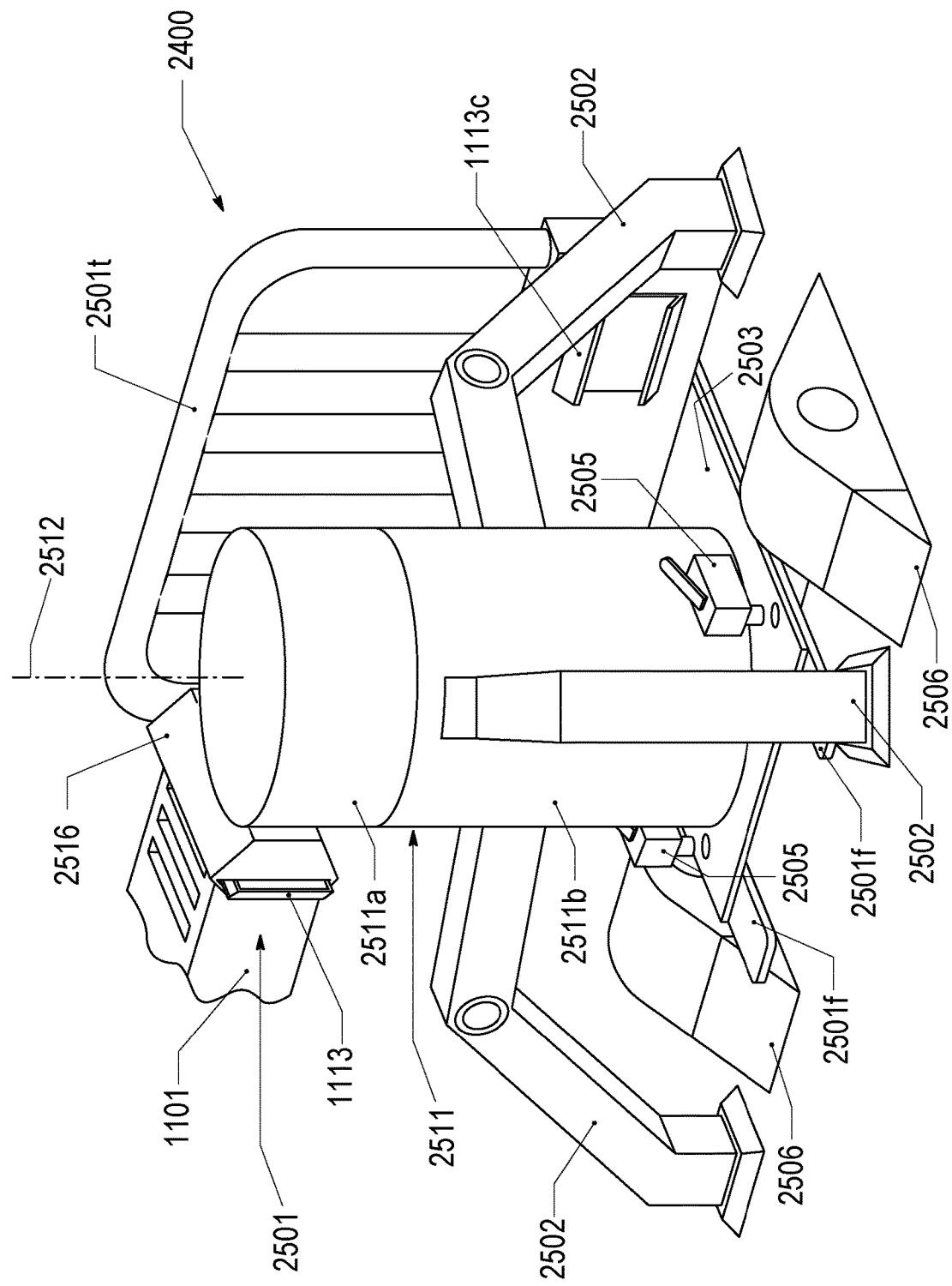
FIG. 63 is a perspective view of an intermediate or auxiliary device coupled to the primary body of the apparatus of FIG. 48 and to the secondary vehicle of FIG. 55.

With reference to FIG. 63, in which like reference numerals refer to similar features in the preceding figures, the figure illustrates an auxiliary or intermediate device 2501 that may be selectively coupled to the primary body 1101 and to a relatively small, powered secondary vehicle 1400 which, in this embodiment, takes the form of a mobile chipper. The intermediate device 2501, accordingly, provides an indirect coupling or connection between the primary body 1101 and the secondary vehicle 1400. The secondary vehicle 1400 includes a pair of forks 11501f and a back frame support 2501t. The intermediate device 2501 is supported by the forks 2501f and secured to them via a base 2503 which is in turn secured to the forks 2501f through respective pins 2505. The intermediate device 2501 includes a main body in the form, in the illustrated embodiment, of a vertically-extending tubular member 2511.

Tubular member 2511 is attached to base 2503 and includes top and bottom portions 2511a and 2511b that are rotatable relative to one another about a longitudinal, vertical axis 2512 of the tubular member 2511. The top portion 2511a may rotate, for example, as much as 360 degrees relative to the bottom portion 2511b. Coupled to the tubular member 2511 are outriggers 2502, which are used to stabilize the device 2501. It would be readily understood by those of ordinary skill in the art that these outriggers 2502 could be coupled to the device 2501 in any of a number of available manners and it is further understood that one or more of the outriggers 2502 may alternatively or additionally be coupled to the secondary vehicle 1400. It will also be understood that once the intermediate device 2501 is appropriately positioned with respect to a work area, the support provided by the secondary vehicle 1400 may be removed from the intermediate device 2501. In such a case, the intermediate device 2501 may still receive operating power from the secondary vehicle 1400, but is not otherwise supported thereby. It will also be appreciated that the intermediate device 2501 may provide its own power, and not necessarily rely on the secondary vehicle 1400 for power.

The intermediate device 2501 also includes a pair of ground engaging elements taking the form, in the illustrated embodiment, of pyramidal tracks 2506. It is contemplated, however, that the device 2501 may additionally or alternatively include ground engaging elements taking other forms, such as wheels or skid plates, for example, to serve the function of bearing the load of the primary body 1101 when coupled to the secondary vehicle 1400. While the embodiment of FIG. 63 illustrates an indirect coupling of the primary body 1101 to the secondary vehicle 1400 (e.g., a mobile chipper) through the intermediate device 2501, this is intended to be exemplary rather than limiting, insofar as other types of indirect coupling components and/or methods are contemplated. Further, as described above with respect to the embodiment of FIGS. 48-59, the primary body 1101 may instead be directly coupled to a secondary vehicle 1400 through a coupling element 1113b of the vehicle 1400, which in this embodiment takes the form of a plate.

In operation, the primary body 1101 is coupled to the tubular member 2511 through a slide-on plate 2516 that is supported by the top portion 2511a of tubular member 2511. Rotation of the top portion 2511a produces a corresponding rotational movement of the primary body 1101 pivoted about the location of coupling with plate 2516. Moreover, vertical movement of the forks 2501f results in a corresponding vertical movement of the primary body 1101. Any other movement of the secondary vehicle 1400 (laterally or in the forward/backward direction), in turn, produces a corresponding movement of the primary body 1101 in the direction of movement of the secondary vehicle 1400. Any moments produced by the weight of the primary body 1101 is counteracted by the outriggers 2502 and/or the pyramidal tracks 2506, by transferring such moments to the ground.

Figure 63A:
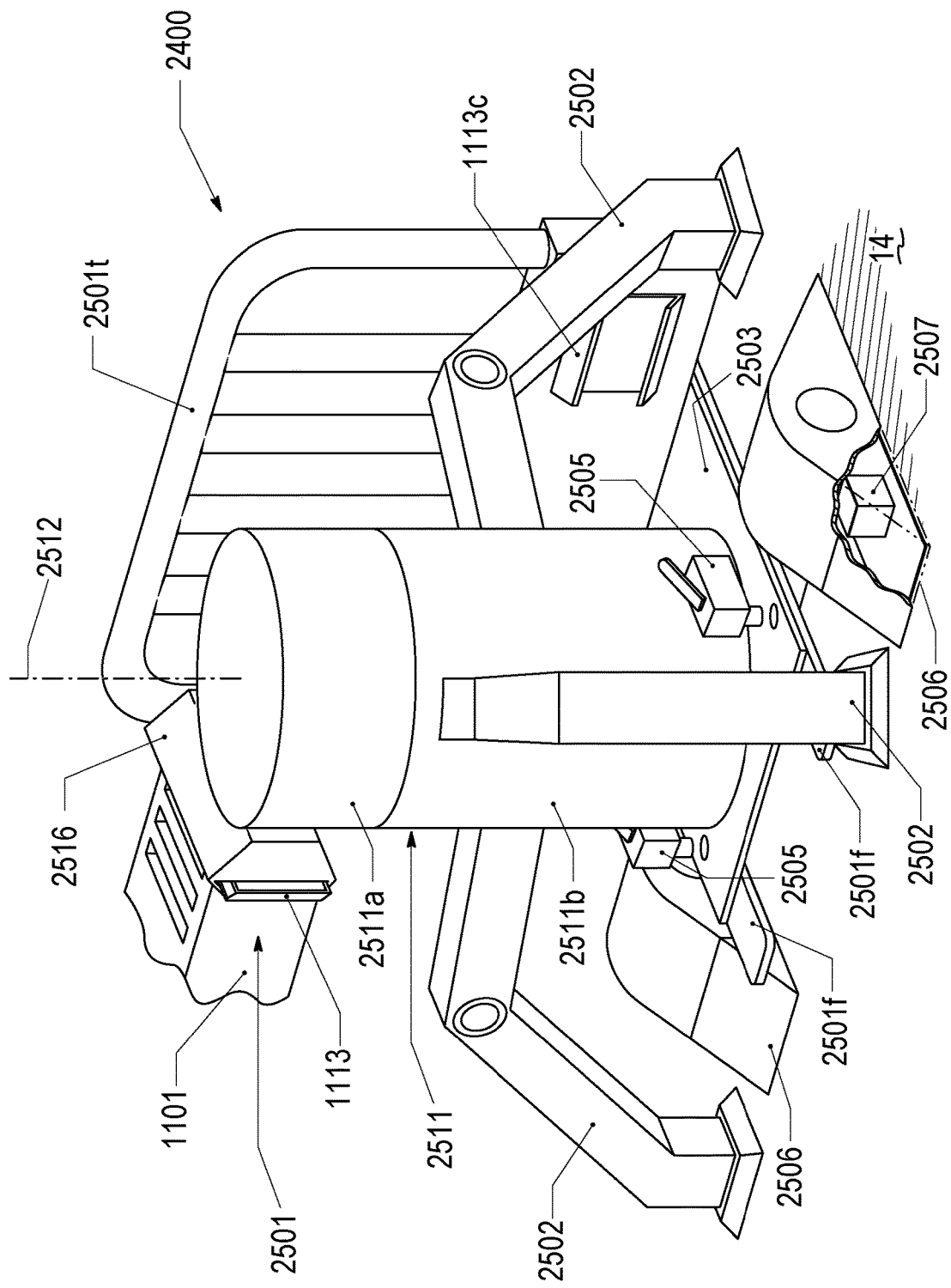
FIG. 63A is a perspective view of an intermediate or auxiliary device coupled to the primary body of the apparatus of FIG. 48 and to the secondary vehicle of FIG. 55 further showing a vibratory mechanism.

FIG. 63A shows the intermediate device 2501 of FIG. 63 including a vibratory mechanism 2507. The vibratory mechanism 2507 causes vibration at the ground engaging portion of the intermediate device 2501 in order to reduce the coefficient of friction between the intermediate device 2501 and the ground 14, making it easier to move the intermediate device 2501. As shown in FIG. 63A, the vibratory mechanism 2507 may be placed within a pressure distributing glide member 2506, which in the embodiment shown is a pyramidal track, and which can have track segments, as are well known in the art. The pressure distributing glide member 2506 can also be, or include, a plate or any other appropriate structure that provides a gliding surface for reducing the coefficient of friction and increasing the multi-directional maneuverability of the intermediate device 2501. Additionally, the pressure distributing glide member 2506 may include a low friction coating or additional aspect in order to reduce the coefficient of friction, such as a plate having a thermopolymer with lubrous properties, such as UHMW polyethylene. Furthermore, vibratory mechanism 2507 may be used in conjunction with other parts where there is a desire to reduce the coefficient of friction with the ground 14. For instance, protective plates 155, as shown in FIG. 38A, may be included on hopper support 151 and may additionally include vibration mechanism 2507. By way of further examples, vibratory mechanism 2507 may be included in lifting arms 130 and universal attachment 216 as shown in FIG. 38A or resealable coupling 1113 as shown in FIG. 48. In a further example, the lifting apparatus 1200a may include the vibration mechanism 2507 and may be attached to the secondary vehicle 1400. In these arrangements, a pressure distributing glide member, such as pressure distributing glide member 2506, in conjunction with the vibration mechanism 2507 facilitates the multi-directional maneuverability of the devices when coupled together.

As will be appreciated from the above description, the intermediate device 2501 can be attached to a primary body 1101 and the intermediate device can be caused to vibrate, allowing the primary body 1101 to be moved into position. Once positioned, the intermediate device 2501 can be used in conjunction with, or separate from, the secondary vehicle 1400, as previously described.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An apparatus for handling wood products, comprising:
a frame configured to be supported at least in part by a ground surface;
an anvil surface supported by the frame above a ground surface; and
a rotatable drum carried by the frame and configured for operating with the anvil surface in a first mode for chipping or grinding loose tree parts, and for operating in a second mode for grinding a stump in the ground, the rotatable drum being selectively movable with respect to at least one of the ground surface or the frame between a first position proximate to the anvil surface to cooperate with the anvil surface to chip or grind the loose tree parts in the first mode, and a second position to engage a stump and grind the stump in the second mode;
a shroud configured to encase at least a portion of the drum, the shroud including a first shroud section selectively moveable to expose a first portion of the drum in the first mode and expose a second portion of the drum different from the first portion in the second mode;
a chute coupled with the shroud to receive material that is one of ground or chipped by the rotatable drum, the chute having a first configuration for directing the material in a first direction and a second configuration for directing the material in a second direction.

2. The apparatus of claim 1, further comprising:
an engine operatively coupled to the drum and configured to rotate the drum in at least a first direction.

3. The apparatus of claim 1, wherein the drum includes at least one blade adapted to cooperate with the anvil surface to chip the loose tree parts when the drum is in the first position.

4. The apparatus of claim 3, further comprising:
an attachment member adapted to be removably coupled to the drum and including a plurality of teeth different from the at least one blade and configured for grinding the stump when the drum is in the second position.

5. The apparatus of claim 4, wherein at least a portion of the teeth is positioned radially outward of the at least one blade.

6. The apparatus of claim 1, wherein the drum includes a plurality of teeth adapted to grind one of the loose tree parts or the stump.

7. The apparatus of claim 1, wherein the chute includes a first chute segment and a second chute segment, the second chute segment configured for being selectively coupled with the first chute segment, in a first configuration, the second chute segment being uncoupled from the first chute segment so the first chute segment can direct the material in the first direction, in the second configuration, the second chute segment being coupled with the first chute segment so the first and second chute segments can direct the material in the second direction.

8. The apparatus of claim 7, wherein the second chute segment is hingedly coupled with the first chute segment and hinges between the first and second configurations.

9. The apparatus of claim 1, wherein the chute includes a first discharge outlet and a second discharge outlet, the apparatus further including a diverter mechanism for diverting the received material in the chute to the first discharge outlet in the first configuration and to the second discharge outlet in the second configuration.

10. The apparatus of claim 9 wherein the diverter mechanism includes a vane positioned in the chute and selectively movable for diverting the received material between the first and second discharge outlets.

11. The apparatus of claim 9 wherein the first discharge outlet is an upper discharge outlet and the second discharge outlet is a lower discharge outlet below the first discharge outlet.

12. The apparatus of claim 1 further comprising a hopper for containing the material, in the first configuration the chute operable for directing the material away from the hopper and in the second configuration the chute operable for directing the material into the hopper.

13. The apparatus of claim 12 wherein the chute is configured for being selectively decoupled from the shroud.

14. The apparatus of claim 13 wherein the hopper includes a discharge chute for discharging the material from the hopper, the chute movable on the apparatus when decoupled from the shroud and operable for coupling with the discharge chute.

15. The apparatus of claim 1 wherein the chute is configured for being selectively decoupled from the shroud.

\* \* \* \* \*